United States Patent
Coleman et al.

(10) Patent No.: US 10,254,472 B2
(45) Date of Patent: Apr. 9, 2019

(54) FILM-BASED LIGHT FIXTURE FOR ILLUMINATION BENEATH A CEILING TILE

(71) Applicant: Flex Lighting II, LLC, Chicago, IL (US)

(72) Inventors: Zane A Coleman, Elmhurst, IL (US); Shawn Pucylowski, River Hills, WI (US); Anthony J Nichol, Chicago, IL (US)

(73) Assignee: FLEx Lighting II, LLC, Chicago, IL (US)

( * ) Notice: Subject to any disclaimer, the term of this patent is extended or adjusted under 35 U.S.C. 154(b) by 0 days.

(21) Appl. No.: 16/049,397

(22) Filed: Jul. 30, 2018

(65) Prior Publication Data

US 2018/0348425 A1 Dec. 6, 2018

Related U.S. Application Data

(63) Continuation of application No. 15/790,721, filed on Oct. 23, 2017, now Pat. No. 10,036,847, which is a
(Continued)

(51) Int. Cl.
*F21V 8/00* (2006.01)
*F21K 9/232* (2016.01)
(Continued)

(52) U.S. Cl.
CPC ............ *G02B 6/0088* (2013.01); *F21K 9/232* (2016.08); *F21K 9/61* (2016.08); *F21K 9/65* (2016.08); *G02B 6/006* (2013.01); *G02B 6/0015* (2013.01); *G02B 6/0028* (2013.01); *G02B 6/0043* (2013.01); *G02B 6/0065* (2013.01); *G02B 6/0075* (2013.01); *F21V 14/02* (2013.01);
(Continued)

(58) Field of Classification Search
CPC .. G02B 6/0088; G02B 6/0015; G02B 6/0028; G02B 6/0043; G02B 6/006; G02B 6/0065; G02B 6/0075; F21K 9/61; F21K 9/232; F21K 9/65
USPC ........................................................ 362/606
See application file for complete search history.

(56) References Cited

U.S. PATENT DOCUMENTS 7,066,634 B2 * 6/2006 Kitamura ............. G02B 6/0028
362/600
7,810,977 B2 * 10/2010 Ueyama ............... G02B 6/0028
362/610

(Continued)

*Primary Examiner* — Bryon T Gyllstrom
(74) *Attorney, Agent, or Firm* — Zane Coleman

(57) ABSTRACT

In one aspect, a light fixture for illuminating an environment below a ceiling tile comprises a lightguide formed from a film including folded and stacked strips extending from a lightguide region of the film. In one aspect, the film comprises light extracting features defining one or more light emitting regions that extract light from at least one light source positioned to emit light into the stacked end of strips. In another aspect a region of the film between the one or more light emitting regions and the strips comprises a bend or fold such that when the film is positioned between the ceiling tile and a ceiling tile rail support with the one or more light emitting regions of the film positioned below the ceiling tile, the at least one light source is positioned above the ceiling tile or above the ceiling tile rail support.

20 Claims, 21 Drawing Sheets

Related U.S. Application Data continuation of application No. 15/478,005, filed on Apr. 3, 2017, now Pat. No. 9,798,075, which is a continuation of application No. 14/003,569, filed as application No. PCT/US2012/028578 on Mar. 9, 2012, now Pat. No. 9,645,304.

(60) Provisional application No. 61/450,711, filed on Mar. 9, 2011.

(51) Int. Cl.
  F21K 9/61 (2016.01)
  F21K 9/65 (2016.01)
  *F21V 14/02* (2006.01)

(52) U.S. Cl.
  CPC .......... *G02B 6/0018* (2013.01); *G02B 6/0081* (2013.01); *G02B 6/0095* (2013.01)

(56) References Cited

U.S. PATENT DOCUMENTS

| | | | | |
|---|---|---|---|---|
| 2007/0258267 A1* | 11/2007 | Huang | ................... | G02B 6/001 |
| | | | | 362/616 |
| 2008/0266863 A1* | 10/2008 | Rinko | ................... | G02B 6/0018 |
| | | | | 362/278 |
| 2009/0219734 A1* | 9/2009 | Sawada | ................... | G02B 6/006 |
| | | | | 362/616 |
| 2010/0246200 A1* | 9/2010 | Tessnow | ............. | G02B 6/0075 |
| | | | | 362/509 |
| 2011/0249425 A1* | 10/2011 | Aurongzeb | ............. | F21V 14/02 |
| | | | | 362/102 |

* cited by examiner

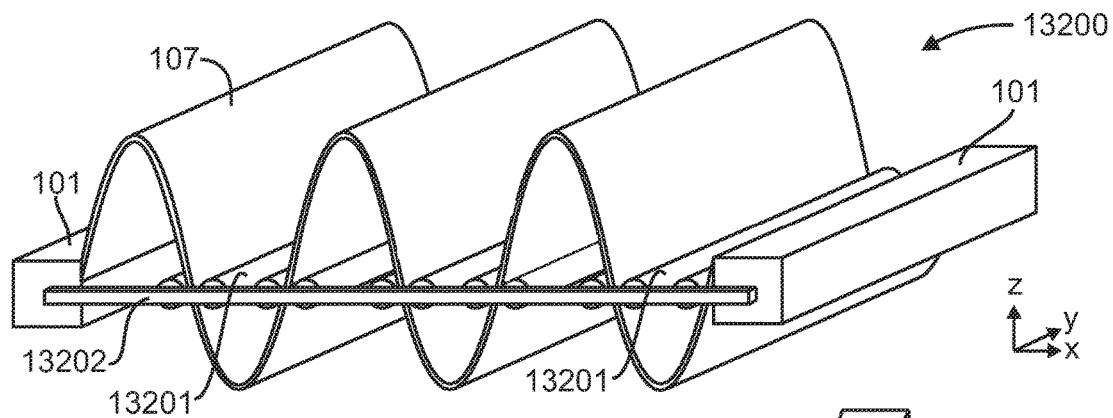
FIG. 25
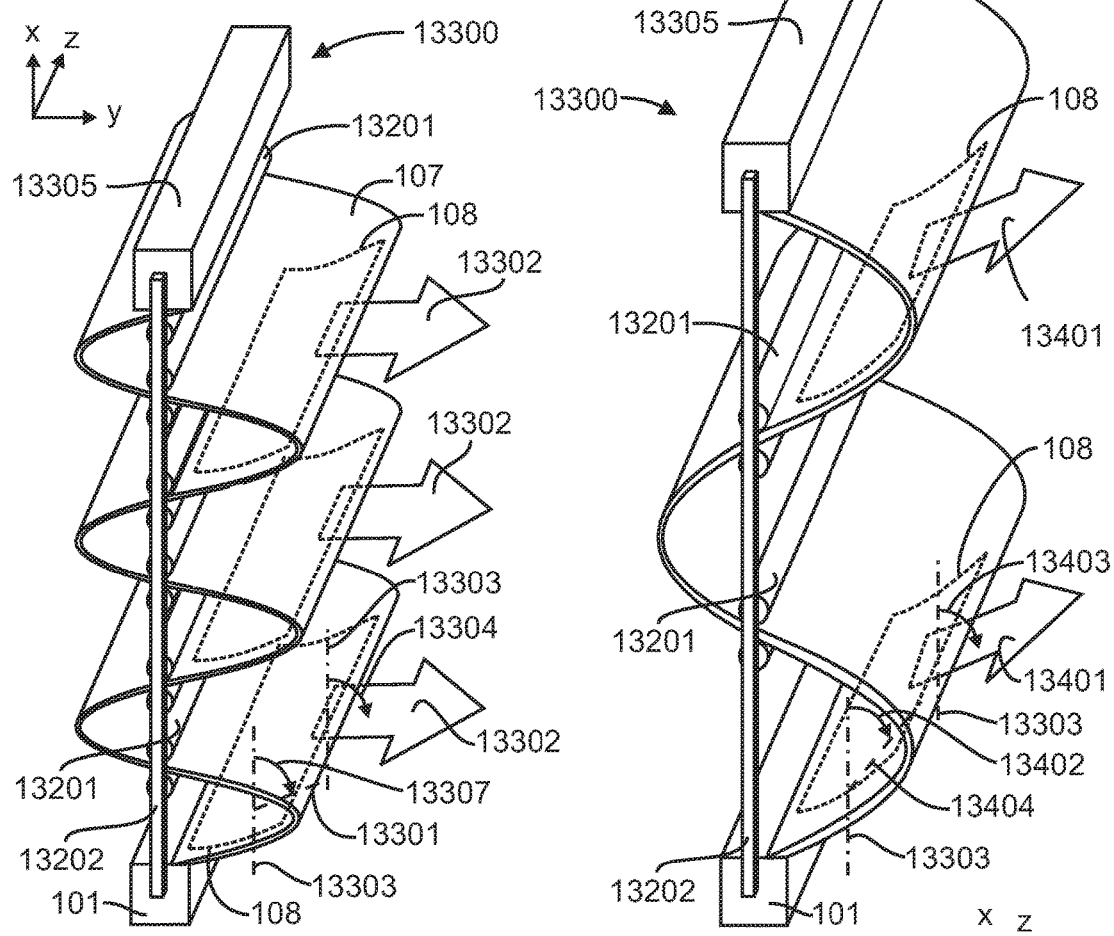
FIG. 26
FIG. 27

FILM-BASED LIGHT FIXTURE FOR ILLUMINATION BENEATH A CEILING TILE

CROSS REFERENCE TO RELATED APPLICATION

This application is a continuation of U.S. application Ser. No. 15/790,721 filed Oct. 23, 2017, entitled "Film-based light fixture with light reflecting layer and fastener" which is a continuation of U.S. application Ser. No. 15/478,005 filed Apr. 3, 2017, entitled "Film-based light fixture with see-through light emitting region," now U.S. Pat. No. 9,645,304, which is a continuation of U.S. application Ser. No. 14/003,569 filed Nov. 11, 2013 entitled "Directional front illuminating device comprising a film based lightguide with high optical clarity in the light emitting region," now U.S. Pat. No. 9,645,304, which was the National Stage of International Application No. PCT/US2012/028578 filed Mar. 9, 2012, entitled "Light Emitting Device with Adjustable Light Output Profile," which claims the benefit of U.S. Provisional Application No. 61/450,711 filed Mar. 9, 2011, entitled "Illumination Device Comprising a Film-based Lightguide," the entire contents of each are incorporated herein by reference.

TECHNICAL FIELD

The subject matter disclosed herein generally relates to light emitting devices such as light fixtures, backlights, frontlights, light emitting signs, passive displays, and active displays and their components and methods of manufacture. Light emitting devices are needed which are thinner, lighter weight, cheaper to manufacture, and scalable to large sizes.

BACKGROUND

Conventionally, in order to reduce the thickness of displays, light fixtures, and backlights, edge-lit configurations using rigid lightguides have been used to receive light from the edge and direct light out of a larger area face. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes.

The ability to further reduce the thickness and overall volume of these area light emitting devices has been limited by the ability to couple sufficient light flux into a thinner lightguide. Typical light emitting diode (LED) light sources have a light emitting area dimension of at least 1 mm, and there is often difficulty controlling the light entering, propagating through, and coupled out of the 2 mm lightguide to meet design requirements. The displays incorporating the 2 mm lightguides are typically limited to small displays such as displays with a 33 centimeters (cm) diagonal measurement or less. Many system sizes are thick due to designs that use large light sources and large input coupling optics or methods. Some systems using one lightguide per pixel (such as fiber optic based systems) require a large volume and have low alignment tolerances. In production, thin lightguides have been limited to coatings on rigid wafers for integrated optical components.

SUMMARY

In one aspect, a light fixture for illuminating an environment below a ceiling tile comprises a lightguide formed from a film including folded and stacked strips extending from a lightguide region of the film. In one aspect, the film comprises light extracting features defining one or more light emitting regions that extract light from at least one light source positioned to emit light into the stacked end of strips. In another aspect a region of the film between the one or more light emitting regions and the strips comprises a bend or fold such that when the film is positioned between the ceiling tile and a ceiling tile rail support with the one or more light emitting regions of the film positioned below the ceiling tile, the at least one light source is positioned above the ceiling tile or above the ceiling tile rail support.

In one aspect, a light emitting device for illuminating an environment includes a film-based lightguide with a plurality of strips extending from a lightguide region of the film, the strips are folded and stacked such that they are parallel to each other with their ends forming a light input surface. The film comprises light extraction features defining light emitting regions within the lightguide region of the film, with the light extraction features having an average lateral dimension in the light emitting regions in a direction parallel to an optical axis of the light within the film at the light extraction features less than 500 micrometers. The light emitting device further comprises at least one light source emitting light into the light input surface, the light passes through the light input surface and propagates through the strips and the lightguide region by total internal reflection and is directed by the light extraction features to emit a first flux of light first exiting the lightguide region of the film through the first surface of the film toward the environment exterior to the light emitting device with a directional component in a first direction orthogonal to the first surface. In another embodiment, the light emitting device further comprises a light reflecting layer physically coupled to the light emitting device, laminated to a layer of the film, or printed onto a layer of the film proximate the light emitting region of the film such that the second cladding layer is positioned between the light reflecting layer and the core layer and the light reflecting layer reflects ambient illumination passing through the lightguide in the light emitting region from the environment exterior to the light emitting device back through the lightguide and into the environment exterior to the light emitting device when the at least one light source is not emitting light. In a further embodiment, the light emitting device comprises a fastener configured to attach the light emitting device to a non-porous surface exterior to the light emitting device.

BRIEF DESCRIPTION OF THE DRAWINGS

FIG. 25 is a perspective view of one embodiment of a light emitting device including a film-based lightguide formed into a wave-like shape between two light input couplers that are separated by an adjustable extension guide.

FIG. 26 is a perspective view of one embodiment of a light emitting device including a film-based lightguide formed into a wave-like shape with light emitting regions oriented in an average first direction from a reference direction.

FIG. 27 is a perspective view of one embodiment of the light emitting device of FIG. 26 wherein a spacing between pairs of lightguide positioning rods has been increased.

DETAILED DESCRIPTION

Figure 1:
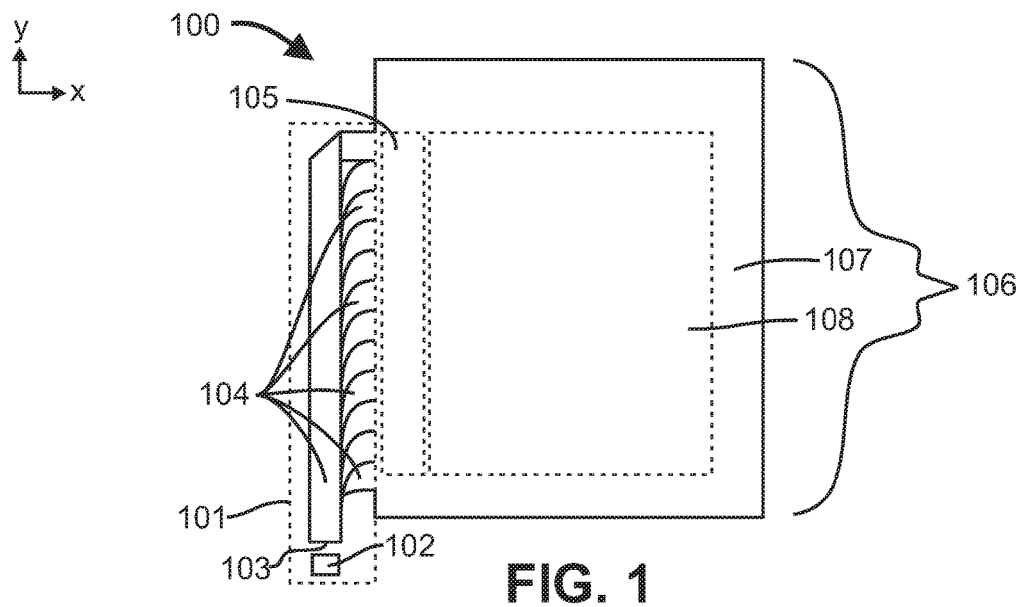
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent sign" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent signs can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if it the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any face (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5 micron region or layer of a film or it may be a 3 millimeter sheet comprising a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof. In relation to the present invention the term "micron" is used as a shorthand reference to the SI unit micrometres.

In one embodiment, a device includes a film-based lightguide and a film adjustment mechanism configurable to adjust an orientation of a region of the film-based lightguide such that an angular light output profile from the device changes when a light source emits light that travels in a waveguide condition through the film-based lightguide.

In another embodiment, a light emitting device has an adjustable angular light output profile wherein a first radius of curvature of a light emitting region is adjustable to a second radius of curvature to change an angular light output profile of light emitted from the light emitting device.

In another embodiment, a method of changing an angular light output profile of a light emitting device includes changing an orientation of a light emitting region of a film-based lightguide configured to receive light emitted from a light source through an array of coupling lightguides. In one embodiment, changing an orientation of the light emitting region includes changing a radius of curvature of the light emitting region. In one embodiment, changing an orientation of the light emitting region includes adjusting a film adjustment mechanism physically coupled to the film-based lightguide.

In one embodiment, the orientation of a region of the film-based lightguide is adjustable to change an angle of a peak luminous intensity or an angular full-width at half maximum luminous intensity of the angular light output profile from the light emitting device in a light output plane. In one embodiment, the light emitting region of the film based lightguide is adjusted to change the angular light output profile. In a further embodiment, the light emitting device further includes a film adjustment mechanism configurable to adjust the first radius of curvature of the light emitting region. In one embodiment, the film adjustment mechanism is electronically adjustable.

In another embodiment, a light emitting device includes an adhesive layer operatively coupled to a film-based lightguide that can support a weight of the film-based lightguide or light emitting device. In another embodiment, a light emitting device includes one or more removable and/or replaceable light extraction patterns or films including patterns. In a further embodiment, a light emitting device emits light toward substantially only a first side of the film and a camera or viewer disposed on an opposing second side receives light entering from the first side passing through the film. In one embodiment, the film provides privacy or security by not permitting a viewer to readily see through a light emitting film.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are not symmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, the peak angular intensity is a range of angles. When the light emitting device has a light emitting device optical axis in a range of angles, the optical axis of the light emitting device comprises the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one face or edge of the core material with a refractive index less than a refractive index of the core material. In other embodiment, the light input coupler includes a plurality of coupling lightguides wherein a portion of light from a light source incident on a face of at least one strip is directed into the lightguide such that light travels in a waveguide condition. The light input coupler may also include one or more of the following: a strip folding device, a strip holding element, and an input surface optical element.

Light Source

In one embodiment, a light emitting device includes at least one light source including one or more of the following: a fluorescent lamp, a cylindrical cold-cathode fluorescent lamp, a flat fluorescent lamp, a light emitting diode, an organic light emitting diode, a field emissive lamp, a gas discharge lamp, a neon lamp, a filament lamp, incandescent lamp, an electroluminescent lamp, a radiofluorescent lamp, a halogen lamp, an incandescent lamp, a mercury vapor lamp, a sodium vapor lamp, a high pressure sodium lamp, a metal halide lamp, a tungsten lamp, a carbon arc lamp, an electroluminescent lamp, a laser, a photonic bandgap based light source, a quantum dot based light source, a high efficiency plasma light source, and a microplasma lamp. The light emitting device may include a plurality of light sources arranged in an array, on opposite sides of a lightguide, on orthogonal sides of a lightguide, on 3 or more sides of a lightguide, or on 4 sides of a substantially planer lightguide. The array of light sources may be a linear array of discrete LED packages including at least one LED die. In another embodiment, a light emitting device includes a plurality of light sources within one package disposed to emit light toward a light input surface. In one embodiment, the light emitting device includes any suitable number of light sources, such as 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

In one embodiment, a light emitting device includes at least one broadband light source that emits light in a wavelength spectrum larger than 100 nanometers. In another embodiment, a light emitting device includes at least one narrowband light source that emits light in a narrow bandwidth less than 100 nanometers. In one embodiment, at least one light source is a white LED package including a red LED, a green LED, and a blue LED.

In another embodiment, at least two light sources with different colors are disposed to couple light into the lightguide through at least one light input coupler. The light source may also include a photonic bandgap structure, a nano-structure or another suitable three-dimensional arrangement that provides light output with an angular FWHM less than one selected from the group of: 120 degrees, 100 degrees, 80 degrees, 60 degrees, 40 degrees, and 20 degrees.

In another embodiment, a light emitting device includes a light source emitting light in an angular full-width at half maximum intensity of less than one selected from 150 degrees, 120 degrees, 100 degrees, 80 degrees, 70 degrees, 60 degrees, 50 degrees, 40 degrees, 30 degrees, 20 degrees, and 10 degrees in one or more output planes. In another embodiment, the light source further includes one or more of the following: a primary optic, a secondary optic, and a photonic bandgap region, and the angular full-width at half maximum intensity of the light source is less than one selected from 150 degrees, 120 degrees, 100 degrees, 80 degrees, 70 degrees, 60 degrees, 50 degrees, 40 degrees, 30 degrees, 20 degrees, and 10 degrees.

Color Tuning

In one embodiment, the light emitting device includes two or more light sources and the relative output of the two light sources is adjusted to achieve a desired color in a light emitting region of the lightguide or an area of light output on the light emitting device includes a plurality of lightguides overlapping in the region. For example, in one embodiment, the light emitting device includes a red LED, a green LED, and a blue LED disposed to couple light into the light input surface of a stack of coupling lightguides. The light mixes within the lightguide and is output in a light emitting region of the lightguide. By turning on the red LED and the blue LED, for example, a purple colored light emitting region is achieved. In another embodiment, the relative light output of the light sources is adjusted to compensate for the non-uniform spectral absorption in an optical element of the light emitting device. For example, in one embodiment, the output of the blue LED in milliwatts is increased to a level more than the red output in milliwatts in order to compensate for more blue light absorption in a lightguide (or blue light scattering) such that the light emitting region has a substantially white light output in a particular region.

Wavelength Conversion Material

In another embodiment, the light source emits blue and/or ultraviolet light and is combined with a phosphor. In another embodiment, a light emitting device includes a light source with a first activating energy and a wavelength conversion material which converts a first portion of the first activating energy into a second wavelength different than the first wavelength. In another embodiment, the light emitting device includes at least one wavelength conversion material selected from the group of: fluorophore, phosphor, fluorescent dye, inorganic phosphor, photonic bandgap material, quantum dot material, fluorescent protein, fusion protein, fluorophores attached to protein to specific functional groups (such as amino groups (active ester, carboxylate, isothiocyanate, hydrazine), carboxyl groups (carbodiimide), thiol (maleimide, acetyl bromide), azide (via click chemistry or non-specifically (glutaraldehyde))), quantum dot fluorophore, small molecule fluorophores, aromatic fluorophores, conjugated fluorophores, fluorescent dye and other wavelength conversion material.

LED Array

In one embodiment, the light emitting device includes a plurality of LEDs or LED packages wherein the plurality of LEDs or LED packages includes an array of LEDs. In another embodiment, the input array of LEDs can be arranged to compensate for uneven absorption of light through longer versus shorter lightguides. In another embodiment, the absorption is compensated for by directing more light into the light input coupler corresponding to the longer coupling lightguides or longer lightguides.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

Coupling Lightguide

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with a cross-sectional dimensions of 40.5 millimeters by 0.2 millimeters.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In one embodiment, $n_m$-$n_{clad}$ is one selected from the group of: 0.001-0.005, 0.001-0.01, 0.001-0.1, 0.001-0.2, 0.001-0.3, 0.001-0.4, 0.01-0.1, 0.1-0.5, 0.1-0.3, 0.2-0.5, greater than 0.01, greater than 0.1, greater than 0.2, and greater than 0.3. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. In one embodiment, the cladding region is optically coupled to one or more surfaces of the light mixing region to prevent out-coupling of light from the lightguide if the lightguide makes contact with another component. In this embodiment, the cladding also enables the cladding and light mixing region to be physically coupled to another component. In one embodiment, the cladding is one selected from the group of methyl-based silicone pressure sensitive adhesive, fluoropolymer material (applied with using coating comprising a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E Ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, a region of cladding material is removed or is absent in the region wherein the lightguide layer or lightguide is optically coupled to another region of the lightguide wherein the cladding is removed or absent such that light can couple between the two regions. In one embodiment, the cladding is removed or absent in a region near an edge of a lightguide, lightguide region, strip or region cut from a lightguide region, or coupling lightguide such that light nearing the edge of the lightguide can be redirected by folding or bending the region back onto a region of the lightguide wherein the cladding has been removed where the regions are optically coupled together. In another embodiment, the cladding is removed or absent in the region disposed between the lightguide regions of two coupling lightguides disposed to receive light from a light source or near a light input surface. By removing or not applying or disposing a cladding in the region between the input end of two or more coupling lightguides disposed to receive light from a light source, light is not directly coupled into the cladding region edge.

In one embodiment, the cladding region is optically coupled to one or more surfaces of the light mixing region to prevent out-coupling of light from the lightguide if the lightguide makes contact with another component. In this embodiment, the cladding also enables the cladding and light mixing region to be physically coupled to another component.

Cladding Location

In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides. In one embodiment, the coupling lightguides do not include a cladding layer between the core regions in the region near the light input surface or light source. In this embodiment, the core regions may be pressed or held together and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides.

In one embodiment, a cladding layer is disposed on one or both opposite surfaces of the light emitting region and is not disposed between two or more coupling lightguides at the light input surface. For example, in one embodiment, a mask layer is applied to a film-based lightguide corresponding to the end regions of the coupling lightguides that will form the light input surface after cutting and, in a particular embodiment the coupling lightguides, and the film is coated on one or both sides with a low refractive index coating. In this embodiment, when the mask is removed and the coupling lightguides are folded (using, for example a relative position maintaining element) and stacked, the light input surface comprises core layers without cladding layers and the light emitting region comprise a cladding layer. The light mixing region may also comprise a cladding and/or light absorbing region in certain embodiments, which is beneficial for optical efficiency (light is directed into the cladding at the input surface) and in applications such as film-based frontlights for reflective or transflective displays where a cladding may be desired.

In another embodiment, the protective liner of at least one outer surface of the outer coupling lightguides is removed such that the stack of coupling lightguides may be bonded to one of the following: a circuit board, a non-folded coupling lightguide, a light collimating optical element, a light turning optical element, a light coupling optical element, a flexible connector or substrate for a display or touchscreen, a second array of stacked coupling lightguides, a light input coupler housing, a light emitting device housing, a thermal transfer element, a heat sink, a light source, an alignment guide, a registration guide or component comprising a window for the light input surface, and any suitable element disposed on and/or physically coupled to an element of the light input surface or light emitting device. In one embodiment, the coupling lightguides do not comprise a cladding region on either planar side and optical loss at the bends or folds in the coupling lightguides is reduced. In another embodiment, the coupling lightguides do not comprise a cladding region on either planar side and the light input surface input coupling efficiency is increased due to the light input surface area having a higher concentration of lightguide received surface relative to a lightguide with at least one cladding. In a further embodiment, the light emitting region has at least one cladding region or layer and the percentage of the area of the light input surface of the coupling lightguides disposed to transmit light into the lightguide portion of the coupling lightguides is greater than one of the following: 70%, 80%, 85%, 90%, 95%, 98% and 99%. The cladding may be on one side only of the lightguide or the light emitting device could be designed to be optically coupled to a material with a refractive index lower than the lightguide, such as in the case with a plasticized PVC film (n=1.53) (or other low-tack material) temporarily adhered to a glass window (n=1.51).

In one embodiment, the cladding on at least one surface of the lightguide is applied (such as coated or co-extruded) and the cladding on the coupling lightguides is subsequently removed. In a further embodiment, the cladding applied on the surface of the lightguide (or the lightguide is applied onto the surface of the cladding) such that the regions corresponding to the coupling lightguides do not have a cladding. For example, the cladding material could be extruded or coated onto a lightguide film in a central region wherein the outer sides of the film will comprise coupling lightguides. Similarly, the cladding may be absent on the coupling lightguides in the region disposed in close proximity to one or more light sources or the light input surface.

In one embodiment, two or more core regions of the coupling lightguides do not comprise a cladding region between the core regions in a region of the coupling lightguide disposed within a distance selected from the group of 1 millimeter, 2 millimeters, 4 millimeters, and 8 millimeters from the light input surface edge of the coupling lightguides. In a further embodiment, two or more core regions of the coupling lightguides do not comprise a cladding region between the core regions in a region of the coupling lightguide disposed within a distance selected from the group of 10%, 20%, 50%, 100%, 200%, and 300% of the combined thicknesses of the cores of the coupling lightguides disposed to receive light from the light source from the light input surface edge of the coupling lightguides. In one embodiment, the coupling lightguides in the region proximate the light input surface do not comprise cladding between the core regions (but may contain cladding on the outer surfaces of the collection of coupling lightguides) and the coupling lightguides are optically coupled together with an index-matching adhesive or material or the coupling lightguides are optically bonded, fused, or thermo-mechanically welded together by applying heat and pressure. In a further embodiment, a light source is disposed at a distance to the light input surface of the coupling lightguides less than one selected from the group of 0.5 millimeter, 1 millimeter, 2 millimeters, 4 millimeters, and 6 millimeters and the dimension of the light input surface in the first direction parallel to the thickness direction of the coupling lightguides is greater than one selected from the group of 100%, 110%, 120%, 130%, 150%, 180%, and 200% the dimension of the light emitting surface of the light source in the first direction. In another embodiment, disposing an index-matching material between the core regions of the coupling lightguides or optically coupling or boding the coupling lightguides together in the region proximate the light source optically couples at least one selected from the group of 10%, 20%, 30%, 40%, and 50% more light into the coupling lightguides than would be coupled into the coupling lightguides with the cladding regions extending substantially to the light input edge of the coupling lightguide. In one embodiment, the index-matching adhesive or material has a refractive index difference from the core region less than one selected from the group of 0.1, 0.08, 0.05, and 0.02. In another embodiment, the index-matching adhesive or material has a refractive index greater by less than one selected from the group of 0.1, 0.08, 0.05, and 0.02 the refractive index of the core region. In a further embodiment, a cladding region is disposed between a first set of core regions of coupling lightguides for a second set of coupling lightguides an index-matching region is disposed between the core regions of the coupling lightguides or they are fused together. In a further embodiment, the coupling lightguides disposed to receive light from the geometric center of the light emitting area of the light source within a first angle of the optical axis of the light source have cladding regions disposed between the core regions, and the core regions at angles larger than the first angle have index-matching regions disposed between the core regions of the coupling lightguides or they are fused together. In one embodiment, the first angle is selected from the group of 10 degrees, 20 degrees, 30 degrees, 40 degrees, 50 degrees, and 60 degrees. In the aforementioned embodiments, the cladding region may be a low refractive index material or air. In a further embodiment, the total thickness of the coupling lightguides in the region disposed to receive light from a light source to be coupled into the coupling lightguides is less than n times the thickness of the lightguide region where n is the number of coupling lightguides. In a further embodiment, the total thickness of the coupling lightguides in the region disposed to receive light from a light source to be coupled into the coupling lightguides is substantially equal to n times the thickness of the lightguide layer within the lightguide region.

Cladding Thickness

In a one embodiment, the average thickness of one or both cladding layers of the lightguide is less than one selected from the group of: 100 microns, 60 microns, 30 microns, 20 microns, 10 microns, 6 microns, 4 microns, 2 microns, 1 micron, 0.8 microns, 0.5 microns, 0.3 microns, and 0.1 microns. In another embodiment, the ratio of the thickness of the core layer to one or more cladding layers is greater than one selected from the group of 2, 4, 6, 8, 10, 20, 30, 40, and 60. In one embodiment, a high core to cladding layer thickness ratio where the cladding extends over the light emitting region and the coupling lightguides enables more light to be coupled into the core layer at the light input surface because the cladding regions represent a lower percentage of the surface area at the light input surface.

Cladding Layer Materials

In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material and may be broadly categorized into one of two basic classes. A first class includes amorphous fluoropolymers including interpolymerized units derived from vinylidene fluoride (VDF) and hexafluoropropylene (HFP) and optionally tetrafluoroethylene (TFE) monomers. The second significant class of fluoropolymers useful in one embodiment are homo and copolymers based on fluorinated monomers such as TFE or VDF which do contain a crystalline melting point such as polyvinylidene fluoride or thermoplastic copolymers of TFE such as those based on the crystalline microstructure of TFE-HFP-VDF. In another embodiment, the cladding includes a material with an effective refractive index less than the core layer due to microstructures or nanostructures. In another embodiment, the cladding layer includes a porous region including air or other gas or material with a refractive index less than 1.2 such that the effective refractive index of the cladding layer is reduced.

The cladding layer material may comprise light scattering domains and may scatter light anisotropically or isotropically. In one embodiment, the cladding layer is an adhesive such as those described in U.S. Pat. No. 6,727,313 the contents of which are incorporated by reference herein. In another embodiment, the cladding material comprises domains less than 200 $n_m$ in size with a low refractive index such as those described in U.S. Pat. No. 6,773,801, the contents of which are incorporated by reference herein. Other low refractive index materials, fluoropolymer materials, polymers and adhesives may be used such as those disclosed U.S. Pat. Nos. 6,887,334 and 6,827,886 and U.S. patent application Ser. No. 11/795,534, the contents of each are incorporated by reference herein.

In another embodiment, a light emitting device comprises a lightguide with a cladding on at least one side of a lightguide with a thickness within one selected from the group of 0.1-10, 0.5-5, 0.8-2, 0.9-1.5, 1-10, 0.1-1, and 1-5 times the 1/e penetration depth, $\lambda_e$, at an angle, $\theta$, selected from the group of 80, 70, 60, 50, 40, 30, 20, and 10 degrees from the core-cladding interface normal within the lightguide. A light output coupler or light extraction region (or film) is disposed to couple a first portion of incident light out of the lightguide when in optical contact with the cladding layer. For example, a removable and replaceable light extraction film comprising high refractive index light scattering features (such as $TiO_2$ or high refractive index glass particles, beads, or flakes) is disposed upon the cladding layer of a lightguide in a light fixture comprising a polycarbonate lightguide with an amorphous fluoropolymer cladding of thickness $\lambda_e$. In the regions of the removable and replaceable light extraction film with the scattering features, the light can be frustrated from the lightguide and escape the lightguide. In this embodiment, a light extraction film may be used with a lightguide with a cladding region to couple light out of the lightguide. In this embodiment, a cladding region can help protect the lightguide (from scratches, unintentional total internal reflection frustration or absorption when in contact with a surface, for example) while still allowing a removable and replaceable light extraction film to allow for user configurable light output properties. In another embodiment, at least one film or component selected from the group of a light output coupling film, a distribution lightguide, and a light extraction feature is optically coupled to, disposed upon, or formed in a cladding region and couples a first portion of light out of the lightguide and cladding region. In one embodiment the first portion is greater than one selected from the group of 5%, 10%, 15%, 20%, 30%, 50%, and 70% of the flux within the lightguide or within the region comprising the thin cladding layer and film or component.

In one embodiment, the light input surface disposed to receive light from the light source does not have a cladding layer. In one embodiment, the ratio of the cladding area to the core layer area at the light input surface is greater than 0 and less than one selected from the group of 0.5, 0.4, 0.3, 0.2, 0.1, 0.05, 0.02, and 0.01. In another embodiment, the ratio of the cladding area to the core layer area in the regions of the light input surface receiving light from the light source with at least 5% of the peak luminous intensity at the light input surface is greater than 0 and less than one selected from the group of 0.5, 0.4, 0.3, 0.2, 0.1, 0.05, 0.02, and 0.01.

Fluoropolymer materials may be used a low refractive index cladding material and may be broadly categorized into one of two basic classes. A first class includes those amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers that can be used in embodiments are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that contain essentially no crystallinity or possess no significant melting point as determined for example by differential scanning calorimetry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in an embodiment are those homo and copolymers based on fluorinated monomers such as TFE or VDF which do contain a crystalline melting point such as polyvinylidene fluoride (PVDF, available commercially from 3M company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastics THV™ 200.

A general description and preparation of these classes of fluoropolymers can be found in Encyclopedia Chemical Technology, Fluorocarbon Elastomers, Kirk-Othmer (1993), or in Modern Fluoropolymers, J. Scheirs Ed, (1997), J Wiley Science, Chapters 2, 13, and 32. (ISBN 0-471-97055-7), the contents of each are incorporated by reference herein.

In one embodiment, the fluoropolymers are copolymers formed from the constituent monomers known as tetrafluoroethylene ("TFE"), hexafluoropropylene ("HFP"), and vinylidene fluoride ("VdF," "VF2,"). The monomer structures for these constituents are shown below as (1), (2) and (3): TFE: $CF_2=CF_2$ (1); VDF: $CH_2=CF_2$ (2); HFP: $CF_2=CF-CF_3$ (3)

In one embodiment, the preferred fluoropolymer consists of at least two of the constituent monomers (HFP and VDF), and more preferably all three of the constituents monomers in varying molar amounts. Additional monomers not depicted above but may also be useful in an embodiment include perfluorovinyl ether monomers of the general structure: $CF_2=CF-OR_f$, wherein $R_f$ can be a branched or linear perfluoroalkyl radical of 1-8 carbons and can itself contain additional heteroatoms such as oxygen. Specific examples are perfluoromethyl vinyl ether, perfluoropropyl vinyl ether, and perfluoro(3-methoxy-propyl) vinyl ether. Additional examples incorporated by reference herein are found in WO00/12754 to Worm, assigned to 3M, and U.S. Pat. No. 5,214,100 to Carlson. Other fluoropolymer materials may be used such as those disclosed in U.S. patent application Ser. No. 11/026,614.

In one embodiment, the cladding material is birefringent and the refractive index in at least a first direction is less than refractive index of the lightguide region, lightguide core, or material to which it is optically coupled.

Collimated light traveling through a material may be reduced in intensity after passing through the material due to scattering (scattering loss coefficient), absorption (absorption coefficient), or a combination of scattering and absorption (attenuation coefficient). In one embodiment, the cladding comprises a material with an average absorption coefficient for collimated light less than one selected from the group of 0.03 $cm^{-1}$, 0.02 $cm^{-1}$, 0.01 $cm^{-1}$, and 0.005 $cm^{-1}$ over the visible wavelength spectrum from 400 nanometers to 700 nanometers. In another embodiment, the cladding comprises a material with an average scattering loss coefficient for collimated light less than one selected from the group of 0.03 $cm^{-1}$, 0.02 $cm^{-1}$, 0.01 $cm^{-1}$, and 0.005 $cm^{-1}$ over the visible wavelength spectrum from 400 nanometers to 700 nanometers. In another embodiment, the cladding comprises a material with an average attenuation coefficient for collimated light less than one selected from the group of 0.03 $cm^{-1}$, 0.02 $cm^{-1}$, 0.01 $cm^{-1}$, and 0.005 $cm^{-1}$ over the visible wavelength spectrum from 400 nanometers to 700 nanometers.

In a further embodiment, a lightguide comprises a hard cladding layer that substantially protects a soft core layer (such as a soft silicone or silicone elastomer).

In one embodiment, a lightguide comprises a core material with a Durometer Shore A hardness (JIS) less than 50 and at least one cladding layer with a Durometer Shore A hardness (JIS) greater than 50. In one embodiment, a lightguide comprises a core material with an ASTM D638—10 Young's Modulus less than 2 MPa and at least one cladding layer with an ASTM D638 —10 Young's Modulus greater than 2 MPa at 25 degrees Celsius. In another embodiment, a lightguide comprises a core material with an ASTM D638—10 Young's Modulus less than 1.5 MPa and at least one cladding layer with an ASTM D638—10 Young's Modulus greater than 2 MPa at 25 degrees Celsius. In a further embodiment, a lightguide comprises a core material with an ASTM D638—10 Young's Modulus less than 1 MPa and at least one cladding layer with an ASTM D638—10 Young's Modulus greater than 2 MPa at 25 degrees Celsius.

In one embodiment, a lightguide comprises a core material with an ASTM D638—10 Young's Modulus less than 2 MPa and the lightguide film has an ASTM D638—10 Young's Modulus greater than 2 MPa at 25 degrees Celsius. In another embodiment, a lightguide comprises a core material with an ASTM D638—10 Young's Modulus less than 1.5 MPa and the lightguide film has an ASTM D638—10 Young's Modulus greater than 2 MPa at 25 degrees Celsius. In one embodiment, a lightguide comprises a core material with an ASTM D638—10 Young's Modulus less than 1 MPa and the lightguide film has an ASTM D638—10 Young's Modulus greater than 2 MPa at 25 degrees Celsius.

In another embodiment, the cladding comprises a material with an effective refractive index less than the core layer due to microstructures or nanostructures. In another embodiment, the cladding layer comprises a porous region comprising air or other gas or material with a refractive index less than 1.2 such that the effective refractive index of the cladding layer is reduced. For example, in one embodiment, the cladding layer is an aerogel or arrangement of nanostructured materials disposed on the core layer that have an effective refractive index less than the core layer. In one embodiment, the nano-structured material comprises fibers, particles, or domains with an average diameter or dimension in the plane parallel to the core layer surface or perpendicular to the core layer surface less than one selected from the group of 1000, 500, 300, 200, 100, 50, 20, 10, 5, and 2 nanometers. For example, in one embodiment, the cladding layer is a coating comprising nanostructured fibers, comprising polymeric materials including, without limitation, at least one of the following: cellulose, polyester, polyvinyl chloride (PVC), polytetrafluoroethylene (PTFE), polystyrene, polymethyl methacrylate (PMMA), polydimethylsiloxane (PDMS), and other light transmitting or partially light transmitting materials. In another embodiment, materials that normally scatter too much light in bulk form (such as high-density polyethylene (HDPE) or polypropylene) to be used as a core or cladding material for lightguide lengths greater than 1 meter (such as scattering greater than 10% of the light out of the lightguide over the 1 meter length) are used in a nanostructured form. For example, in one embodiment, the nanostructured cladding material on the film-based lightguide, when formed into a bulk solid form (such as a 200 micron thick homogeneous film formed without mechanically formed physical structures volumetrically or on the surface under film processing conditions designed to minimize haze substantially) has an ASTM haze greater than 0.5%.

In a further embodiment, the microstructured or nanostructured cladding material comprises a structure that will "wet-out" or optically couple light into a light extraction feature disposed in physical contact with the microstructured or nanostructured cladding material. For example, in one embodiment, the light extraction feature comprises nanostructured surface features that when in close proximity or contact with the nanostructured cladding region couple light from the cladding region. In one embodiment, the microstructured or nanostructured cladding material has complementary structures to the light extraction feature structures, such as a male-female part or other simple or complex complementary structures such that the effective refractive index in the region comprising the two structures is larger than that of the cladding region without the light extraction features.

Reflective Elements

In one embodiment, one or more of the: light source, the light input surface, the light input coupler, the coupling lightguide, lightguide region, and the lightguide includes a reflective element or surface optically coupled to it, disposed adjacent to it, or disposed to receive light from it wherein the reflective region is one of a specularly reflecting region, a diffusely reflecting region, a metallic coating on a region (such as an ITO coating, Aluminized PET, Silver coating, etc.), a multi-layer reflector dichroic reflector, a multi-layer polymeric reflector, giant birefringent optical films, enhanced specular reflector films, reflective ink or particles within a coating or layer, and a white reflective film including one or more of the following: titanium dioxide, Barium sulfate, and voids. In another embodiment, a light emitting device comprises a lightguide wherein at least one light reflecting material selected from the group of a light recycling element, a specularly reflective tape with a diffuse reflectance (specular component included) greater than 70%, a retroreflective film (such as a corner cube film or glass bead based retroreflective film), white reflecting film, and aluminum housing is disposed near or optically coupled at least one edge region of the lightguide disposed to receive light from the lightguide and redirect a first portion of light back into the lightguide. In another embodiment, a light emitting device comprises a lightguide wherein at least one light absorbing material selected from the group of a light absorbing tape with a diffuse reflectance (specular component included) less than 50%, a region comprising a light absorbing dye or pigment, a region comprising carbon black particles, a region comprising light absorbing ink, paint, films or surfaces, and a black material is disposed near or optically coupled at least one edge region of the lightguide disposed to receive light from the lightguide and redirect a first portion of light back into the lightguide. In a further embodiment, a light reflecting material and a light absorbing material of the aforementioned types is disposed near or optically coupled at least one edge region of the lightguide disposed to receive light from the lightguide and redirect a first portion of light back into the lightguide and absorb a second portion of incident light. In one embodiment, the light reflecting or light absorbing material is in the form of a line of ink or tape adhered onto the surface of the lightguide film. In one embodiment, the light reflecting material is a specularly reflecting tape adhered to the top surface, edge, and bottom surface of the lightguide near the edge of the lightguide. In another embodiment, the light absorbing material is a light absorbing tape adhered to the top surface, edge, and bottom surface of the lightguide near the edge of the lightguide. In another embodiment, the light absorbing material is a light absorbing ink or paint (such as a black acrylic based paint) adhered to at least one selected from the group of the edge, the top surface near the edge, and the bottom surface near the edge of the lightguide film.

In one embodiment, the light emitting device is a backlight illuminating a display or other object to be illuminated and the light emitting region, lightguide, or lightguide region is disposed between a reflective surface or element and the object to be illuminated. In another embodiment, the reflective element is a voided white PET film such as TETORON® film UX Series from TEIJIN (Japan). In one embodiment, the reflective element or surface has a diffuse reflectance d/8 with the specular component included (DR-SCI) measured with a Minolta CM508D spectrometer greater than one selected from the group of 60%, 70%, 80%, 90%, and 95%. In another embodiment, the reflective element or surface has a diffuse reflectance d/8 with the specular component excluded (DR-SCE) measured with a Minolta CM508D spectrometer greater than one selected from the group of 60%, 70%, 80%, 90%, and 95%. In another embodiment, the reflective element or surface has a specular reflectance greater than one selected from the group of 60%, 70%, 80%, 90%, and 95%. The specular reflectance, as defined herein, is the percentage of light reflected from a surface illuminated by a 532 nanometer laser that is within a 10 degree (full angle) cone centered about the optical axis of the reflected light. This can be measured by using an integrating sphere wherein the aperture opening for the integrating sphere is positioned at a distance from the point of reflection such that the angular extent of the captured light is 10 degrees full angle. The percent reflection is measured against a reflectance standard with a known specular reflectance, a reflectance standard, film, or object that have extremely low levels of scattering.

In another embodiment, a light emitting device comprises a lightguide wherein at least one light reflecting material selected from the group of a light recycling element, a specularly reflective tape with a diffuse reflectance (specular component included) greater than 70%, a retroreflective film (such as a corner cube film or glass bead based retroreflective film), white reflecting film, and aluminum housing is disposed near or optically coupled at least one edge region of the lightguide disposed to receive light from the lightguide and redirect a first portion of light back into the lightguide. In another embodiment, a light emitting device comprises a lightguide wherein at least one light absorbing material selected from the group of a light absorbing tape with a diffuse reflectance (specular component included) less than 50%, a region comprising a light absorbing dye or pigment, a region comprising carbon black particles, a region comprising light absorbing ink, paint, films or surfaces, and a black material is disposed near or optically coupled at least one edge region of the lightguide disposed to receive light from the lightguide and redirect a first portion of light back into the lightguide. In a further embodiment, a light reflecting material and a light absorbing material of the aforementioned types is disposed near or optically coupled at least one edge region of the lightguide disposed to receive light from the lightguide and redirect a first portion of light back into the lightguide and absorb a second portion of incident light. In one embodiment, the light reflecting or light absorbing material is in the form of a line of ink or tape adhered onto the surface of the lightguide film. In one embodiment, the light reflecting material is a specularly reflecting tape adhered to the top surface, edge, and bottom surface of the lightguide near the edge of the lightguide. In another embodiment, the light absorbing material is a light absorbing tape adhered to the top surface, edge, and bottom surface of the lightguide near the edge of the lightguide. In another embodiment, the light absorbing material is a light absorbing ink or paint (such as a black acrylic based paint) adhered to at least one selected from the group of the edge, the top surface near the edge, and the bottom surface near the edge of the lightguide film.

In one embodiment, the light emitting device is a backlight illuminating a display or other object to be illuminated and the light emitting region, lightguide, or lightguide region is disposed between a reflective surface or element and the object to be illuminated. In another embodiment, the reflective element is a voided white PET film such as TETORON® film UX Series from TEIJIN (Japan). In one embodiment, the reflective element or surface has a diffuse reflectance d/8 with the specular component included (DR-SCI) measured with a Minolta CM508D spectrometer greater than one selected from the group of 60%, 70%, 80%, 90%, and 95%. In another embodiment, the reflective element or surface has a diffuse reflectance d/8 with the specular component excluded (DR-SCE) measured with a Minolta CM508D spectrometer greater than one selected from the group of 60%, 70%, 80%, 90%, and 95%. In another embodiment, the reflective element or surface has a specular reflectance greater than one selected from the group of 60%, 70%, 80%, 90%, and 95%. The specular reflectance, as defined herein, is the percentage of light reflected from a surface illuminated by a 532 nanometer laser that is within a 10 degree (full angle) cone centered about the optical axis of the reflected light. This can be measured by using an integrating sphere wherein the aperture opening for the integrating sphere is positioned at a distance from the point of reflection such that the angular extent of the captured light is 10 degrees full angle. The percent reflection is measured against a reflectance standard with a known specular reflectance, a reflectance standard, film, or object that have extremely low levels of scattering.

Light Reflecting Optical Element is Also a Second Element

In addition to reflecting incident light, in one embodiment, the light reflecting element is also at least one second element selected from the group of light blocking element, low contact area covering element, housing element, light collimating optical element, light turning optical element and thermal transfer element. In another embodiment, the light reflecting optical element is a second element within a region of the light reflecting optical element. In a further embodiment, the light reflecting optical element comprises a bend region, tab region, hole region, layer region, or extended region that is, or forms a component thereof, a second element. For example, a diffuse light reflecting element comprising a voided PET diffuse reflecting film may be disposed adjacent the lightguide region to provide diffuse reflection and the film may further comprise a specular reflecting metallized coating on an extended region of the film that is bent and functions to collimate incident light from the light source. In another embodiment, the second element or second region of the light reflecting optical element is contiguous with one or more regions of the light reflecting optical element. In a further embodiment, the light reflecting optical element is a region, coating, element or layer physically coupled to a second element. In another embodiment, the second element is a region, coating, element or layer physically coupled to a light reflecting optical element. For example, in one embodiment, the light reflecting optical element is a metalized PET film adhered to the back of a transparent, low contact area film comprising polyurethane and a surface relief profile wherein the film combination extends from beneath the lightguide region to wrap around one or more coupling lightguides. In a further embodiment, the light reflecting optical element is physically and/or optically coupled to the film-based lightguide and is cut during the same cutting process that generates the coupling lightguides and the light reflecting optical element is cut into regions that are angled, curved or subsequently angled or curved to form a light collimating optical element or a light turning optical element. In another embodiment, the light reflecting optical element may be optically coupled to the film-based lightguide by a pressure sensitive adhesive and the light reflecting optical element may diffusely reflect, specularly reflect, or a combination thereof, a portion of the incident light. The size, shape, quantity, orientation, material and location of the tab regions, light reflecting regions or other regions of the light reflecting optical element may vary as needed to provide optical (efficiency, light collimation, light redirection, etc.), mechanical (rigidity, connection with other elements, alignment, ease of manufacture etc.), or system (reduced volume, increased efficiency, additional functionality such as color mixing) benefits such as is known in the art of optical elements, displays, light fixtures, etc. For example, the tab regions of a light reflecting optical element that specularly reflects incident light may comprise a parabolic, polynomial or other geometrical cross-sectional shape such that the angular FWHM intensity, light flux, orientation, uniformity, or light profile is controlled. For example, the curved cross-sectional shape of one or more tab regions may be that of a compound parabolic concentrator. In another embodiment, the light reflecting optical element comprises hole regions, tab regions, adhesive regions or other alignment, physical coupling, optical coupling, or positioning regions that correspond in shape, size, or location to other elements of the light emitting device to facilitate at least one selected from the group of alignment, position, adhesion, physically coupling, and optically coupling with a second element or component of the light emitting device. For example, the light reflecting optical element may be a specularly reflecting or mirror-like metallized PET that is disposed beneath a substantially planar light emitting region and extends into the region near the light source and comprises extended tabs or folding regions that fold and are optically coupled to at least one outer surface of a light collimating element. In this embodiment, the light reflecting optical element is also a component of a light collimating optical element. In another embodiment, the light reflecting optical element is a specularly reflecting metallized PET film that is optically coupled to a non-folded coupling lightguide using a pressure sensitive adhesive and is extended toward the light source such that the extended region is optically coupled to an angled surface of a light collimating optical element that collimates a portion of the light from the light source in the plane perpendicular to the plane comprising the surface of the non-folded coupling lightguide optically coupled to the light reflecting optical element.

In one embodiment, the light reflecting element is also a light blocking element wherein the light reflecting element blocks a first portion of light escaping the light input coupler, coupling lightguide, light source, light redirecting optical element, light collimating optical element, light mixing region, lightguide region. In another embodiment, the light reflecting element prevents the visibility of stray light, undesirable light, or a predetermined area of light emitting or redirecting surface from reaching the viewer of a display, sign, or a light emitting device. For example, a metallized specularly reflecting PET film may be disposed to reflect light from one side of the lightguide region back toward the lightguide region and also extend to wrap around the stack of coupling lightguide using the PSA optically coupled to the coupling lightguides (which may be a cladding layer for the lightguides) to adhere the metallized PET film to the stack and block stray light escaping from the coupling lightguides and becoming visible.

In one embodiment, the light reflecting element is also a low contact area covering. For example, in one embodiment, the light reflecting element is a metallized PET film comprising a methacrylate-based coating that comprises surface relief features. In this embodiment, the light reflecting element may wrap around the stack without significantly extracting light from the coupling lightguides when air is used as a cladding region. In another embodiment, the reflective element has non-planar regions such that the reflective surface is not flat and the contact area between the light reflecting film and one or more coupling lightguides or lightguide regions is a low percentage of the exposed surface area.

In another embodiment, the light reflecting element is also a housing element, for example, in one embodiment the light reflecting element is a reflective coating on the inner wall of the housing for the coupling lightguides. The housing may have reflective surfaces or reflect light from within (such as an internal reflecting layer or material). The light reflecting element may be the housing for the lightguide region or other lightguide or component of the light emitting device.

In a further embodiment, the light reflecting element is also a light collimating optical element disposed to reduce the angular full-width at half maximum intensity of light from a light source before the light enters one or more coupling lightguides. In one embodiment, the light reflecting optical element is a specularly reflecting multilayer polymer film (such as a giant birefringent optical film) disposed on one side of the light emitting region of lightguide film and extended in a direction toward the light source with folds or curved regions that are bent or folded to form angled or curved shapes that receive light from the light source and reflect and collimate light toward the input surface of one or more coupling lightguides. More than one fold or curved region may be used to provide different shapes or orientations of light reflecting surfaces for different regions disposed to receive light from the light source. For example, an specularly reflecting multilayer polymer film (such as a giant birefringent optical film) disposed and optically coupled to the lightguide region of a film-based lightguide using a low refractive index PSA cladding layer may extend toward the light source and comprise a first extended region that wraps around the cladding region to protect and block stray light and further comprise an extended region that comprises two tabs that are folded and a cavity wherein the light source may be disposed such that light from the light source within a first plane is collimated by the extended region tabs. In one embodiment, the use of the light reflecting element that is physically coupled to another component in the light emitting device (such as the film-based lightguide or coupling lightguides) provides an anchor or registration assistance for aligning the light collimating optical element tabs or reflective regions of the light reflecting element.

In a further embodiment, the light reflecting element is also a light turning optical element disposed to redirect the optical axis of light in a first plane. In one embodiment, the light reflecting optical element is a specularly reflecting multilayer polymer film (such as a giant birefringent optical film) disposed on one side of the light emitting region of lightguide film and extended in a direction toward the light source with folds or curved regions that are bent or folded to form angled or curved shapes that receive light from the light source and reflect and redirect the optical axis of the incident light toward the input surface of one or more coupling lightguides. More than one fold or curved region may be used to provide different shapes or orientations of light reflecting surfaces for different regions disposed to receive light from the light source. For example, a specularly reflecting multilayer polymer film (such as a giant birefringent optical film) film disposed and optically coupled to the lightguide region of a film-based lightguide using a low refractive index PSA cladding layer may extend toward the light source and comprise an first extended region that wraps around the cladding region to protect and block stray light and further comprise an extended region that comprises two tabs that are folded and a cavity wherein the light source may be disposed such that optical axis of the light from the light source within a first plane in a first direction is redirected by the extended region tabs into a second direction different than the first direction. In one embodiment, the use of the light reflecting element that is physically coupled to another component in the light emitting device (such as the film-based lightguide or coupling lightguides) provides an anchor or registration assistance for aligning the light turning optical element tabs or reflective regions of the light reflecting element.

Housing or Holding Device for Light Input Coupler

In one embodiment, a light emitting device includes a housing or holding device that holds or contains at least part of a light input coupler and a light source. The housing or holding device may house or contain within one or more of the following: a light input coupler, a light source, coupling lightguides, a lightguide, optical components, electrical components, a heat sink or other thermal components, attachment mechanisms, registration mechanisms, folding mechanisms devices, and frames. The housing or holding device may include a plurality of components or any combination of the aforementioned components. The housing or holding device may serve one or more of the following functions, as well as other suitable functions: protecting from dust and debris contamination, providing an air-tight seal, providing a water-tight seal, housing or containing components, providing a safety housing for electrical or optical components, assisting with folding or bending the coupling lightguides, assisting in aligning or holding the lightguide, coupling lightguide, light source or light input coupler relative to another component, maintaining the arrangement of the coupling lightguides, recycling light (such as with reflecting inner walls), providing attachment mechanisms for attaching the light emitting device to an external object or surface, providing an opaque container such that stray light does not escape through specific regions, providing a translucent surface for displaying indicia or providing illumination to an object external to the light emitting device, including a connector for release and interchangeability of components, and providing a latch or connector to connect with other holding devices or housings.

In one embodiment, the housing or holding device includes one or more of the following: a connector, a pin, a clip, a latch, an adhesive region, a clamp, a joining mechanism, and one or more other suitable connecting elements or mechanical means to connect or hold the housing or holding device to another housing or holding device, a lightguide, a coupling lightguide, a film, a cartridge, a removable component or components, a strip, an exterior surface such as a window or automobile, a light source, electronics or electrical components, a circuit board for the electronics or a light source such as an LED, a heat sink or one or more other suitable thermal control elements, a frame of the light emitting device, and other suitable components of the light emitting device.

In another embodiment, one or more input ends and/or one or more output ends of the coupling lightguides are held in physical contact with a relative position maintaining element by one or more of the following: magnetic grips, mechanical grips, clamps, screws, mechanical adhesion, chemical adhesion, dispersive adhesion, diffusive adhesion, electrostatic adhesion, vacuum holding, and an adhesive.

Curved or Flexible Housing

In another embodiment, the housing includes at least one curved surface. A curved surface can permit non-linear shapes or devices or facilitate incorporating non-planer or bent lightguides or coupling lightguides. In one embodiment, a light emitting device includes a housing with at least one curved surface wherein the housing includes curved or bent coupling lightguides. In another embodiment, the housing is flexible such that the housing may be bent temporarily, permanently or semi-permanently. By using a flexible housing, for example, the light emitting device may be able to be bent such that the light emitting surface is curved along with the housing, or the light emitting area may curve around a bend in a wall or corner, for example. In one embodiment, the housing or lightguide may be bent temporarily such that the initial shape is substantially restored (bending a long housing to get it through a door for example).

Housing Including a Thermal Transfer Element

In one embodiment, the housing includes a thermal transfer element disposed to transfer heat from a component within the housing to an outer surface of the housing. In another embodiment, the thermal transfer element includes one or more of the following: a heat sink, a metallic or ceramic element, a fan, a heat pipe, a synthetic jet, an air-jet producing actuator, an active cooling element, a passive cooling element, a rear portion of a metal core or other conductive circuit board, a thermally conductive adhesive, or one or more other suitable components known to thermally conduct heat. In one embodiment, the thermal transfer element has a Thermal Conductivity (W/(m·K)) Greater than One Selected from the Group of: 0.2, 0.5, 0.7, 1, 3, 5, 50, 100, 120, 180, 237, 300, and 400.

Low Contact Area Cover

In one embodiment, a low contact area cover is disposed between at least one coupling lightguide and the exterior to the light emitting device. The low contact area provides a low surface area of contact with a region of the lightguide or a coupling lightguide and may further provides one or more of the following: protection from fingerprints, protection from dust or air contaminants, protection from moisture, protection from internal or external objects that would decouple or absorb more light than the low contact area cover when in contact in one or more regions with one or more coupling lightguides, a means for holding or containing at least one coupling lightguide, holding the relative position of one or more coupling lightguides, and preventing the coupling lightguides from unfolding into a larger volume or contact with a surface that could de-couple or absorb light. In one embodiment, the low contact area cover is disposed substantially around one or more coupling lightguide stacks or arrays and facilitates one or more of the following: reducing the dust buildup on the coupling lightguides, protecting one or more coupling lightguides from frustrated total internal reflection or absorption by contact with another light transmitting or absorbing material, and preventing or limiting scratches, cuts, dents, or deformities from physical contact with other components, assemblers, or users of the device.

In one embodiment, the low contact area cover is a film with at least one of a lower refractive index than the refractive index of the outer material of the coupling lightguide disposed near the low contact area cover, and surface relief pattern or structure on the surface of the film-based low contact area cover disposed near at least one coupling lightguide. In one embodiment, the low contact area cover is a sheet, film, or component including one or more of the following: paper, fibrous film or sheet, cellulosic material, pulp, low-acidity paper, synthetic paper, flashspun fibers, flashspun high-density polyethylene fibers, and a microporous film. In another embodiment, the film material of the low contact area cover or the area of the low contact area cover in contact with the core layer of the lightguide in the light emitting region includes a material with a refractive index in a direction parallel or perpendicular to the core surface less than one selected from the group of: 1.6, 1.55, 1.5, 1.45, 1.41, 1.38, 1.35, 1.34, 1.33, 1.30, 1.25, and 1.20. In another embodiment, the film surface features that substantially prevent optical coupling include microstructured and/or nanostructured features that couple less than one selected from the group of: 40%, 30%, 20%, 10%, 5%, 2% and 1% of the incident light in the lightguide out of the lightguide. In one embodiment, the light extraction region features, the features that substantially prevent optical coupling, or the low contact area cover features include a fibrous material with a specific surface (surface/mass ratio) greater than one selected from the group of: 0.1, 0.5, 1, 5, 10, 20, 30, 40, and 50 $m^2/g$.

Lightguide Thickness and Properties

In one embodiment, the thickness of the film, lightguide and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, greater than 90% of the entire thickness of the film, a lightguide, and a lightguide region is less than 0.2 millimeters. In one embodiment, at least one selected from the group of thickness, largest thickness, average thickness, greater than 90% of the entire thickness of the film, lightguide, and lightguide region is less than 0.2 millimeters. In another embodiment, the size to thickness ratio, defined as the largest dimension of the light emitting region in the plane of the light emitting region divided by the average thickness of the core region within the light emitting region is greater than one selected from the group of 100; 500; 1,000; 3,000; 5,000; 10,000; 15,000; 20,000; 30,000; and 50,000.

In one embodiment, a light emitting device comprises a light source, a light input coupler, and a film-based lightguide wherein the average light flux density in the coupling lightguides, light mixing region, lightguide region, or light emitting region within the film-based lightguide is greater than one selected from the group of 5, 10, 20, 50, 100, 200, 300, 500, and 1000 lumens per cubic millimeter. In another embodiment, a light emitting device comprises a light source, a light input coupler, and a film-based lightguide wherein the maximum light flux density in the coupling lightguides, light mixing region, lightguide region, or light emitting region within the film-based lightguide is greater than one selected from the group of 5, 10, 20, 50, 100, 200, 300, 500, and 1000 lumens per cubic millimeter. The flux density in a region is measured by cutting an optical quality edge perpendicular to the surface at the region and masking off the area around the region (using light absorbing materials such that light is not substantially reflected back into the film) and measuring the far field luminous intensity using a goniophotometer.

Optical Properties of the Lightguide or Light Transmitting Material

With regards to the optical properties of lightguides or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide). In one embodiment, an average luminous transmittance of the lightguide measured within at least one of the light emitting region, the light mixing region, and the lightguide according to ASTM D1003 with a BYK Gardner haze meter is greater than one selected from the group of: 70%, 80%, 88%, 92%, 94%, 96%, 98%, and 99%; the average haze is less than one selected from the group of: 70%, 60%, 50%, 40%, 30%, 20%, 10%, 5% and 3%; and the average clarity is greater than one selected from the group of: 70%, 80%, 88%, 92%, 94%, 96%, 98%, and 99%.

Refractive Index of the Light Transmitting Material

In one embodiment, the core material of the lightguide has a high refractive index and the cladding material has a low refractive index. In one embodiment, the core is formed from a material with a refractive index (nD) greater than one selected from the group of: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index (nD) of the cladding material is less than one selected from the group of: 1.1, 1.2, 1.3, 1.4, 1.5, 1.6, 1.7, 1.8, 1.9, 2.0, 2.1, 2.2, 2.3, 2.4, and 2.5.

In one embodiment, the core or the cladding or other light transmitting material may be a thermoplastic, thermoset, rubber, polymer, silicone or other light transmitting material. Optical products can be prepared from high index of refraction materials, including monomers such as high index of refraction (meth)acrylate monomers, halogenated monomers, and other suitable high index of refraction monomers as are known in the art.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the lightguide region of the film is substantially in the shape of a rectangle, a square, a circle, a toroid or doughnut (elliptical with a hole in the inner region), an ellipse, a linear strip, or a tube (with a circular, rectangular, polygonal, or other suitable shaped cross-section). In one embodiment, a light emitting device includes a lightguide formed from a film into a hollow cylindrical tube including coupling lightguide strips branching from the film on a short edge toward an inner portion of the cylinder. In another embodiment, a light emitting device includes a film lightguide with coupling lightguides cut into the film so that the coupling lightguides remain coupled to the lightguide region and the central strip is not optically coupled to the lightguide and provides a spine with increased stiffness in at least one direction near the central strip region or lightguide region near the strip.

Tiled Lightguides

In a further embodiment, a light emitting device includes lightguides with light input couplers arranged such that the light source is disposed in the central region of the edge of the lightguide, and the light input coupler (or a component thereof) does not extend past the edge to enable the lightguides to be tiled in a suitable array, such as a 1×2, 2×2, 2×3, 3×3, or larger array. In another embodiment, a light emitting device includes light emitting lightguides with a low separation distance wherein the separation between the lightguides in at least one direction along the light emitting surface is less than one selected from the group of: 10 mm, 5 mm, 3 mm, 2 mm, 1 mm and 0.5 mm.

In one embodiment, the light emitting device includes a linear array of lightguides in a first direction. In another embodiment, a light emitting device includes a linear array of lightguides in a first direction and a linear array of lightguides in a second direction orthogonal to the first direction. In a further embodiment, a light emitting device includes a rectangular matrix of lightguides. In light emitting devices including tiled lightguides, the light input couplers, the coupling lightguides, and/or the one or more light sources may be disposed along the periphery of the tiled lightguides, between the lateral edges of the lightguides along the side of the lightguide, folded back toward the central region between the lateral edges, or folded underneath or above the lightguide to permit a low separation distance between the lightguides and/or light emitting regions.

In another embodiment, the lightguide includes a single fold or bend near an edge of the lightguide such that the lightguide folds under or over onto and optically coupled to itself. In this embodiment, light which would ordinarily be lost at the edge of a lightguide may be further extracted from the lightguide after the fold or bend to increase the optical efficiency of the lightguide or device. In another embodiment, the light extraction features on the lightguide disposed in the optical path of the light within the lightguide after the fold or bend near an edge provide light extraction features that increase one or more of the following: a luminance, a luminance uniformity, a color uniformity, an optical efficiency, an image or logo clarity and resolution.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters containing an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer. In one embodiment, a thermoset material is coated onto a thermoplastic film wherein the thermoset material is the core material and the cladding material is the thermoplastic film or material. In another embodiment, a first thermoset material is coated onto a film including a second thermoset material wherein the first thermoset material is the core material, and the cladding material is the second thermoset plastic. In one embodiment, the coupling lightguides include a core material including a glass material. In one embodiment, the glass material is one selected from the group of: fused silica, synthetic amorphous silicon dioxide, optical grade fused quartz, synthetic fused silica, borosilicate glass, crown glass, and aluminoborosilicate glass. In another embodiment, the core material includes a glass which is coated, or has an organic material applied to one or more of the following: an edge, a top surface, and a bottom surface. In one embodiment, the coating on the glass functions to provide a cladding region, increase impact resistance, and/or provide increased flexibility.

Outermost Surface of the Film or Lightguide

In one embodiment, the outermost surface of the film, lightguide or lightguide region includes one or more of the following: cladding, surface texture to simulate a soft feel or match the surface texture of cloth or upholstery, a refractive element to redirect or collimate light from the light extraction features (such as microlens array), an adhesive layer, a removable backing material, an anti-reflection coating or surface, an anti-glare coating or surface, and a rubber surface. In one embodiment, the outermost surface of the film, lightguide, light emitting film, light redirecting element, or light emitting device includes surface relief features and the ASTM D523-89 60 degree gloss of the surface is less than one selected from the group of: 100, 50, 25, and 15 gloss units. In one embodiment, the gloss on the outer surface reduces ambient glare light intensity that would highlight the surface. For example, in one embodiment, the light emitting device includes a lightguide with an outermost surface with a uniform low gloss of 2 gloss units. When this lightguide is disposed on a wall with a matte or diffusing surface with a gloss of about 2 gloss units, the substantially transparent lightguide with high visible light transmittance is nearly invisible, even at glare angles from light sources due to the matching of the gloss of the outermost surface. In this embodiment, the light emitting device is significantly less visible in the off-state in an application such as a wall mounted light fixture. In one embodiment, the outermost surface with the low gloss is a surface of an anti-glare film, embossed film, cladding layer, light redirecting element, light turning optical element, light collimating optical element, lightguide, core region (where there is no cladding surface on that side of the core region), light re-directing element, light emitting device cover, lens, or a housing element.

In one embodiment, the outermost surface of the film, lightguide, light emitting film, light redirecting element, or light emitting device has an ASTM D523-89 60 degree gloss greater than one selected from the group of: 50, 70, 90, 100, and 110 gloss units. In this embodiment, the high gloss can match a glossy surface such as a window, glass partition, or metal surface, for example, such that the component is less visible in the off state at glare angles. In another embodiment, a kit includes a light emitting device and one or more films with gloss levels different from a region of the outermost surface of the light emitting device that may be attached to an outermost surface region of the light emitting device to allow a choice of gloss level for the new outermost surface. For example, a film with the correct gloss level may be chosen to match the gloss level of the wall adjacent the light emitting device.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45 degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove) or the light extraction feature may be a substantially diffusely reflective ink such as an ink including titanium dioxide particles within a methacrylate-based binder.

In one embodiment, the light extraction feature is a protruding feature on a film or component that is applied to the core or cladding region of a lightguide. In one embodiment, the light extraction features are protrusions from a film that are pressed into a thin cladding such that the separation between the core and the cladding is reduced such that the evanescent penetration depth of light in the cladding permits frustration of a first portion of the light into the material of the light extraction feature (or scattering therefrom in the case of a scattering light extraction feature such as a $TiO_2$ particle). In one embodiment, a lightguide includes a high refractive index core layer and a compressible, thin low refractive index material such that when a force greater than one selected from the group of: 1, 2, 5, 10, 20, 40, and 50 pounds per square inch, a first portion of light is frustrated from the lightguide. For example, in one embodiment, a light extraction film including a pattern of light scattering ink including $TiO_2$ particles is physically coupled to a compressible fluoropolymer cladding with a first thickness on a film-based lightguide including a polycarbonate core layer. A glass plate compresses the light extraction film onto the cladding layer such that the thickness of the cladding layer reduces to a second thickness and a first portion of the light from the lightguide is scattered from the lightguide due to the evanescent coupling of the light through the cladding to the light scattering ink.

In one embodiment, a light extraction feature film includes protruding light extraction features that adhere to the core region and function as standoffs and adhesion locations to hold the light extraction feature film in place and to protect the light emitting region. In this embodiment, an air cladding is disposed between the light extraction features along the surface of the core layer. For example, in one embodiment, a light emitting device includes a light extraction feature film having 100 micron protrusions made of light scattering ink and a pressure sensitive adhesive disposed in a pattern on the surface of a polyethylene terephthalate (PET) film. The light extraction feature film is laminated to the core layer and bonded in the light extraction feature adhesive protrusions. In this embodiment, the light extraction feature film protects the core layer from scratches or dust/dirt accumulation that can occur during assembly, shipping or end-use.

In one embodiment, the light extraction features comprise an ink or material within a binder comprising least one selected from the group of titanium dioxide, barium sulfate, metal oxides, microspheres or other non-spherical particles comprising polymers (such as PMMA, polystyrene), rubber, or other inorganic materials. In one embodiment, the ink or material is deposited by one selected from the group of thermal inkjet printing, piezoelectric inkjet printing, continuous inkjet printing, screen printing (solvent or UV), laser printing, sublimation printing, dye-sublimation printing, UV printing, toner-based printing, LED toner printing, solid ink printing, thermal transfer printing, impact printing, offset printing, rotogravure printing, photogravure printing, offset printing, flexographic printing, hot wax dye transfer printing, pad printing, relief printing, letterpress printing, xerography, solid ink printing, foil imaging, foil stamping, hot metal typesetting, in-mold decoration, and in-mold labeling.

Visibility of Light Extraction Features

In one embodiment, at least one light extraction region includes light extraction features which have a low visibility to the viewer when the region is not illuminated by light from within the lightguide (such as when the device is in the off-state or the particular lightguide in a multi-lightguide device is not illuminated). In one embodiment, the luminance at a first measurement angle of one or more of a lightguide region, a square centimeter measurement area of the light emitting surface corresponding to light redirected by at least one light extraction feature, a light emitting region, a light extraction feature, and a light extracting surface feature or collection of light extraction features is less than one selected from the group of: $0.5$ $cd/m^2$, $1$ $cd/m^2$, $5$ $cd/m^2$, $10$ $cd/m^2$, $50$ $cd/m^2$, and $100$ $cd/m^2$ when exposed to diffuse illuminance from an integrating sphere of one selected from the group of: 10 lux, 50 lux, 75 lux, 100 lux, 200 lux, 300 lux, 400 lux, 500 lux, 750 lux, and 1000 lux when place over a black, light absorbing surface. Examples of a suitable light absorbing surface include, without limitation, a black velour cloth material, a black anodized aluminum, a material with a diffuse reflectance (specular component included) less than 5%, and a window to a light trap box (a box with light absorbing black velour or other material lining the walls). In one embodiment, the first measurement angle for the luminance is one selected from the group of 0 degrees, 5 degrees, 8 degrees, 10 degrees, 20 degrees, 40 degrees, 0-10 degrees, 0-20 degrees, 0-30 degrees, and 0-40 degrees. In one embodiment, the luminance of the light emitted from a 1 $cm^2$ measurement area of the light emitting surface corresponding to light redirected by at least one light extracting feature is less than 100 cd/m2 when exposed to a diffuse illuminance of 200 lux from an integrating sphere when placed over Light Absorbing Black-Out Material from Edmund Optics. In another embodiment, the luminance of the light emitted from a 1 $cm^2$ measurement area of the light emitting surface corresponding to light redirected by at least one light extracting feature is less than 50 $cd/m^2$ when exposed to a diffuse illuminance of 200 lux from an integrating sphere when placed over Light Absorbing Black-Out Material from Edmund Optics Inc. In another embodiment, the luminance of the light emitted from a 1 $cm^2$ measurement area of the light emitting surface corresponding to light redirected by at least one or an average of all light extracting features is less than 25 $cd/m^2$ when exposed to a diffuse illuminance of 200 lux from an integrating sphere when placed over Light Absorbing Black-Out Material from Edmund Optics. In one embodiment, the thin lightguide film permits smaller features to be used for light extraction features or light extracting surface features to be spaced further apart due to the thinness of the lightguide. In one embodiment, the average largest dimensional size of the light extracting surface features in the plane parallel to the light emitting surface corresponding to a light emitting region of the light emitting device is less than one selected from the group of: 3 mm, 2 mm, 1 mm, 0.5 mm, 0.25 mm, 0.1 mm, 0.080 mm, 0.050 mm, 0.040 mm, 0.025 mm, and 0.010 mm.

In one embodiment, the individual light extracting surface features, regions, or pixels are not discernable as an individual pixel when the device is emitting light in an on state and is not readily discernable when the light emitting device is in the off state when viewed at a distance greater than one selected from the group of 10 centimeters, 20 centimeters, 30 centimeters, 40 centimeters, 50 centimeters, 100 centimeters, and 200 centimeters. In this embodiment, the area may appear to be emitting light, but the individual pixels or sub-pixels cannot be readily discerned from one another. In another embodiment, the intensity or color of a light emitting region of the light emitting device is controlled by spatial or temporal dithering or halftone printing. In one embodiment, the average size of the light extracting regions in a square centimeter of a light emitting region on the outer surface of the light emitting device is less than 500 microns and the color and/or luminance is varied by increasing or decreasing the number of light extracting regions within a predetermined area. In one embodiment, the luminance of the light extraction region or light extraction features is less than one selected from the group of 1, 5, 10, 20, and 50 $Cd/m^2$ when viewed normal to the surface from the side with the light extraction features or the side without the light extraction features with the light source not emitting light and under 50 lux ambient illumination.

In one embodiment, the light emitting device is a sign with a light emitting surface comprising at least one selected from the group of light emitting regions, light extracting regions, and light extraction feature which is not readily discernable by a person with a visual acuity between 0.5 and 1.5 arcminutes at a distance of 20 cm when illuminated with 200 lux of diffuse light in front of Light Absorbing Black-Out Material from Edmund Optics Inc.

In another embodiment, the fill factor of the light extracting features, defined as the percentage of the area comprising light extracting features in a square centimeter in a light emitting region, surface or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region is all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

In another embodiment, the light emitting device is a sign with a light emitting surface comprising light emitting regions wherein when the device is not emitting light, the angle subtended by two neighboring light extracting features that are visible when the device is on, at a distance of 20 cm is less than one selected from the group of 0.001 degrees, 0.002 degrees, 0.004 degrees, 0.008 degrees, 0.010 degrees, 0.015 degrees, 0.0167 degrees, 0.02 degrees, 0.05 degrees, 0.08 degrees, 0.1 degrees, 0.16 degrees, 0.2 degrees, 0.3 degrees, 0.4 degrees, 0.5 degrees, 0.6 degrees, 0.7 degrees, 0.8 degrees, 1 degree, 2 degrees, and 5 degrees. In another embodiment, the light emitting device is a sign with a light emitting surface comprising light emitting regions wherein when the device is not emitting light, the angle subtended by two neighboring light extracting features (that are which are not easily visible when the device is off when illuminated with 200 lux of diffuse light) at a distance of 20 cm is less than one selected from the group of 0.3 degrees, 0.4 degrees, 0.5 degrees, 0.6 degrees, 0.7 degrees, 0.8 degrees, 1 degree, 2 degrees, and 5 degrees.

In a further embodiment, the light extraction features of the light emitting device comprise light scattering domains of a material with a different refractive index than the surrounding material. In one embodiment, the light scattering domain has a concentration within the continuous region having light scattering domains (such as an inkjet deposited white ink pixel) less than one selected from the group of 50%, 40%, 30%, 20%, 10%, 5%, 3%, 1%, 0.5%, and 0.1% by volume or weight. The concentration or thickness of the light scattering domains may vary in the x, y, or z directions and the pixel or region may be overprinted to increase the thickness. In another embodiment, the light extracting features have a light absorbing region disposed between the light extracting feature and at least one output surface of the light emitting device. For example, the light extracting features could be titanium dioxide based white inkjet deposited pixels deposited on a lightguide and the light absorbing ink (such as a black dye or ink comprising carbon black particles) is deposited on top of the white ink such that 50% of the light scattered from the white pixel is transmitted through the light absorbing ink. In this example, the ambient light that would have reflected from the white ink if there were no light absorbing ink is reduced by 75% (twice passing through the 50% absorbing ink) and the visibility of the dots is reduced while sufficient light from the lightguide is emitted from the light emitting device in the region near the white pixel. In another embodiment, a low light transmission, light absorbing material absorbing at least one selected from the group of 5%, 10%, 20%, 30%, 40%, 50%, 60%, and 70% of the light emitted from a first light extracting feature is disposed between the light extracting feature and at least one outer surface of the light emitting device.

In a further embodiment, the light extraction region is designed to be substantially visible from only one side. In one embodiment, the light extraction features are disposed on the non-viewing side of the light emitting device between a low light transmission region and the lightguide. For example, in one embodiment, the light extraction regions are printed white ink regions with light absorbing black ink overprinted on the white ink regions. In this embodiment, the white ink scatters light out of the lightguide on the opposite side and a significant portion of the light transmitted through the white ink is absorbed by the black ink. In another embodiment, the light extraction regions comprise surface relief patterns on one side of a lightguide and a low light transmission film, such as a black PET film, is substantially cut in the shape of the extraction regions and disposed adjacent the light extraction regions. In another embodiment, the low light transmission region does not conform to the shape of the light extraction regions. For example, in one embodiment, a light emitting device comprises a light source, lightguide, light input coupler, and a square black PET film is laminated to cladding layer which is laminated to a circular shaped logo pattern of white ink regions and the lightguide. In this embodiment, the white ink pattern is visible from the side opposite the side of the lightguide comprising the black PET film and is not substantially visible from the side comprising the black PET film when the light source is turned on. In a further embodiment, the luminance of the light emitting display is less than one selected from the group of 1, 5, 10, 20, and 50 $Cd/m^2$ when viewed normal to the surface from the side of the lightguide comprising the low light transmission film. In a further embodiment, the luminance of the light emitting display is greater than one selected from the group of 50, 75, 100, 200, and 300 $Cd/m^2$ when viewed normal to the surface from the side of the lightguide comprising the low light transmission film. In another embodiment, the luminance of the low light transmission region is less than one selected from the group of 1, 5, 10, 20, and 50 $Cd/m^2$ when viewed normal to the surface from the side of the lightguide comprising the low light transmission film with the light source not emitting light and under 50 lux ambient illumination.

In another embodiment, the light extraction region comprising the light extraction features is designed to be visible or legible from two opposite directions. For example, in one embodiment, an image or graphic based light extraction region is substantially symmetric such that it is visually perceptible and correct when viewed from either side of a window to which it is optically coupled or adjacent. In another embodiment, the light emitting device comprises two lightguides with a low light transmission region disposed in a region between the lightguides. In the previous embodiment, for example, a black polyester film layer may be disposed between the lightguides (and between the cladding layers of the two lightguides) in the regions behind the light extraction region in the form of readable text such there is a black or opaque background and the light emitting text is visible and easily legible from either side. In one embodiment, the low light transmission region has an average transmittance across the wavelengths of light emitted by the light emitting device less than one selected from the group of 70%, 60%, 50%, 40%, 30%, 20%, 10% and 5% measured by collimating light from the light sources used in the light emitting device and measuring the total transmittance in the equipment setup prescribed in the ASTM D1003 standard.

In one embodiment, the thickness of the lightguide or core layer at the light extraction feature in a first direction selected from the group of perpendicular to the light emitting surface of the lightguide, perpendicular to the optical axis of the light within the lightguide at the light extraction feature, and perpendicular to the direction of light traveling in the lightguide at the light extraction feature divided by the length of one or more light extraction features in a first direction parallel to the direction of light traveling in the lightguide or parallel to the optical axis of the light within the lightguide is greater than one selected from the group of 1, 2, 5, 10, 15, 20, and 50.

In one embodiment, the lightguide comprises a coating or layer disposed in optical contact with the lightguide comprising the light extraction features. In one embodiment, for example, a UV curable methacrylate-based coating is coated onto a silicone-based lightguide and is cured in when in contact with an embossing drum such that the light extraction features are formed on the coating on the silicone-based lightguide. Various UV curable coatings are suitable for use in this embodiment, and the refractive index, light transmission properties, adhesion properties, and scattering properties are known in the optical film industry.

In one embodiment, the lateral dimension of one or more light extraction features in the light emitting region in a direction parallel to the optical axis of the light within the lightguide at the light extraction feature is less than one selected from the group of 1 mm, 500 microns, 250 microns, 200 microns, 150 microns, 100 microns, 75 microns, 50 microns, 25 microns, 20 microns, 10 microns, 5 microns, 2 microns, 1 microns, 0.5 microns, and 0.3 microns. In another embodiment, the average lateral dimension of the light extraction features in the light emitting region in a direction parallel to the optical axis of the light within the lightguide at the light extraction feature is less than one selected from the group of 1 mm, 500 microns, 250 microns, 200 microns, 150 microns, 100 microns, 75 microns, 50 microns, 25 microns, 20 microns, 10 microns, 5 microns, 2 microns, 1 microns, 0.5 microns, and 0.3 microns. In another embodiment, the fill factor of the light extracting features, defined as the percentage of the area comprising light extracting features in a square centimeter in a light emitting region, surface or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region is all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

In a further embodiment, the light extraction region is designed to be substantially visible from only one side. In one embodiment, the light extraction features are disposed on the non-viewing side of the light emitting device between a low light transmission region and the lightguide. For example, in one embodiment, the light extraction regions are printed white ink regions with light absorbing black ink overprinted on the white ink regions. In this embodiment, the white ink scatters light out of the lightguide on the opposite side and a significant portion of the light transmitted through the white ink is absorbed by the black ink.

Visible Light Extraction Features Also Providing Illumination

In one embodiment, the light from the light extraction features provides illumination of an object or surface and the light extraction features provide a visible pattern, logo, indicia or graphic. In one embodiment a first percentage of light exiting the lightguide due to the light extraction features illuminates a surface, object or region, and the second percentage of light exits the lightguide in a pattern, logo, indicia, or graphic and is visible directly. In another embodiment, a first percentage of light exiting a light emitting device from the first surface of the lightguide illuminates a surface, object, or region and a second percentage of light exits the light emitting device from the second surface of the lightguide opposite the first surface and the light extraction features form a visible pattern, logo, indicia, or graphic. For example, in one embodiment, a printed white ink light extraction region on one side of a lightguide with a diffuse reflectance of about 60% (measured from the air side and not through the lightguide), reflects a first percentage (approximately 30%) of incident light out of the lightguide toward a viewing side, transmits approximately 40% through the light extraction features out of the lightguide to illuminated a product in a POP display, and approximately 30% of the reflected light remains within the lightguide.

Protective Layers

In one embodiment, at least one selected from the group of the light input surface, light input coupler, coupling lightguide, lightguide region, and lightguide comprises a protective element or layer optically coupled to it, physically coupled to it, disposed adjacent to it, or disposed between it and a light emitting surface of the light emitting device. A protective film element can have a higher scratch resistance, higher impact resistance, hardcoating layer, impact absorbing layer or other layer or element suitable to protect at least one selected from the group of light input surface, light input coupler, coupling lightguide, lightguide region, and lightguide from scratches, impacts, dropping the device, and interaction with sharp objects, etc. In another embodiment, at least one outer surface region of the lightguide (or layer thereof) comprises a removable protective film or masking film. For example, in one embodiment, a film based lightguide comprises removable protective polyethylene films physically coupled to the cladding regions on either side of a core region. In another embodiment, one of the cladding regions is an adhesive and the protective polyethylene film prevents contamination of the adhesive before the film is adhered to a window, for example, and the other cladding region comprises a "hardcoat" coating with a pencil hardness greater than 2H where the protective polyethylene film prevents scratches before installation of the light emitting device.

Removable and Replaceable Light Extraction Region

In one embodiment, a light emitting device includes a light extraction region that may be removed and replaced on a film-based lightguide or repositioned on a film-based lightguide. In another embodiment, the light extraction region is a film or component including light extraction features that is physically and optically coupled to the lightguide such that light travels within the lightguide in a waveguide condition and is extracted by the light extraction features in the light extraction region. In another embodiment, the light extraction region includes light extraction surface features such that when the features are in contact with the film-based lightguide, a portion of the light incident on the light extraction surface features is redirected into an angle such that light escapes the film-based lightguide. In another embodiment, the light extraction region on the film or component has a protective region or film that can be removed prior to adhering the light extraction region to the film-based lightguide. In another embodiment, the light extraction region is adhered to the film-based lightguide using a low peel strength adhesive, static bond or other low strength bond. In one embodiment, the light extraction layer or region has an ASTM D 903 (modified for 72 hour dwell time) peel strength to standard window glass less than one selected from the group of: 70 oz/in, 50 oz/in, 40 oz/in, 30 oz/in, 20 oz/in and 10 oz/in. In another embodiment, the adhesive, when adhered to glass, will support the weight of the light emitting device. For example, the film-based lightguide may be a polycarbonate film and the light extraction region may be a PVC or silicone-based film that can be disposed onto the film-based lightguide such that the light extraction region extracts light from the lightguide. In another embodiment, a first light extraction region forms indicia from white ink light extraction features on a silicone-based film. In this embodiment, the silicone-based film is removed by peeling the silicone-based film away from a silicone film-based lightguide. In this embodiment, the first light extraction region is replaced with a new light extraction region including embossed features on the surface of a new silicone film with the features oriented toward the silicone film-based lightguide where the light extraction region includes a low refractive index protective cladding region, layer or film on the opposite side. In this embodiment, the surface light extraction features on the light extraction region essentially become volumetric light extraction features for the lightguide which is formed from the combination of the silicone-based light extraction region and the silicone film-based lightguide. In a further embodiment, the adhesive may be removed from the two components to which the adhesive is designed to combine. For example, in one embodiment, the adhesive film or component may be removed from window glass and a region of the lightguide. In another example, the adhesive film or component may be removed from the light extraction region and the lightguide. In one embodiment, the light extraction region maintains sufficient adhesion during normal operation and can be removed permitting reuse of a component or region. For example, in one embodiment, the adhesive may be removed (by peeling for example) from the lightguide film such that a new adhesive film may be used with the light extraction region to apply the light extraction region to another surface without dirt, contamination, or blemishes from the previous adhesion. In the previous example, this could be advantageous when one wishes to change a light emitting device window display using a film-based lightguide from displaying a Thanksgiving holiday image in the light extraction film to a Christmas holiday image in a different light extraction film, for example. In another embodiment, the adhesive layer, region, or material may be cleaned, such as washing in soap and water, for example) and reused to reapply the light extraction region to the lightguide.

In one embodiment, the light emitting device includes a cladding region on the lightguide that may be removed or peeled back from the core region of the lightguide such that the light extraction region (or film including light extraction features) may be added. In another embodiment, the light emitting device includes a lightguide optically coupled to a first light extraction region, and the first light extraction region is peeled off and a second light extraction region is optically coupled to the lightguide. In one embodiment, the cladding layer is physically coupled to the housing or lightguide along one edge or region such that when peeled back, the relative alignment and position is maintained for reapplying the cladding layer. For example, in one embodiment, the cladding layer is bonded with a high strength adhesive along the top end of a core region and is coupled to the region below the top end of the lightguide by a low tack adhesive or adhesive with low peel strength that enables the cladding layer to be readily peeled back by hand.

In one embodiment, the light extraction region includes a light transmitting film with an arrangement of light extraction features disposed within or upon a surface. In one embodiment, one or more of the light extraction region, the core region, and the cladding layer has adhesive properties. In another embodiment, the adhesive properties are "low tack" such as those typical with silicone, "static cling film" based on polyvinyl chloride with relatively high plasticizer content, or adhesives with low peel strength.

In another embodiment, the light extraction region is an ink or other suitable transferable material that can be transferred onto the film-based lightguide. For example, a film including an ink pattern with an adhesive component could be transferred onto the film-based lightguide by lamination or pressing the film against the film-based lightguide. The carrier or transfer media supporting the transfer material or feature may be a film, plastic, metal or other flexible or rigid material. For example, the transfer material may be an embossed metal plate that is pressed against the film-based lightguide to transfer a surface pattern from the metal to the film-based lightguide to create surface relief light extraction features. In another embodiment, the transfer material is a thin layer of a coating that can be released from or physically bonded to the light extraction region or features. In another embodiment, the light extraction region has a carrier film, layer or region that can be removed subsequent to optically coupling the light extraction features to the film-based lightguide or the light extraction region may remain physically coupled to the light extraction features. In one embodiment, the light extraction region of the lightguide includes light extraction films of a variety of shapes and the light extraction features or light extraction regions including the light extraction features may also be a variety of shapes to achieve a desired appearance or particular spatial or angular light output profile from the light emitting device. In another embodiment, the light emitting device includes a plurality of light extraction films or regions disposed to couple light out of the lightguide at specific locations or orientations that are predetermined or user configurable or reconfigurable.

In another embodiment, a sign or display kit includes a light input coupler, a film-based lightguide and one or more light extraction films such that the user may chose the particular light extraction region film to dispose on the film-based lightguide. In another embodiment, the light extraction film includes an alignment feature that indicates the correct side of the light extraction film to be optically coupled to the film-based lightguide. For example, a silicone light extraction film includes a printed ink pattern underneath a removable protective film on one side, a low refractive index cladding region on the opposite side, and a notch cut from one corner. The user is instructed (through instructions or diagrams for example) to peel away the protective films from the silicone film-based lightguide and the silicone light extraction film and position the notch on the silicone light extraction film in the bottom left corner on the side of the silicone film-based lightguide that is opposite the side of the light input coupler, for example. Other alignment features or guides including printed inks patterns, registration marks, grooves, apertures and/or holes, for example, may be used.

In one embodiment, the light extraction region includes film surface features that substantially prevent optical coupling in first regions, and light coupling or light extraction regions that redirect light to angles not supported by the lightguide or transmit light to light extraction regions. In one embodiment, the film surface features that substantially prevent optical coupling are low contact area cover features.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices comprised of smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Other Components

In one embodiment, the light emitting device includes one or more of the following: a power supply, batteries (which may be aligned for a low profile or low volume device), a thermal transfer element (such as a heat sink, heat pipe, or stamped sheet metal heat sink), a frame, a housing, a heat sink extruded and aligned such that the heat sink extends parallel to at least one side of the lightguide, multiple folding or holding modules along a thermal transfer element or heat sink, a thermal transfer element exposed to thermally couple heat to a surface external to the light emitting device, a solar cell capable of providing power, communication electronics (such as needed to control light sources, color output, input information, remote communication, Wi-Fi control, Bluetooth® control, and/or wireless internet control, for example), a magnet for temporarily affixing the light emitting device to a ferrous or suitable metallic surface, a motion sensor, a proximity sensor, forward and backwards oriented motion sensors, an optical feedback sensor (including photodiodes or LEDs employed in reverse as detectors), controlling mechanisms such as switches, dials, keypads (for functions such as on/off, brightness, color, color temp, presets (for color, brightness, and/or color temp, for example), wireless control, externally triggered switches (door closing switch for example), synchronized switches, and light blocking elements to block external light from reaching the lightguide or lightguide region or to block light emitted from a region of the light emitting device from being seen by a viewer. In one embodiment, the light emitting device is designed to be powered by an automobile's electrical system or a 12 volt DC power battery or power supply. For example, in one embodiment, a light fixture includes a light source such as a linear array of LEDs directing light upwards and a light input surface disposed to receive light propagating with a component upwards and direct the light through coupling lightguides to a light emitting region disposed on the underside of the light fixture. In this embodiment, for example, a linear pendant luminaire can direct light upwards and provide illumination directly downwards using the lightguide film and coupling lightguides. Similarly, a wall washing light fixture that directs light upwards may emit light horizontally or downwards using the coupling lightguides and lightguide to redirect an angular range of the light output of the light source into the lightguide and out of the lightguide in a different angular range.

Motion Sensor

In another embodiment, the light emitting device includes a motion sensor. Types of motion sensors include passive infrared sensors, active infrared sensors, ultrasonic motion sensors, and microwave motion sensors. In one embodiment, the motion sensor is disposed to receive radiation passing through the film-based lightguide or from within the film-based lightguide (such as when exterior light is redirected into the lightguide by the light extraction features and travels through the lightguide to reach the motion sensor). In another embodiment, movement detected by the motion sensor triggers the light emitting device to change the light output characteristics. In one embodiment, the light emitting device has light emitting characteristics that change by one or more of the following: emitting light in one or more light emitting regions, stopping emitting light in one or more light emitting regions, changing the overall light flux output (increase or decrease by an amount) in one or more light emitting regions, changing the angular light output profile in one or more light emitting regions, changing the color of the light output in one or more light emitting regions. For example, in one embodiment, the motion sensor triggers the light emitting device to turn on. In another example, the motion sensor triggers the light emitting device to pulse one LED off and on for a flashing logo in a first light emitting region while maintaining the light output of a second LED at a constant visible light output level in a second light emitting region.

In another embodiment, the light input coupler is disposed to receive light from a light source and transmit the light through coupling lightguide into a larger light emitting area such as to provide a lower luminance level light output spread over a larger light emitting area. For example, in one embodiment, the light input coupler is disposed to receive light directed upwards from a light source in a lamp and direct the light through coupling lightguides to the light emitting region disposed in the "lamp shade". In this embodiment, the light is transmitted through the lightguide and exits the shade directly (in embodiments when the light emitting region is on the outer portion of the "lamp shade") without being absorbed by travelling through the light absorbing material of the lamp shade. In this embodiment, the lightguide may be disposed within, on the inner surface, or on the outer surface of a lamp shade. In another embodiment, the lightguide provides light diffusing properties (such as a volumetric diffusion layer, surface relief diffusing layer, or printed diffuser layer) to reduce the glare of the light source and includes light emitting regions that receive light from the light source through coupling lightguides.

In another embodiment, the light emitting device provides light output in a shade or patterned region that is different that the light exiting out of a neighboring region. For example, in one embodiment, the film-based lightguide emits light in a green and red flower pattern while the light transmitted through the shade (from a standard Edison type incandescent light bulb disposed in the lamp, for example) is a second color such as warm white. In one embodiment, a low light transmitting region is disposed between the light emitting region and a light emitting region of external light incident on the light emitting region such that the saturation of the light emitted from the light emitting region is increased. For example, in one embodiment, a table lamp with an incandescent light source disposed within includes a luminous lamp shade of with a lightguide film disposed to receive light from a blue LED and to emit blue light from white ink light extraction features in the form of a blue logo and a black ink overprinted on the white ink light extraction features increases the color saturation over the light extraction region without the low light transmitting region.

Other Optical Films

In another embodiment, the light emitting device further includes a light redirecting optical film, element, or region that redirects light incident at a first range of angles, wavelength range, and polarization range into a second range of angles different than the first.

Light Reflecting Film

In another embodiment, a light emitting device includes a lightguide disposed between a light reflecting film and the light emitting surface of the light emitting device. In one embodiment, the light reflecting film is a light reflecting optical element. For example, a white reflective polyester film of at least the same size and shape of the light emitting region may be disposed on the opposite side of the lightguide as the light emitting surface of the light emitting device or the light reflecting region may conform to the size and shape of one or all of the light emitting regions, or the light reflecting region may be of a size or shape occupying a smaller area than the light emitting region.

Light Absorbing Region or Layer

In one embodiment, at least one selected from the group of the cladding, adhesive, layer disposed between the lightguide and lightguide region and the outer light emitting surface of the light emitting device, patterned region, printed region, and extruded region on one or more surfaces or within the volume of the film comprises a light absorbing material which absorbs a first portion of light in a first predetermined wavelength range. In one embodiment, the light absorbing region or layer is optically coupled to a cladding region on one or more of the following regions: the coupling lightguide regions, the light mixing regions and the light emitting regions. In this embodiment, the light absorbing region can absorb a first portion of the light within the cladding to which it is optically coupled. In one embodiment, the first portion of the light absorbed is greater than one selected from the group of 5%, 10%, 20%, 30%, 40%, 50%, 60%, 70%, 80%, 90% and 95%. In one embodiment, the light traveling in the cladding is substantially absorbed by the light absorbing region. In another embodiment, a light scattering region or layer is optically coupled to or forms the outer surface of a region of the cladding in one or more of the following regions: a coupling lightguide region, a light mixing region, and a light emitting region. In this embodiment, the light traveling within the cladding can be extracted substantially before the light emitting region (or an area of interest in the light emitting region) by scattering it out of the cladding region. Removing the light traveling within the cladding, for example, may be desired in frontlight applications where fingerprints, smudges, oil, residue, dust, and scratches in the cladding or outer surface may be illuminated or visible due to the light traveling within the cladding.

In one embodiment, the first predetermined wavelength range includes light from 300 nm to 400 nm and the region absorbs UV light that could degrade or yellow the lightguide region, layer or other region or layer. In one embodiment, the cladding region is disposed between the light absorbing region and the lightguide such that the light traveling through the lightguide and the evanescent portion of the light travelling within the lightguide is not absorbed due to the absorbing region since it does not pass through the absorbing region unless it is extracted from the lightguide. In another embodiment, the light absorbing region or layer is an arrangement of light absorbing, light fluorescing, or light reflecting and absorbing regions which selectively absorb light in a predetermine pattern to provide a light emitting device with spatially varying luminance or color (such as in a dye-sublimated or inject printed overlay which is laminated or printed onto a layer of the film to provide a colored image, graphic, logo or indicia). In another embodiment, the light absorbing region is disposed in close proximity to the light extracting region such that the light emitted from the light emitting device due to the particular light extraction feature has a predetermined color or luminous intensity. For example, inks comprising titanium dioxide and light absorbing dyes can be disposed on the lightguide regions such that a portion of the light reaching the surface of the lightguide in that region passes through the dye and is extracted due to the light extraction feature or the light is extracted by the light extraction feature and passes through the dye.

In one embodiment, a light emitting device comprises a five layer lightguide region with a UV light absorbing material disposed in the outer layers which are both optically coupled to cladding layers which are both optically coupled to the inner lightguide layer. In one embodiment, a 5 layer film comprises a polycarbonate material in the central lightguide layer with low refractive index cladding layers of a thickness between 1 micron and 150 microns optically coupled to the lightguide layer and a UV light absorbing material in the outer layers of the film.

In another embodiment, a light absorbing material is disposed on one side of the light emitting device such that the light emitted from the device is contrasted spatially against a darker background. In one embodiment, a black PET layer or region is disposed in proximity to one side or region of the light emitting device. In another embodiment, white reflecting regions are disposed in proximity to the light extracting region such that the light escaping the lightguide in the direction of the white reflecting region is reflected back toward the lightguide. In one embodiment, a lightguide comprises a lightguide region and a cladding region and a light absorbing layer is disposed (laminated, coated, co-extruded, etc.) on the cladding region. In one embodiment, light from a laser cuts (or ablates) regions in the light absorbing layer and creates light extracting regions in the cladding region and/or lightguide region. A white reflecting film such as a white PET film with voids is disposed next to the light absorbing region. The white film may be laminated or spaced by an air gap, adhesive or other material. In this example, a portion of the light extracted in the light extracting regions formed by the laser is directed toward the white film and reflected back through the lightguide where a portion of this light escapes the lightguide on the opposite side and increases the luminance of the region. This example illustrates an example where registration of the white reflecting region, black reflection region, and light extracting regions are not necessary since the laser created holes in the black film and created the light extracting features at the same time. This example also illustrates the ability for the light emitting device to display an image, logo, or indicia in the off state where light is not emitted from the light source since the white reflective regions reflect ambient light. This is useful, for example, in a sign application where power can be saved during the daytime since ambient light can be used to illuminate the sign. The light absorbing region or layer may also be a colored other than black such as red, green, blue, yellow, cyan, magenta, etc.

In another embodiment, the light absorbing region or layer is a portion of another element of the light emitting device. In one embodiment, the light absorbing region is a portion of the black housing comprising at least a portion of the input coupler that is optically coupled to the cladding region using an adhesive.

In another embodiment, the cladding, outer surface or portion of the lightguide of a light emitting device comprises a light absorbing region such as a black stripe region that absorbs more than one selected from the group of 50%, 60%, 70%, 80% and 90% of the visible light traveling within the cladding region. In one embodiment, the light absorbing region absorbs light traveling within the cladding region from light coupled into the cladding region at the light input surface of the coupling lightguides in the light input coupler. In another embodiment, the lightguide is less than 200 microns in thickness and a light absorbing region optically coupled to the cladding absorbs more than 70% of the light traveling within the cladding which passes through the lightguide passing the light absorbing region, wherein the thickness of the cladding in the direction of the light traveling within the lightguide is less than one selected from the group of 10 millimeters, 5 millimeters, 3 millimeters, 2 millimeters, and 1 millimeter. In another embodiment, the light absorbing region has a width in the direction of propagation of light within the lightguide between one selected from the group of 0.5-3 millimeters, 0.5-6 millimeters, and 0.5-12 millimeters.

In one embodiment, the light absorbing region is at least one selected from the group of a black line, a patterned line, a pattern shape or collection of shapes, patterned on one or both sides of the film, cladding, or layer optically coupled to the cladding, patterned on one or more lightguide couplers, patterned in the light mixing region, patterned in the lightguide, and patterned in the lightguide region. In another embodiment, the light absorbing region is patterned during the cutting step for the film, coupling lightguides, or cutting step of other regions, layers or elements. In another embodiment, the light absorbing region covers at least one percentage of surface area of the coupling lightguides selected from the group of 1%, 2%, 5%, 10%, 20%, and 40%.

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet comprising aluminum, or a white reflector film) or an element external to the light emitting device such as a window, wall, or ceiling. In one embodiment, the cladding is a "low tack" adhesive that allows the film to be removed from a window or substantially planar surface while "wetting out" the interface. By "wetting out" the interface as used herein, the two surfaces are optically coupled such that the Fresnel reflection from the interfaces at the surface is less than 2%. The adhesive layer or region may include one or more of the following: pressure sensitive adhesive, contact adhesive, hot adhesive, drying adhesive, multi-part reactive adhesive, one-part reactive adhesive, natural adhesive, synthetic adhesive, polyacrylate adhesive, animal glue or adhesive, carbohydrate polymer as an adhesive, natural rubber based adhesive, polysulfide adhesive, tannin based adhesive, lignin based adhesive, furan based adhesive, urea formaldehyde adhesive, melamine formaldehyde adhesive, isocyanate wood binder, polyurethane adhesive, polyvinyl and ethylene vinyl acetate, hot melt adhesive, reactive acrylic adhesive, anaerobic adhesive, and epoxy resin adhesive. In one embodiment, the adhesive layer or region has an ASTM D 903 (modified for 72 hour dwell time) peel strength to standard window glass less than one selected from the group of: 70 oz/in, 50 oz/in, 40 oz/in, 30 oz/in, 20 oz/in and 10 oz/in. In another embodiment, the adhesive, when adhered to glass, will support the weight of the light emitting device. In another embodiment, the adhesive material has an ASTM D3330 peel strength greater than one selected from the group of: 0.5, 1, 2, 3, 4, 5, 6, 7, 8, 9, and 10 pounds per inch width when adhered to an element of the light emitting device, such as for example, a cladding layer, a core layer, a low contact area cover, a circuit board, or a housing or when adhered to glass or other component or device external to the light emitting device.

Light Redirecting Element Disposed to Redirect Light from the Lightguide

In one embodiment, a light redirecting element redirects a portion of light of a first wavelength range incident in a first angular range into a second angular range different than the first. In one embodiment, the light redirecting element include at least one surface or volumetric element or feature selected from the group of: refractive, prismatic, totally internally reflective, specular reflective element or coating, diffusely reflective element or coating, reflective diffractive optical element, transmissive diffractive optical element, reflective holographic optical element, transmissive holographic optical element, reflective light scattering, transmissive light scattering, light diffusing, multi-layer anti-reflection coating, moth-eye or substantially conical surface structure type anti-reflection coating, Giant Birefringent Optic multilayer reflection, specularly reflective polarizer, diffusely reflective polarizer, cholesteric polarizer, guided mode resonance reflective polarizer, absorptive polarizer, transmissive anisotropic scattering (surface or volume), reflective anisotropic scattering (surface or volume), substantially symmetric or isotropic scattering, birefringent, optical retardation, wavelength converting, collimating, light redirecting, spatial filtering, angular dependent scattering, electro-optical (PDLC, liquid crystal, etc.), electrowetting, electrophoretic, wavelength range absorptive filter, wavelength range reflective filter, structured nano-feature surface, light management components, prismatic structured surface components, and hybrids of two or more of the aforementioned films or components. In a further embodiment, the light redirecting element includes a plurality of the aforementioned elements. The plurality of elements may be in the form of a 2-D array (such as a grid of microlenses or close-packed array of microlenses), a one-dimensional array (such as a lenticular lens array), random arrangement, predetermined non-regular spacing, semi-random arrangement, or other predetermined arrangement. The elements may include different features, with different surface or volumetric features or interfaces and may be disposed at different thicknesses within the volume of the light redirecting element, lightguide, or lightguide region. The individual elements may vary in the x, y, or z direction by one or more of the following: height, width, thickness, position, angle, radius of curvature, pitch, orientation, spacing, cross-sectional profile, and location in the x, y, or z axis.

In one embodiment, the light redirecting optical element is disposed between at least one region of the light emitting region and the outer surface of the light emitting device (which may be a surface of the light redirecting optical element). In one embodiment, a light emitting device includes a lightguide with light redirecting elements disposed on and/or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region. In one embodiment, the lightguide includes a substantially linear array of lenticules disposed on at least one surface opposite a substantially linear array of light extraction features wherein the light redirecting element collimates a first portion of the light extracted from the lightguide by the light extraction features. Examples of light redirecting optical elements in the form of films with prismatic structured surfaces include, but are not limited to, Vikuiti™ Brightness Enhancement Film (BEF I, BEF II, BEF III, BEF III 90/50 5T, BEF III 90/50 M, BEF III 90/50 M2, BEF III 90/50 7T, BEF III 90/50 10T, BEF III 90/50 AS), Vikuiti™ Transparent Right Angle Film (TRAF), Vikuiti™ Optical Lighting Film (OLF or SOLF), IDF II, TRAF II, or 3M™ Diamond Grade™ Sheeting, all of which are available from 3M Company, St. Paul, Minn. Other examples of light management component constructions may include the rounded peak/valley films described in U.S. Pat. Nos. 5,394,255 and 5,552,907 (both to Yokota et al.), Reverse Prism Film from Mitsubishi Rayon Co., Ltd or other totally internally reflection based prismatic film such as disclosed in U.S. Pat. Nos. 6,746,130, 6,151,169, 5,126,882, and 6,545,827, lenticular lens array film, microlens array film, diffuser film, microstructure BEF, nanostructure BEF, Rowlux® microlens film from Rowland Technologies, films with arrangements of light concentrators such as disclosed in U.S. Pat. No. 7,160,017, and hybrids of one or more of the aforementioned films.

Off-Axis Light Redirection

In a further embodiment, at least one light extraction feature is centered in a first plane off-axis from an axis of a light redirecting element. In this embodiment, a portion of the light extraction feature may intersect an optical axis of the light extraction feature or the light extraction feature may be disposed sufficiently far from the optical axis that the light extraction feature does not intersect the optical axis of the light extraction feature. In another embodiment, the distance between the centers of the light extraction features and the corresponding light redirecting elements in first plane varies across an array or arrangement of light redirecting elements.

Flexible Light Emitting Device, Backlight, or Frontlight

In another embodiment, a light emitting device, such as a display, includes a film-based light emitting device including a light source, light input coupler, and lightguide wherein the lightguide, lightguide region, or coupling lightguides can be bent or folded to radius of curvature of less than 75 times the thickness of lightguide or lightguide region and function similarly to similar lightguide or lightguide region that has not been similarly bent. In one embodiment, the light emitting device or display incorporating the light emitting device has a light emitting surface area substantially in the shape of or including a portion of a shape of one or more or the following: a cylinder, sphere, pyramid, torus, cone, arcuate surface, folded surface, and bent surface. By folding the input coupler behind the light emitting region and inside a curved or bent region of the light emitting device or display, the input coupler can be effectively "hidden" from view and a substantially seamless display or light fixture can be created. In another embodiment, two or more regions of a light emitting region in a light emitting device overlap each other in the thickness direction such that there is a continuous light emitting region such as in the case of a cylindrical light emitting device or a light emitting device wrapping around two or more sides of a rectangular solid.

Point of Purchase Display

In one embodiment, a light emitting point of purchase (POP) display includes a film-based lightguide, coupling lightguides, and a light input coupler. In another embodiment, the point of purchase display is a shelving system with tags, indicators, indicia, graphics, or other media. In another embodiment, the POP display includes a light emitting device electrically connected to a motion sensor. In one embodiment, the light emitting device is integrated into the POP display such that one or more regions of the POP display have light emitting indicia (such as a logo, graphic, text, symbol, or picture). In another embodiment, the lightguide has one or more substantially transparent regions and is disposed in front of a region of the point of purchase display. For example, in one embodiment, a POP display comprises a printed cardboard region with a substantially transparent lightguide disposed above it. In this embodiment, the red printed cardboard region is visible through the lightguide when the light emitting device is not emitting light and is visible in non-light emitting regions of the lightguide when the light emitting device is emitting light. In one embodiment, the lightguide is disposed over text regions, graphic regions, uniform colored regions (red or white background for example) or other printed or unprinted regions of the display. In one embodiment, the light emitting region is used to enhance the printed region. For example, in one embodiment, the light emitting region emits red light in the form of indicia spelling "SALE" and is disposed above a similar size and shape printed region of the POP display spelling "SALE". In another embodiment, the light emitting region emits light that at least one selected from the group of enhances edges, outlines shapes or printed indicia, and indicates a particular product within or region of the POP display. In another embodiment, the light emitting region of a lightguide in a first output region is disposed above a printed region of a display or sign that has a diffuse reflectance less than one selected from the group of 60%, 50%, 40%, 30%, 20%, 10%, and 5%. For example, in one embodiment, a light emitting device comprises a white light emitting region on a lightguide above a black printed region such that the luminance contrast ratio of the light emitting region is high.

In one embodiment, the light emitting device is a point of purchase display including a light input coupler and lightguide disposed to be extended from the base of the display to a second region away from the display. For example, in one embodiment, a light emitting point of purchase display includes a light input coupler disposed in a support structure or surface, such as in the ceiling of a store with a film-based lightguide extending from the ceiling to the display base and the film-based lightguide is substantially transparent between the ceiling and the display base. In one embodiment, the light exiting the point of purchase display exits the film-based lightguide from a light emitting region. In another embodiment, the light exiting the point of purchase display exits the film-based lightguide through output coupling lightguides disposed to emit light through light emitting regions. In this embodiment, for example, the light output couplers of the light emitting device may be reconfigured or replaced to change the light emitting properties of the display without needing to change the film-based lightguide functioning as a distribution lightguide extending from the ceiling to the display base.

Illumination Device

In one embodiment, the light emitting device provides illumination. In another embodiment, the light emitting device includes a light source and a light emitting film or film-based lightguide wherein the light emitting device is a light fixture, can light, troffer light, cove light, recessed light, torch lamp, floor lamp, chandelier, surface mounted light, pendant light, sconce, track light, under-cabinet light, emergency light, wall-socket light, exit light, high bay light, low bay light, strip light, garden light, landscape light, building light, outdoor light, street light, pathway light, bollard light, yard light, accent light, background light, black light, flood light, safelight, safety lamp, searchlight, security light, step light, strobe light, follow-spot light, or wall-washer light, flashlight, wall light, ceiling light, ceiling fan light, window light, door light, floor light, car light, or vehicle light. In some embodiments, the types of illumination device are not limited to traditional light fixtures or light source categories and embodiments include light emitting devices that are thin, flexible, lightweight, substantially transparent, made of non-traditional materials can enable new categories or types of illumination devices. For example, in one embodiment, a light emitting device including a thin substantially transparent film-based lightguide that emits light may be disposed on a wall such that the light emitting device emits light from uniform or patterned light emitting regions in the luminous state, and the film-based lightguide is substantially not visible in the off state due to low absorption or high transmittance. In another embodiment, the light emitting device can be adhered, physically coupled to or disposed adjacent one or more surfaces of a wall, vehicle, floor, ceiling, mirror, window, glass surface, door, metal surface, polymer surface, curved surface, roughened or low gloss surface, or flat surface. For example, in one embodiment, a film-based light emitting device includes an adhesive such that the film region, the light input coupler, or both can be applied to a wall or ceiling and the adhesive supports the weight. In another example, the light emitting device includes a wallpaper adhesive or wallpaper paste such as methyl cellulose, modified starch base, wheat paste, pre-mixed vinyl clay, pre-mixed vinyl clear, for example. In another embodiment, the light emitting device includes a paper layer. In this embodiment, a wallpaper paste or adhesive may be used to adhere the light emitting region of the film, the film, or the light emitting device by allowing the adhesive to soak into the paper layer. For example, in one embodiment, a light emitting device includes a paper, board, or cellulose based layer disposed on one side of a light emitting region of a lightguide disposed to receive light from the lightguide and reflect or absorb a portion of the incident light such that the light emitting region has an increased luminance or increased image contrast from the opposite, viewing side and the layer can be adhered to a surface using a wallpaper adhesive or wallpaper paste. In another embodiment, the paper, board, or cellulose based layer providing light reflection or absorption is white, translucent, black, gray, or colored. In another embodiment, the light emitting device has a peel-off liner that can be removed to expose an adhesive layer for application of a region of the lightguide to a surface.

In other embodiment, the light emitting device may be luminous in the on state and substantially invisible in the off-state in the light emitting region. In one embodiment, the light emitting surface includes light emitting regions that are non-uniform and provide a visible pattern, image, logo, indicia, luminous accent lines corresponding to the edge of the lightguide, transparent windows for viewing through the lightguide, user-configurable or predetermined light output profiles, and/or reconfigurable or replaceable light output patterns or regions. In one embodiment, the light emitting device includes a film-based lightguide that can be positioned beneath a ceiling tile or panel with light source disposed above the ceiling tile. For example, in one embodiment, a light input coupler is disposed above the tiles in a drop ceiling and a thin film-based lightguide is wrapped underneath a ceiling tile. In this embodiment, the film-based lightguide maintains the continuity of appearance of the ceiling while allowing light to be emitted from regions of the light emitting film-based lightguide. The film may be sufficiently thin to be positioned between the tile and the railing supporting the tile. In one embodiment the film-based lightguide passes between the tile and a railing on one side of a tile and passes though the tile and railing on the opposite side. In this embodiment, the film-based lightguide (and thus light emitting region of the film-based lightguide and angular light output profile) may be adjusted to be taught under tension due to the weight or force between the tile and rail or it may be disposed to drape downward in an arcuate manner. In another embodiment, the film-based lightguide includes adhesive regions disposed on one or more sides to allow for the film to adhere to a surface such as a ceiling tile or wall. In a further embodiment, the film-based lightguide is substantially transparent in the off-state and the tile, wall, ceiling or other surface seen through the lightguide appears substantially the same as the neighboring surface seen without looking through the film-based lightguide. In another embodiment, the light emitting device includes one or more organic light emitting diodes (OLEDs) on a flexible substrate. In this embodiment, the flexible OLED is a light emitting film.

Reconfigurable Light Output Region

In one embodiment, the light emitting device includes a film-based lightguide with a reconfigurable region. In one embodiment, the light emitting device includes a lightguide or light emitting film that is plastically deformable such that the position and/or angle of orientation of one or more surface regions may be reconfigured. In one embodiment, the lightguide or light emitting film may be reconfigured by hand without the use of tools. In one embodiment, the lightguide (or light emitting film) or a plastically deformable material physically coupled to the lightguide (or light emitting film) has one or more regions with a yield strength less than one selected from the group of: 700 psi, 500 psi, 300 psi, 200 psi, and 100 psi. In another embodiment, the plastically deformable material may be deformed by at least one selected from the group of: 50, 40, 30, 20, and 10 degrees without fracture. For example, in one embodiment, the light emitting device includes a lightguide or light emitting film with a plastically deformable material that may be bent to form a new shape such as a thin aluminum sheet physically coupled to a white reflecting film that is physically coupled to a cladding region of film-based lightguide (or light emitting film). In this embodiment, the shape or orientation of one or more regions of the lightguide or light emitting film may be adjusted to achieve a desired result (such as redirection of the light output). In another embodiment, the light reflecting element is a plastically deformable light reflecting element.

In one embodiment, a light emitting device includes a film-based lightguide or light emitting film wherein the shape of one or more regions of the lightguide or light emitting film can be changed from a substantially planar shape to a curved, arcuate, bent or wrinkled shape and the light output profile is changed. For example, in one embodiment, a substantially planar light emitting region on a substantially planar film-based lightguide is folded such that the lateral dimension of the lightguide is reduced (for example, with a shape similar to a handheld paper fan) and the angular full-width at half maximum luminous intensity in the output plane including the lateral dimension is increased.

In one embodiment, the light emitting region of the film-based lightguide or light emitting film has a surface region with a surface angle relative to a reference direction that varies across the light emitting region. The surface angle is the angle of the plane including the surface in the region relative to a reference direction. The average surface angle of the light emitting region is the average of the surface angles over all light emitting regions. For example, a light emitting device including a flat, planar lightguide with light emitting regions on the surface disposed parallel to a reference direction has an average surface angle of 0 degrees from the reference direction. In another example, a light emitting device includes a film-based lightguide with a sinusoidal light emitting region disposed continuously across the lightguide film surface with the reference direction parallel to the horizontal axis of lightguide film and in the direction of light travel (with the sinusoid running horizontally) has an average surface angle of the light emitting region of 0 degrees from the reference direction due to the averaging of the positive and negative sloped surfaces. In another embodiment the film-based lightguide or light emitting film includes light emitting regions only on the surface regions with positive slopes on the sinusoidal shaped lightguide or light emitting film and the average surface angle of the light emitting regions may be, for example, +45 degrees from the reference direction. In another similar embodiment, where the film-based lightguide or light emitting film includes light emitting regions only near the peak regions of the sinusoidal shaped lightguide or light emitting film, the average surface angle of the light emitting regions may be, for example, 0 degrees from the reference direction.

Bendable or Rotatable Light Emitting Panels

In one embodiment, the light emitting device includes a plurality of lightguides or light emitting film regions that may be repeatedly bent or rotated substantially independently such that the light output profile can be changed. In another embodiment, the light emitting device includes a plurality of light input couplers and film-based lightguides or light emitting films that may be rotated, bent or repositioned such that the angular light output profile of the light emitting device is changed. For example, in one embodiment, a light emitting device includes four light emitting panels disposed along the four edges of a square panel. In one embodiment, the light emitting panels include light input couplers and film-based lightguides or light emitting films that may be independently rotated downward or upwards to change the light emitting profile. In this embodiment, the central square panel includes a light emitting film-based lightguide disposed to receive light from a separate light input coupler. In one embodiment, more than one light panel may receive light from the same light input coupler or light source. In another embodiment, all of the light emitting panels receive light from the same light source. In some embodiments, the light emitting panels include a rigid support on the light emitting side of the film-based lightguide (or light emitting film) or on the opposite side of the lightguide (or light emitting film). In one embodiment, the rigid support is substantially transparent in the region adjacent the light emitting region of the lightguide or light emitting film. In another embodiment, the rigid support is substantially white, gray or specular "mirror-like" in the region disposed adjacent the light emitting region of the film-based lightguide or light emitting film such that it reflects light back through it. In another embodiment, one or more rotatable, repositionable, or substantially stationary light emitting panels are substantially rectangular, square, circular, semicircular, triangular, shaped such that they include curved regions, shaped such that they include linear regions, trapezoidal, polygonal, wave-like, shaped like strips, elliptical, enclosed shapes, or un-enclosed shapes (such as a shape of flat washer).

Lightguide or Light Emitting Film Adjustment Mechanism

In one embodiment, the light emitting device includes a film adjustment mechanism for reconfiguring the shape or location of one or more regions of a lightguide or light emitting film. In one embodiment, the film adjustment mechanism is physically coupled to the lightguide or light emitting film (such as adhered, clamped, or bonded). In another embodiment, one or more components of the film adjustment mechanism are in physical contact with one or more regions of the lightguide or light emitting film in a first configuration and may be translated or rotated away from the point of contact with the lightguide or light emitting film in a second configuration. In one embodiment, the film adjustment mechanism includes a plastically deformable material having at least one region with a yield strength less than one selected from the group of: 700 psi, 500 psi, 300 psi, 200 psi, and 100 psi. In another embodiment, the yield strength is greater than one selected from the group of: 5 psi, 10 psi, 20 psi, 40 psi, 50 psi, 70 psi and 100 psi. In another embodiment, the plastically deformable material of the film adjustment mechanism may be deformed by at least one selected from the group of: 50, 40, 30, 20, and 10 degrees without fracture. In another embodiment, the film adjustment mechanism includes one or more rails, wires, frames, supports, guides, rollers, bars, covers, lenses, and/or housing elements, that may be adjusted and repositioned without bending. In one embodiment, the film adjustment mechanism provides support for one or more of the following: a first light input coupler, a second light input coupler, lightguide or light emitting film positioning elements or rods, rail couplers, housing components, power supplies, and other components of a light emitting device. In another embodiment, the film adjustment mechanism (such as a rail, tube, or guide, for example without limitation) includes the electrical wiring or electrical connection means for providing power to one or more light sources or a runner that electrically moves a region of the lightguide, light emitting film, or light emitting device.

Bendable Side Support Rails

In one embodiment, the light emitting device includes a film adjustment mechanism in the form of support rails for a region of the lightguide or light emitting film that can be curved, bent or re-configured to change the shape of the lightguide. The lightguide or light emitting film in may remain or become taught or it may remain or be allowed to relax or drape under low tension.

Bendable Mesh Support

In one embodiment, the lightguide or light emitting film includes a film adjustment mechanism in the form of a bendable, plastically deformable mesh physically coupled to one or more regions of the lightguide or light emitting film. In this embodiment, the lightguide (or light emitting film) and mesh may be bent in a region such that the region has a different shape or location relative to other regions of the lightguide, light emitting film, or light emitting device. In one embodiment, the mesh includes an arrangement (such as matrix) of metal rods or tubes with combined yield strength less than one selected from the group of: 700 psi, 500 psi, 300 psi, 200 psi, and 100 psi in at least one direction for at least one region. In another embodiment, the yield strength of the lightguide, light emitting film, or plastically deformable material is anisotropic and has yield strength in a first direction parallel to the lightguide or light emitting film surface and a second yield strength greater than the first yield strength in a second direction parallel to the surface of the lightguide or light emitting film and orthogonal to the first direction. For example, in one embodiment, a light emitting device includes a lightguide or light emitting film physically coupled to a plastically deformable wire mesh with a shorter pitch (or more wire) in first direction than in a second direction orthogonal to the first direction and the yield strength in the first direction (or in a direction within the plane comprising the first direction) is greater than the yield strength in the second direction. In one embodiment, the light emitting device includes one or more of the following: mesh disposed within a film or material, mesh including one or more layers between the mesh and lightguide or light emitting film, mesh including one or more materials on the opposite side of the mesh than the lightguide or light emitting film, and mesh with one or more materials within the mesh. For example, in one embodiment, the mesh includes a flexible adhesive or polymer component within the mesh grooves.

In one embodiment, a light emitting device includes a film adjustment mechanism in the form of a plastically deformable mesh support including wires that are physically attached at the intersection (such as welding joints) or the mesh may be interleaved. In another embodiment, the mesh wires in one direction thread through holes in the wires in the other direction. In a further embodiment, the wire mesh is twisted around the intersecting wire mesh, such as in the case with common galvanized steel "chicken wire." In another embodiment, the wire is embedded within, or sandwiched between two elements such as light reflecting films. In a further embodiment, the wire is chrome plated such that the reflectance from the wire is greater than one selected from the group of: 50%, 60%, 70%, 80% and 90%.

Adjustable Extension Guide

In one embodiment, the lightguide or light emitting film adjustment mechanism is an adjustable extension guide including two components that may be brought closer together or separated further apart substantially along a first direction. For example, in one embodiment, a light emitting device includes two light input couplers on opposite sides of a film-based lightguide or light emitting film wherein the light input couplers are physically connected by two slide extensions and can be pulled closer together or further apart. In this embodiment, the arc or radius of curvature of the film-based lightguide may be changed by bringing the light input couplers closer together or further apart. Additionally, in this embodiment, the arc or radius may be positive or negative, pointing upwards or downwards, resulting in different angular light output profiles for the light emitting device.

In one embodiment, the adjustable extension guide includes adjustable rails, a telescoping cylinder or similar telescoping device, a sliding rail, extension telescopic slides, a bearing slide, a linear-motion bearing, a roller slide, a dovetail slide, a plain bearing, a rolling element bearing, a jewel bearing, a fluid bearing, a magnetic bearing, and a flexure bearing. In another embodiment, the film adjustment mechanism is an adjustable extension guide including two components that may be brought closer together or separated further apart in one or more regions along an arc or non-linear direction. For example, in one embodiment, one region of a lightguide is physically coupled to the light input coupler and a second region is physically coupled to a hinge such that the orientation of the lightguide in the second region may be rotated along a curve relative to the first region. In one embodiment, film adjustment mechanism is a hinge, such as a barrel hinge, a pivot hinge, a Butt/Mortise hinge, a continuous hinge, a piano hinge, a concealed hinge, a euro/cup hinge, a butterfly hinges, a parliament hinge, a dovetail hinge, a strap hinge, an H hinge, an HL hinge, a counterflap hinge, a flush hinge, a coach hinge, a rising Butt hinge, a double action spring hinge, a tee hinge, a friction hinge, a security hinge, a cranked hinge, a stormproof hinge, a lift-off hinge, a self-closing hinge, building access hinges, a Butler tray hinge, a card table hinge, a drop leaf table hinge, and a long hinge.

Lightguide or Light Emitting Film Positioning Element

In one embodiment, the light emitting device includes one or more lightguide or light emitting film positioning elements disposed to contact one or more regions of the film-based lightguide or light emitting film. In another embodiment, the light emitting device includes lightguide or light emitting film positioning elements disposed substantially opposite each other on opposite sides of a film-based lightguide or light emitting film. In this embodiment, the lightguide or light emitting film positioning elements may be adjusted to apply pressure on the lightguide or light emitting film to substantially maintain the location of the particular region of the lightguide between the rods. Thus, by clamping or holding by pressure the lightguide or light emitting film in a location, the form or shape may be adjusted and be substantially held in that location until purposefully altered. For example, in one embodiment, a light emitting device includes a light input coupler on one side of film-based lightguide and a rail coupler on the opposite side of the film-based lightguide. Guide rails disposed parallel to the film-based lightguide between the light input coupler and the base hold the ends of the lightguide positioning elements in the form of rods which may be moved along the rail while holding a region of the lightguide, thus changing the shape. In one embodiment, the lightguide or light emitting film positioning element is an extended element with a length more than twice as long as the width and the element has one or more regions with a cross-sectional shape of a tube, rod, circle, annulus, ellipse, semicircle, rectangle, square, triangle, polygon, or closed curve with a curved region. In one embodiment, the film positioning element includes a light transmitting material and is translucent or transparent.

In one embodiment, the lightguide positioning rod includes a slit through which the lightguide may be inserted and the rod may be rotated and locked into place, such as by tightening a set screw in a guide slit (or opening) or a locking bolt in the guide rails. In one embodiment, the lightguide or light emitting film positioning rod includes a first linear rod component and a second linear rod component where the first linear rod component may be moved relative to the second linear rod component such that the lightguide may be disposed between the components to hold, increase tension, rotate, or otherwise guide the film location or orientation at the lightguide positioning rod. By using a second and first linear component, the film is not required to be fed through a slot (in a positioning rod) and the rod may be added in the middle of the light emitting device without requiring the removal of the other rods to feed the film through. In another embodiment, the use of two fixed light input couplers restricts or prohibits the film to be fed through a slit in the direction between the light input couplers, and a top and bottom component of the lightguide positioning rod is needed for feeding the film through the rod without removing the end components (light input couplers in this example). For example, in one embodiment, the positioning rod includes a top component that may be removed from the bottom component and rejoined back to the rod after the film is placed between the top component and the bottom component. In another embodiment, the top component is hinged to the bottom component.

Adjustable Tension Rails

In one embodiment, a light emitting device includes a film adjustment mechanism in the form of one or more adjustable tension rails and lightguide or light emitting film positioning rods extending therefrom. In one embodiment, the lightguide or light emitting film positioning rod provides an extended surface that is in contact with one or more regions of the lightguide such that tension is applied to the film-based lightguide or light emitting film to achieve a desired shape. For example, in one embodiment a light emitting device includes two primary adjustable tension rails on opposite sides of a film-based lightguide including light input couplers disposed on two sides substantially orthogonal to the rails. In this embodiment, lightguide positioning rods are physically coupled to secondary adjustable tension rails physically coupled to the primary adjustable tension rails and/or the secondary adjustable tension rails extending from the primary adjustable tension rails. By positioning the lightguide positioning rod at a distance away from the primary adjustable tension rails by using the secondary adjustable tension rails, the shape of the film-based lightguide may be controlled using tension in the film-based lightguide between one lightguide positioning rod to another (or to a light input coupler). In one embodiment, the location of the lightguide or light emitting film positioning rod along the primary or secondary adjustable tension rail or the connection location of the primary adjustable tension rail with the secondary adjustable tension rail may be adjusted using a screw, bolt, tightening screw, set screw, clamp, tightening and unlocking mechanism, groove and locking locations, guides and tabs, holes or grooves and protrusions, fasteners, pins, straps, rings, clips, clamps, or other suitable temporary locking mechanisms or fasteners known in the art.

Flexible Adjustment Extension

In one embodiment, a light emitting device includes a film-based lightguide or light emitting film and a film adjustment mechanism in the form of a flexible adjustment extension. In another embodiment, the light emitting device includes at least one light input coupler, a film-based lightguide extending from the light input coupler and at least one flexible adjustment extension physically coupled to one or more regions of the film-based lightguide such that it guides the shape of the film-based lightguide in one or more directions. For example, in one embodiment, film adjustment mechanism is a pair of flexible adjustment rods or tubes disposed alongside opposite sides of a film-based lightguide (or light emitting film) with at least one light input coupler (or film support) disposed on a different side of the film-based lightguide (or light emitting film). In another embodiment, the flexible adjustment rods pass through holes in the film-based lightguide or light emitting film. In this embodiment, the shape of the flexible adjustment rod can be changed by hand bending the rod into a new shape. The holes in the film-based lightguide or light emitting film allow the region to move along the rod when it is bent and shape of the film can be altered. In another embodiment, the flexible adjustment extension is solid or hollow with a cross-sectional outer shape of a square, rectangle, triangle, other polygonal shape, or non-polygonal shape. In one embodiment, the shape of the film-based lightguide or light emitting film substantially conforms to the shape of the flexible adjustment extension. In another embodiment, the shape of the film-based lightguide or light emitting film does not completely conform to the shape of the flexible adjustment extension. For example, in one embodiment the film-based lightguide or light emitting film bows in a direction opposite that of a flexible adjustment rod in a region between two adjacent holes. The flexible adjustment extension may be substantially the same shape or a substantially different shape as the film-based lightguide in a light emitting device. For example, by bending one flexible adjustment rod downwards and the flexible adjustment rod on the opposite side upwards, the film-based lightguide or light emitting film may be tilted at an angle in a particular region. In another embodiment, grommets are disposed in the holes in the film-based lightguide or light emitting film. Grommets can reduce the stress on a specific region of the hole or lightguide such that the likelihood of tearing is reduced. In another embodiment, the film-based lightguide or light emitting film is physically coupled to at least one flexible adjustment extension by a loop in the film-based lightguide, light emitting film, glide mechanism, rolling mechanism, ring, or other translation device. For example, suitable translation devices include those that are typically used with curtains or drapes such as curtain rings, guide rings, loops of material, runner, hook, and roller rings/hooks. In one embodiment, the film-based lightguide or light emitting film is bonded, clamped, or adhered to a ring and it may be translated along a flexible adjustment tube. In another embodiment, the flexible adjustment extension includes a guide rail that supports a runner that is attached to the film based lightguide or light emitting film that can move along the flexible adjustment extension. In another embodiment, the translation device includes a locking mechanism that temporarily or permanently prevents further movement of the translation device along the flexible adjustment extension. For example, in one embodiment, the flexible adjustment rod is a hand bendable extruded aluminum tube and spring clamps with substantially circular cross sections (for example, looped spring clamps such as those used on automobile hoses) near one end are physically coupled to the lightguide or light emitting film. In this embodiment, by pressing on two levers of the spring clamp, the clamp opens to a wider diameter than the tube and the clamp (and thus the region of the lightguide or light emitting film it is physically coupled to) can be translated along the tube to a different location and the shape of the lightguide or light emitting film can be changed.

Light Emitting Strips or Extensions

In one embodiment, a light emitting device includes light emitting lightguide strips or extensions extending from a common light input region disposed to receive light from the input region and output the light from one or more surfaces of the strips or extensions where the strips or extensions have folded, bent or arcuate shaped regions. For example, in one embodiment, an array of lightguide strips cut from a light transmitting film are brought together in a bundle at one end and disposed to receive light at their input edges from a light input coupler or light source such that light enters the strips and travels in a waveguide condition and exits the strips in light emitting regions due to light extraction features. In one embodiment, the strips are substantially flexible and plastically deformable. In another embodiment, the light emitting device includes one or more of the following: bendable side support rails, bendable mesh support, adjustable extension guides, lightguide or light emitting film (strip) positioning elements, adjustable tension rails, and flexible, adjustable light emitting film extensions with a repeatedly adjustable shape. For example, in another embodiment, the strips have a white, light reflecting film disposed between a flexible mesh and the strip lightguides or extensions. In this embodiment, the shape and orientation of the strips can be adjusted by the user to direct light to desired locations or to a desired angular illumination output profile.

In another embodiment, the light emitting device includes a tubular shaped film-based lightguide including a light input coupler with coupling lightguides extended from the film-based lightguide on one side and output coupling lightguides on a second side. In this embodiment, the input coupling lightguides receive light from a light source and couple the light into a film-based lightguide formed into a tube shape and the light travels in the film-based lightguide where it is coupled into output coupling lightguides and exits through light emitting regions. For example, in one embodiment, a light emitting device includes a film-based lightguide with input coupling lightguides on one side that are folded and bundled into a round tube shape and disposed to couple light from a light source into a film-based lightguide. In this embodiment, the film based lightguide includes a light mixing region or a non-emitting region that is curled into the shape of a tube and on the opposite side the output coupling lightguides extend from the film-based lightguide and emit light in light emitting regions. In one embodiment, the output coupling lightguides may be shaped or formed to adjust the angular light output profile. In another embodiment, the output coupling lightguides include light emitting regions disposed at a distance greater than one selected from the group of: 0.5, 1, 2, 4, 8, and 10 feet from light source. In this embodiment, a film based lightguide, a light mixing region, a non-emitting region of the film-based lightguide, and/or an output coupling lightguide is longer than one selected from the group of: 0.5, 1, 2, 4, 8, and 10 feet in a direction substantially parallel to the optical axis of light propagating within the film-based lightguide. In one embodiment, for example, a light source may be located in a region with a plurality of arrangements of coupling lightguides extending therefrom and a plurality of light emitting regions extending from a plurality of film-based lightguides may be distributed further away from the light source to provide a light emitting system with distributed light emitting regions from a centralized light source.

Lightguide or Light Emitting Film Attachment Mechanism and Means for Translation or Rotation In one embodiment, the light emitting device includes a film adjustment mechanism in the form of a lightguide or light emitting film attachment mechanism and a means for translating or rotating the lightguide or light emitting film attachment mechanism. The lightguide or light emitting film attachment mechanism includes a component for physically coupling the mechanism to a region of the lightguide or light emitting film such that the lightguide or light emitting film is substantially translated or rotated when the lightguide or light emitting film attachment mechanism is translated or rotated. In one embodiment, the lightguide or light emitting film attachment mechanism includes one or more of the following elements: a fastener, clamp, hook, loop, screw, bolt, tightening screw, set screw, clamp, tightening and unlocking mechanism, protrusion, pin, strap, ring, clip, clamp, and other temporary or permanent locking mechanisms or a suitable fastener known in the art. For example, in one embodiment, the lightguide or light emitting film attachment mechanism is a plastic clamp pressed into a locking position such that it is affixed to a film-based lightguide or light emitting film and the clamp further includes a hole through which a rope is fed and tied in a knot. In this embodiment, opposite ends of the lightguide are physically coupled to a light input coupler and the rope is also fed through a loop or eye-bolt physically coupled to the light input coupler (or housing) such that when the rope is pulled, the clamp and the middle region of the lightguide to which it is clamped is translated. In this embodiment, for example, the shape of the lightguide may convert from that of one having a cross-section similar to that of a bulb to one of a "flattened" bulb or a more planar-like shape. More than one lightguide or light emitting film attachment mechanism may be used on one or more sides or interior regions of a film-based lightguide or light emitting film. For example, in one embodiment a flexible lightguide drapes from the light input coupler above in a bulbous shape. A rope driven by a remote controlled motor in the housing of the light emitting device pulls the lightguide attachment mechanism disposed in the lower central region of the bulb toward the light input coupler such that the cross section has two inflection points on either side of the central region (such as in a cross-section similar to a "W" or rounded "W" shape).

Electronically Adjustable Shape

In one embodiment, the shape of the film-based lightguide or light emitting film is changed by a motor translating or rotating a film adjustment mechanism. In one embodiment, the motor is driven by wireless (such as infrared or IEEE 802.11g, for example) or wired control mechanisms (such as a TCP/IP network connection). For example, in one embodiment, a light emitting device includes an electrical motor controlled remotely using wireless transmission protocol that translates a pair of lightguide or light emitting film positioning rods such that the shape of the lightguide or light emitting film and the angular light output is changed.

Reconfigurable Light Output Profile

In one embodiment, the orientation or location of one or more light emitting regions of the lightguide or light emitting film may be reconfigured (re-oriented, re-positioned, or both) by a film adjustment mechanism such that the angular light output profile and/or the location of one or more light emitting regions is changed. For example, in one embodiment, a light emitting device includes at least one lightguide or light emitting film that may be reoriented or repositioned to tilt or redirect the light in a first direction. In one embodiment, the light emitting device includes a lightguide or light emitting film physically coupled to a plastically deformable material that allows the lightguide shape to be altered to achieve a specific light output profile such as more light in the vertical direction, more light in the horizontal direction, or more light away from the operator's eyes to reduce glare.

The light emitted from a particular light emitting region of a light emitting device has an angle of peak luminous intensity. In some embodiments, the angle of peak luminous intensity varies across the light emitting region. This variation can occur, for example, due to variations in the shape of the light emitting region surface or a spatially varying light extraction region or light redirecting element. The angle of peak luminous intensity for a particular light emitting region is the weighted average angle of peak luminous intensity for the light emitting region and can be measured by the far field peak luminous intensity of the light emitted from only that particular light emitting region. The average angle of peak luminous intensity for a light emitting device is the weighted average angle of peak luminous intensity for all of the light emitting regions of the light emitting device and is measured by the far field peak luminous intensity for the light emitting device. In one embodiment, the shape, orientation, and/or location of one or more regions of the lightguide or light emitting film including light emitting regions is adjusted and the angle of peak luminous intensity for the light emitting region is changed and the angle of peak luminous intensity for the light emitting device is changed. In one embodiment, the light emitting device includes a substantially non-light emitting region defined in an optical path of light from the light source between the light source and the light emitting region. In one embodiment, a curvature of the film-based lightguide in the light emitting region is different from a curvature of the film-based lightguide in the substantially non-light emitting region.

Elongated Light Emitting Device

In one embodiment, a light emitting device is longer in a first direction than a second and third direction with the first, second, and third directions mutually orthogonal to each other. In one embodiment, the light emitting device includes a light input coupler with coupling lightguides extending substantially the length of the first, long direction. In another embodiment, the light emitting device includes a plurality of light input couplers disposed along the first, long direction to coupler light into a film-based lightguide along an input edge. In one embodiment, the light emitting device includes an arcuate film-based lightguide. For example, in one embodiment an elongated light emitting device includes a light source coupling light into a first and second set of coupling lightguides. In this embodiment, the first set of coupling lightguides directs light into a film-based lightguide in a first direction and the second set of coupling lightguides direct light into the film-based lightguide in a second direction opposite to the first. In this embodiment, for example, coupling lightguides cut from opposite sides of a lightguide film may be collected into two collective sets that are curled under the lightguide such that the light input surface of both sets coupling lightguides are positioned to receive light from a light source and the shape of the lightguide is arcuate or includes a curved region. In one embodiment, coupling lightguides are folded underneath the film-based lightguide, and the coupling lightguides are substantially disposed within the volume encapsulated or partially encapsulated by the curved film-based lightguide with the light emitting device requiring less volume than one with coupling lightguides external to a similar arcuate film-based lightguide. For example, in one embodiment the light emitting device is a replacement light bulb for a linear fluorescent bulb and the coupling lightguides (and possible the light source) are be disposed inside the volume substantially encapsulated by the arcuate shaped film and the device requires less volume to achieve a uniform spatial luminance profile in the light emitting region than other LED-based fluorescent bulb replacements.

Vertical Draping Light Emitting Device

In one embodiment, the light emitting device includes a film-based lightguide having a region that is suspended substantially vertically and the film-based lightguide hangs downward due to gravity. For example, in one embodiment, the light emitting device is a suspended light fixture including a light input coupler, and a pair of lightguide positioning rods. The lightguide film feeds through the lightguide positioning rods and the end region of the film is suspended downward. In this embodiment, the film-based lightguide includes a light emitting region at the end region and the light extraction features of the lightguide redirect the a majority of the light out of the lightguide at a substantially steep angle from the surface normal (such as within the angular range from 70 to 90 degrees from the surface normal) and the light emitting device has a substantially directional light output in the downward direction (such as a light output profile with at least 80% of the light output within 60 degrees of the nadir). In another embodiment, the lightguide positioning rods may be adjusted such that the vertical draping light emitting device is converted to a light emitting device with a light emitting film-based lightguide oriented in a wave shape extending less in the vertical direction. In this embodiment, the light output profile can be adjusted by changing the orientation and length of the draping region (and thus shape) of the film-based lightguide.

In one embodiment, a light emitting device includes a film-based lightguide or light emitting film with a light emitting region oriented substantially vertically and the light exiting the lightguide has a luminous intensity in a light emitting region less than 300 candelas at 55 degrees from the nadir (−x direction) in the x-y plane with the thickness of the lightguide in a light emitting region substantially in the y direction. In one embodiment, the light is emitted from either or both surfaces of the substantially vertical region of the film-based lightguide in the light emitting region. For example, in one embodiment, more than 80% of the light emitted from the light emitting device is within one angular range selected from the group of: 50 degrees, 40 degrees, 30 degrees, and 20 degrees from the nadir (−x direction).

Bulbous Light Emitting Device

In one embodiment, a light emitting device includes a film-based lightguide or light emitting film with a region that is formed into a bulbous shape. In another embodiment, the coupling lightguides couple light into the periphery region of the bulbous shaped lightguide region of the film-based lightguide. For example, in one embodiment, a region of a planar film-based lightguide is vacuum thermoformed into the shape of a bulb and coupling lightguide strips are cut radially from the bulbous region and brought together to provide an arrangement of light input surfaces disposed to receive light from a light source. In this embodiment, the light is effectively entering the light emitting region of the bulbous shaped film-based lightguide through all of the peripheral directions due to the radially extending coupling lightguides. Other shapes and form factors of the film-based lightguide or light emitting film or sub-region thereof including one or more light emitting regions may similarly be formed into the film by thermoforming, vacuum thermoforming, hot pressing, compression molding, cold forming, or other techniques known in the art to form a film into a shape. Similar circular or round shapes, such as discs, bowl-shapes, cylinders, and/or cones, for example, may also be formed with radially extended coupling lightguides.

Dome Shaped Light Emitting Device

In one embodiment, a light emitting device includes a film-based lightguide or light emitting film formed substantially into the shape of a dome or hemisphere. For example, in one embodiment, two sets of coupling lightguides from opposite sides of a film-based lightguide formed with a dome region between are folded and brought together to receive light from a light source disposed substantially within the dome region. In this embodiment, the light travels in opposite directions due to the two sets of coupling lightguides from opposite ends of the film-based lightguide. In another embodiment, light travels with an optical axis substantially in one direction from the light source in the film-based lightguide formed with a dome-shaped region. In another embodiment, the light travels in radial directions from a light source through a dome-shaped region of a film-based lightguide due to coupling lightguides formed by radial cuts from a dome region. In another embodiment, a light emitting device includes a film-based lightguide with a dome-shaped region and one or more of the following: a light source, a thermal transfer element, a camera, and an electrical driver disposed substantially within (or substantially encapsulated by) the dome-shaped region volume, outside the dome-shaped region volume, or partially within and partially outside the dome-shaped region volume.

Light Emitting Device is a Replacement Light Bulb

In one embodiment, the light emitting device is a replacement light bulb or a light source that can be electrically coupled to a light fixture. As used herein, a "light bulb" is not necessarily bulbous or round in shape and may also represent light emitting devices with non-bulbous, flat regions, or shapes with curves and flat regions and other shapes as is commonly used for a "light bulb" such as linear fluorescent bulbs and halogen bulbs, for example. In one embodiment, a light emitting device is a replacement light bulb that includes a film-based lightguide with an arcuate shape and a light source disposed to couple light through coupling lightguides into the film-based lightguide. In another embodiment, the light emitting device is a light bulb including a substantially planar light emitting region on a film-based lightguide or light emitting film. In one embodiment, the light emitting device further includes a protective cover or bulb-shaped lens disposed to receive and transmit light from light emitting regions of the film-based lightguide or light emitting film to the exterior of the light emitting device. In one embodiment, the light emitting device receives electrical power through one or more bases, such as an Edison type screw base, Edison E27 type screw base, E5, E10, E11, E12, E14, E17, E17, E26, E27, E39, E40, bayonet, bipin, festoon base, Fluorescent T8 base, Fluorescent T5, Fluorescent T5HO, PAR 36, MR11, MR16, MR8, single contact bayonet, double contact bayonet, S8 wedge, G4 BiPin, G5.3 BiPin, wedge, T5 wedge, ormini-can. In one embodiment, the light emitting device is a replacement light bulb or light source with an electrical connector disposed to receive electrical power and emit light wherein the light emitting device further includes one or more of the following components: an electrical base connector, a thermal transfer element, an electrical driver, an electrical component, an LED, a light source, a light input coupler, a circuit board, a sensor, a control component, an optical feedback component, and a communication component, where the component is disposed within the base, disposed within the volume substantially enclosed by the protective housing, disposed within the housing of the light emitting device, or is part of the outer surface of the light emitting device. For example, in one embodiment, the light emitting device includes a protective lens with light redirecting surface features disposed on an inner surface of the lens disposed to redirect and transmit light through the lens and out of the light emitting device.

Front Light Illumination Device

In one embodiment, the light emitting device includes a light emitting region with light extraction features that is disposed to illuminate a region of a reflective display and transmit light reflected from the reflective display back through the substantially transparent regions of the light emitting region between the light extraction features. For example, in one embodiment, the light emitting device includes a film-based lightguide laminated to an inner surface of a glass window positioned in a picture frame with the coupling lightguides and light source disposed within the picture frame. In this embodiment, the light from the light emitting regions is directed toward a picture in the frame and the light is reflected from the picture and transmitted through the film-based lightguide and glass window. In another embodiment, the light emitting device is a frontlight for a reflective display disposed adjacent the light emitting region of the film-based lightguide. In one embodiment, the light emitting device includes a film-based lightguide with a light emitting region including light extraction features that emits a light flux away from the light emitting device greater than one selected from the group of: 2, 5, 10, 20, 30, 50, and 100 lumens in a first direction with a directional component parallel to a surface normal to one side of the frontlight. The light emitting region has an average ASTM D1003 luminous transmittance measured according to ASTM D1003 with a BYK Gardner haze meter greater than one selected from the group of: 50%, 60%, 70%, 80%, 90%, and 95% in a second direction opposite the first direction. In another embodiment, the light emitting device includes a film-based lightguide with a light emitting region including light extracting surface features that emits a light flux away from the light emitting device greater than one selected from the group of: 2, 5, 10, 20, 30, 50, and 100 lumens in a first direction with a directional component parallel to a surface normal to one side of the frontlight. The light emitting region has an average clarity measured with a BYK Gardner haze, transmittance, and clarity meter greater than one selected from the group of: 70%, 80%, 88%, 92%, 94%, 96%, 98%, and 99% in a second direction opposite the first direction.

Frontlight and Light Fixture

In one embodiment, the light emitting device is a frontlight and a light fixture emitting light at two significantly different average luminous intensities within two non-overlapping angular ranges. For example, in one embodiment, the light emitting device is a frontlight for a display (such as a wall-mounted self-luminous picture frame) and a light fixture (such as wall-mounted uplight) providing high angle illumination of the ceiling that emits light such that the average luminance of the light emitting surface normal to the light emitting surface is (in the "on" state or illuminating a diffuse white reflecting material with 70% reflectance) less than 500 Cd/m² and the average luminance of the light emitting surface at an angle within a range between and including 60 degrees and 90 degrees from the normal to the light emitting surface is greater than 2,000 Cd/m². In another embodiment, the light emitting device is a frontlight for a display (such as a wall-mounted self-luminous picture frame) and a light fixture (such as wall-mounted uplight) providing high angle illumination of the ceiling that emits light such that the luminous intensity of the light emitting device normal to the light emitting surface is (in the "on" state or illuminating a diffuse white reflecting material with 70% reflectance) less than one selected from the group of: 100 Candelas, 200 Candelas, 300 Candelas, 400 Candelas, and 500 Candelas and the average luminance of the light emitting surface at an angle within a range between and including 60 degrees and 90 degrees from the normal to the light emitting surface is greater than one selected from the group of: 500, 750, 1000, 2000, 3000, 4000, and 500 Candelas. In another embodiment, the light emitting device includes a light emitting surface functioning as a display with a first peak luminous intensity output within a first angular range (in the "on" mode, white mode or illuminating a white diffusely reflecting material with 70% diffuse reflectance) and the light emitting surface functions as a light fixture within a second angular range not overlapping the first angular range with a second peak luminous intensity wherein the ratio of the second luminous intensity to the first luminous intensity is greater than one selected from the group of: 2, 5, 7, 10, 15, 20, 30, 40, 60, and 80. In one embodiment, one or more cladding regions include light extraction features on a surface opposite the film-based lightguide and light from a light source is coupled into the cladding region(s) such that the light from the cladding region(s) provide illumination as a light fixture and the light extracted from the core region provides backlight or frontlight illumination for a passive or active display. For example, in one embodiment, a cladding region is position on each side of a film-based lightguide is three times as thick as the core region. A plurality of LEDs are disposed to couple light into a stack of coupling lightguides extending from the film-based lightguide such that more light is propagating within the cladding regions that reaches the light extraction features disposed on an outer surface or within one or more cladding regions than is propagating within the core region of the lightguide and reaches the light extraction features disposed on, within, or adjacent to the core region of the lightguide.

In another embodiment, the light emitting device operates as a display backlight or frontlight and is oriented substantially horizontally such that it displays information when looked down (or up) onto the display and the display illuminates a wall, steps or other surface disposed to receive the light. In a further embodiment, the light emitting device is a backlight for a display and light fixture. In another embodiment, the light emitting device is a backlight or frontlight for a display and emits light out of the edge of one or more regions of the lightguide, core layer, cladding layer, or two or more cladding regions.

Preferential Light Output on One Side of the Lightguide

In one embodiment, a light emitting device includes a film-based lightguide with a light transmitting region within a light emitting region wherein the light flux emitted from a first side of the lightguide is substantially greater than the light flux emitted from a second side of the lightguide opposite the first side. In one embodiment, the light flux emitted from one side of the lightguide is greater than one selected from the group of: 50%, 60%, 70%, 80%, 90%, 95% and 99% of the light emitted from the light emitting device. By having light transmitting regions within the light emitting regions, such as between light extraction features for example, and controlling most of the light output to be emitted from one side, embodiments of the light emitting device can function as a one-way light source, analogous to a one-way mirror. For example, in one embodiment, the light emitting device emits light from light extraction features that are sufficiently bright and small that the appearance from a predetermined distance appears substantially uniform. This is analogous to a LED-based billboard sign wherein at a predetermined distance, the spacing regions between the LEDs is not readily visible. In this embodiment, the regions between the light extraction regions, for example, may be transparent such that a viewer can see through the light emitting region. In another embodiment, a camera is disposed on a side of the light emitting region with the lower light flux output such that the camera is not readily visible or ascertainable from the high light flux output side and the camera can image regions of the environment on the opposite side of the light emitting region. In one embodiment, the light emitting region appears to be a substantially continuous light emitting surface from the high light flux emitting side of the light emitting region. In one embodiment, the average pitch separation between the light extraction features is less than one selected from the group of: 10, 5, 3, 2 and 1 millimeters and the average luminance of the light emitting region is greater than one selected from the group of: 50, 100, 200, 300, 500, 1000, 2000, and 3000, 5000, and 10,000 cd/m². In another embodiment, the light emitting device includes a film-based lightguide including a light emitting region with light extraction features wherein a first light emitting surface of the light emitting device emits more light received from a lightguide than a second surface of the light emitting device on the opposite side of the lightguide than the first surface and light absorbing regions are disposed substantially between the light extraction features and the second surface. For example, in one embodiment a light emitting device includes a film-based lightguide with white printed dots with an average pitch of 1 mm on one side of a light emitting region and black printed dots overprinted on top of the white printed dots. In this embodiment, the light from within the lightguide scatters from the white printed dots and exits the lightguide and light emitting device from the light emitting region on the opposite surface of the film-based lightguide than which the dots are printed. The black dots substantially absorb light that is transmitted through the white dot regions such that less light is emitted from the light emitting device on the side of the lightguide on which the dots are printed. In one embodiment, the light absorbing regions are larger than the light extraction features in at least one direction by one selected from the group of: 5%, 10%, 20%, 40%, 50%, 60%, 80%, 100%, and 150%.

Distributed Illumination System

In one embodiment, a distributed illumination system includes a light emitting device including at least one light output coupler optically coupled to a distribution lightguide in a light transmitting region of the distribution lightguide. In one embodiment, the light output coupler includes one or more of the following: a film-based lightguide, an optical element, a light transferring element, a distribution lightguide, and a coupling lightguide. For example, in one embodiment, a distributed illumination system includes a light source disposed to couple light into an array of coupling lightguides that are extensions of a long thin strip film-based distribution lightguide. In this embodiment, the light travels along the length of the distribution lightguide and is coupled out of the lightguide in light transmitting regions where the distribution lightguide is optically coupled to light receiving regions of a light output coupler lightguide film. In this embodiment, the light travels through the light output coupler lightguide film and is extracted by light extraction features in a light emitting region of the light output coupler lightguide film.

Light Output Coupler

More than one light output coupler may be used to couple light out of the lightguide at various locations along the lightguide. In one embodiment, a first portion of the light incident on the light output coupler is specularly reflected or transmitted such that the light does not exit the light output coupler at the next interface due to arriving at the interface at an angle less than the critical angle. By specularly reflecting or transmitting a first portion of light, that light may continue to travel within the light output coupler without being extracted within or near the light receiving region. For example, in one embodiment, the light output coupler is a film-based lightguide disposed to receive a first portion of light from transmitting through the light transmitting region of the distribution lightguide in a light receiving region. The light output coupler transmits the light to a light emitting region including light extraction features further along the light output coupler from the light receiving region. In one embodiment, a light output coupler directs light away from the light transmitting region of the distribution lightguide and the light emitting region of the light output coupler is larger than the light receiving region. Thus, in this embodiment, the light output coupler is able to extract a portion of light from the lightguide and emit the light in a light emitting area larger than the area that the light output coupler is in optical contact with the lightguide. In one embodiment, the cross-sectional luminous flux density (measured perpendicular to the optical axis of the light propagating within the lightguide in Lumens/mm$^2$) within the region of the distribution lightguide determined by a thickness of the distribution lightguide and a width of the light transmitting region (in a direction orthogonal to the optical axis) at the start of the light transmitting region is greater than the luminous flux density of the cross-section of the output coupling lightguide in the region determined by a width of the light emitting region or the output coupling lightguide and a thickness of the output coupling lightguide at a beginning of the light emitting region. In another embodiment, the cross-sectional luminous flux density within a region of the output coupling lightguide (measured perpendicular to the optical axis of the light propagating within the lightguide in Lumens/mm$^2$) determined by a width and a thickness of the light receiving region at a beginning of the light receiving region is greater than the luminous flux density of the cross-section of the region of the output coupling film determined by a width and a thickness of the light emitting region at a beginning of the light emitting region. In another embodiment, a ratio of the distribution lightguide luminous flux density at the beginning of the light transmitting region to the luminous flux density of the output coupling lightguide at the beginning of the light emitting region is greater than one selected from the group of: 1, 2, 5, 10, 20, 40, and 100.

In another embodiment, an average width of the light receiving region of the light output coupler in the direction substantially orthogonal to the optical axis of the light within the film-based lightguide is less than an average width of the film-based lightguide (or distribution lightguide) at the region. In this embodiment, the amount of light coupled out of the distribution lightguide can be reduced by reducing the width of the light receiving region of the light output coupler. In another embodiment, a light emitting device includes two or more light output couplers optically coupled to a distribution lightguide wherein the light transmitting regions of the distribution lightguide do not both intersect a single line parallel to the optical axis of the light within the film-based lightguide. In this embodiment, the light transmitting regions are not sequentially overlapping such that they each receive a portion of the light travelling within the lightguide that is spatially separated from the other along a direction perpendicular to the optical axis of the lightguide. For example, in one embodiment, one light output coupler transmits about 60% of the incident flux into the light output coupler, and only about 40% of the light remaining from that region of the distribution lightguide travels onto the second output coupling lightguide. Separating the light output couplers laterally provides another variable of control for determining the flux of light output from the lightguide from a particular light output coupler. In another embodiment, a light emitting device includes two or more light output couplers optically coupled to a distribution lightguide with corresponding light transmitting regions that do not both intersect a single line perpendicular to the optical axis of the light within the film-based lightguide. In this embodiment, the light transmitting regions are not disposed substantially adjacent to each other along the lightguide in a direction substantially orthogonal to the optical axis. In this embodiment, one light output coupler is disposed further along the distribution lightguide than the other such that a location of light output may be distributed further along in the direction of the optical axis. In another embodiment, the light transmitting regions of the distribution lightguide corresponding to first and second light output couplers intersect a single line perpendicular or parallel to the optical axis of the distribution lightguide. For example, a second light output coupler may be disposed partially behind (further along the distribution lightguide) a first light output coupler. In another example, a second light output coupler may be disposed partially adjacent and behind a first light output coupler. In a further embodiment, the location of the light output couplers in a direction parallel or perpendicular to the optical axis of the light within the distribution lightguide is determined at least in part by a desired output location of the light exiting a light emitting region of the light output couplers. In another embodiment, the light output coupler has an average thickness larger than the film-based lightguide in the region of the light receiving region of the light output coupler. In another embodiment, the light output coupler has an average width smaller than the film-based lightguide in the region of the light receiving region of the light output coupler.

In one embodiment, a location and an orientation of the light output couplers may be changed or first applied by the user or installer. For example, in one embodiment, the light output couplers may be applied to the distribution lightguide upon installation. In another example, the location of the light output couplers may be changed by peeling back the light output couplers and reapplying the light output couplers to optically couple the light output couplers to the distribution lightguide by using low tack adhesives or low tack materials for all or part of the film-based lightguide or light output coupler.

In another embodiment, a light emitting device includes a film-based distribution lightguide and an output coupling lightguide optically coupled to the distribution lightguide in a plurality of light transmitting regions. For example, in one embodiment, the output coupling lightguide is optically coupled to the distribution lightguide by strip coupling lightguides separated by fold regions. By dividing up the light transmitting region into a plurality of smaller light transmitting regions that are separated from each other, a relative uniformity of the flux within the lightguide may remain substantially uniform in a direction perpendicular to the optical axis. For example, in one embodiment, a light output coupler couples out 60% of the light flux from the distribution lightguide and the cross-sectional luminous flux density uniformity in the lightguide in the region just past the light output coupler is reduced. By separating out the light transmitting region and spreading the light transmitting region out spatially along a surface of the distribution lightguide, a uniformity of the light remaining in the lightguide is improved over a single large, continuous light transmitting region.

In one embodiment, fold regions in the output coupling lightguide increase a flexural rigidity or modulus of the output coupling lightguide in a plane perpendicular to the fold regions. In another embodiment, the fold regions allow for an increased light emitting surface of the light output coupler. For example, in one embodiment, the light output coupler includes a folded light emitting region and coupling lightguides coupled to the distribution lightguide in light transmitting regions. A width of the light output coupler is larger than a width of the distribution lightguide in the direction orthogonal to a thickness direction of the distribution lightguide and orthogonal the optical axis of the light in the distribution lightguide.

Recycling Light Output Coupler

In one embodiment, a light emitting device includes a film-based lightguide, a light input coupler, and a light output coupler including output coupling lightguides disposed to receive light from within the film-based lightguide and direct the light through the output coupling lightguides to a specularly reflecting element such that the light returns through the coupling lightguides into the film-based lightguide and is recycled. In this embodiment, the light that passes through the lightguide without being extracted can be recycled by reflecting the light through the use of output coupling lightguides and a specular reflector. In one embodiment, the specular reflector used for recycling includes one or more of the following: a retroreflective film (such as specularly reflecting corner cube film), an aluminized component (such as an aluminized PET film), a specularly reflecting aluminum component, and a specularly reflecting multilayer polymer film. In another embodiment, the film based lightguide includes more than one light output coupler. For example, in one embodiment, a film-based lightguide includes a light input coupler on a first edge of the lightguide and three light output couplers optically coupled to three specularly reflecting mirror films along the three remaining edges to efficiently reflect back the light that is not extracted from the lightguide in the first pass.

Recycling Using Output Coupling Lightguides

In another embodiment, the light emitting device includes an input coupler disposed to couple light into a film-based lightguide and a light output coupler disposed to receive light from the film-based lightguide. In this embodiment, the output coupling lightguides are folded to redirect light into a region of the light input surface of a plurality of input coupling lightguides in the input coupler. In another embodiment, a portion of the light propagating through the light emitting region of the light emitting device that is not emitted is recycled by propagating through output coupling lightguides with ends disposed to emit light into a region of the light input coupler. In this embodiment, a portion of the light within the lightguide is recycled back into the lightguide. For example, in one embodiment a light emitting device includes a light input coupler including coupling lightguides disposed along a first side of a film-based lightguide and a light output coupler including output coupling lightguides disposed on a second side opposite the first side. In this embodiment, the output coupling lightguides in the light output coupler are folded three times such that light travels alongside the film-based lightguide edge disposed between the first and second sides and the light emitting ends of the coupling lightguide are optically coupled to input light into a region of the input coupling lightguides. In this embodiment, two or more of the output coupling lightguides may be physically separated along the second side of the film-based lightguide and the region along the second side between the output coupling lightguides may include reflective features along the side such as 90 degree triangular cuts in the film that reflect light back into the light emitting region of the film-based lightguide.

Removable Cladding Region

In one embodiment, the distributed illumination system includes a cladding region optically coupled to the lightguide that may be removable or repositionable. In another embodiment, the cladding may be separated from the lightguide in a light transmitting region and a light output coupler may be disposed in optical contact within the light transmitting region. For example, in one embodiment, a distributed illumination system includes a light source disposed to couple light into an array of coupling lightguides that are extensions of a long thin strip film-based lightguide. In this embodiment, the light travels along a length of the distribution lightguide film and substantially remains in the lightguide in a region beneath the cladding region. The cladding region is removed, exposing a light transmitting region of the core region. A light output coupler is optically coupled to the lightguide at the light transmitting region such that a portion of light within the lightguide is coupled out of the lightguide into the light transmitting region. In this embodiment, light travels through the light output coupler lightguide film and is extracted by light extraction features in a light emitting region of the light output coupler lightguide film. In another embodiment, the cladding region is a flap including a tab that allows it to be easily pulled away from the lightguide while remaining physically coupled to the distributed illumination system such that a light output coupler may be optically coupled to the lightguide. For example, the light output coupler is optically coupled to the lightguide by pressing a tacky film-based light output coupler onto the core region of the lightguide film. In a further embodiment, the flap is laid back onto the light output coupler after the flap is optically coupled to the light transmitting region on the distribution lightguide. When there is a desire to replace or change the light output coupler, the light output coupler may be removed and the old or a new cladding region may be re-applied, adhered or otherwise optically coupled to the lightguide.

In another embodiment, the lightguide is a tacky film, such as a silicone film, and the cladding layer is peeled away from the lightguide such that the cladding layer is not physically coupled to the distributed illumination system. The tacky film, in this embodiment, helps hold on the cladding region and promotes adhesion of the light output coupler to the lightguide or a new or the same cladding region subsequent to removal of the light output coupler.

Luminous Patterns, Signs, and Window Displays

In another embodiment, a light emitting device is used as an overlay with indicia that can be illuminated. In one embodiment, the lightguide region has a low degree of visibility in the off-state, and in the on-state can be clearly seen as illuminated indicia or luminous patterns. In another embodiment, the light emitting device is a ubiquitous display that displays information in the environment of the viewer. For example, in one embodiment, the light emitting device is disposed in a frame adjacent a photograph with a matte board. The light emitting device is a frontlight with a first light emitting region on a first lightguide including a light emitting region adjacent the photograph emitting white light to illuminate the photograph. The device further includes a second light emitting region on a second lightguide adjacent the white matte board around the photograph that illuminates the matte board with green light based on positive health information (or red information based on negative health information) of the individual in the photograph received by the light emitting device across a wireless network connected to a wireless personal health monitor on the individual.

In another embodiment, a light emitting device is used as an overlay with indicia that can be illuminated. In one embodiment, the lightguide region has a low degree of visibility in the off-state, and an in the on-state can be clearly seen as illuminated indicia. For example, the lightguide region may be printed with light scattering dots to illuminate and display indicia such as "Warning," "Exit," "Sale," "Enemy Aircraft Detected," "Open," "Closed," "Merry Christmas," etc. The lightguide region may be disposed on the viewing side of a display (such as a liquid crystal display, plasma display, projection display, etc.) or it may be placed on a store or home window, on a table surface, a road sign, on a vehicle or air/water/land craft exterior or window, over or inside a transparent, translucent, or opaque object, on a door, stairs, in a hallway, or within a doormat, etc. The indicia may also be icons, logos, images, or other representations such as a cartoon-like drawing of Santa Claus, a brand logo such as the Nike "Swoosh", a photo of a beach scene, a dithered photo of the face of a person, etc. The indicia may be full-color, monochrome or comprise mixtures of colored or monochrome regions and may be layered or employ phosphors, dyes, inks or pigments to achieve colors. In another embodiment, the light emitting device is a ubiquitous display that displays information in the environment of the viewer. For example, in one embodiment, the light emitting device is disposed in a frame adjacent a photograph with a matte board where the light emitting device is a frontlight with a first light emitting region on a first lightguide comprises a light emitting region adjacent the photograph emitting white light to illuminate the photograph and the device further comprises a second light emitting region on a second lightguide adjacent the white matte board around the photograph that illuminates the matte board with green light based on positive health information (or red information based on negative health information) of the individual in the photograph received by the light emitting device across a wireless network connected to a wireless personal health monitor on the individual.

By using a lightguide film which is substantially not visible in the off-state, the display, sign, or light emitting device can be employed in more places without substantially interfering with appearance of the object on which it is disposed. In another embodiment, the light emitting device provides illumination of a space wherein the region which emits light in the on-state is not readily discernable in the off-state. This, for example, can provide thin light fixtures or illumination devices that are substantially only visible in the on-state. For example, vehicle tail lights, seasonal window film displays, ceiling mounted light fixtures, lamps, closed signs, road hazard signs, danger/warning signs, etc. may be substantially invisible in the off-state. In some situations, this enables the signs to be posted and only turned on when needed and can reduce delays incurred due to the installation time required. In another embodiment, the light emitting device is a light fixture which appears to be the color of the background surface upon which it is place upon in the off-state. In another embodiment, the light emitting area of the light fixture is substantially black or light absorbing in the off-state. Such displays are useful in submarines or other aircraft under NVIS illumination conditions.

In a further embodiment, the lightguide film comprises a cladding region disposed between the core layer and a light absorbing layer. For example, the light redirected by the light extraction features into angles less than the critical angle between the core layer and the cladding layer may be at an angle that remains within a lightguide condition of a window-air interface when the lightguide is optically coupled to a window. In this example, the light will remain trapped within the window and lightguide film until it is absorbed or re-directed out of the lightguide. Scratches, fingerprints, and other blemishes on the window may be illuminated by this light and the light redirected out of the window causing visible artifacts. In one embodiment, a light absorbing coating, layer or region is disposed between a cladding layer and the window and substantially absorbs the light through the multiple TIR reflections and reduces the visibility of this artifact. In another embodiment, the light absorbing region, coating, or layer has an average specular light transmission (including specular reflections) for the wavelength range of at least one light source for the light emitting device less than one selected from the group of 85%, 80%, 75%, 70%, and 65%. In one embodiment, placing the light absorbing region on the opposite side of the cladding region than the core region (and by not placing the light absorbing material inside the cladding region), only the light passing through the cladding layer will reach the light absorbing region. In the previous embodiment, when the lightguide is optically coupled to a window, the light that will exit the window only passes through the light absorbing layer once while the light trapped within the glass will pass through many times and will have a greater chance of being significantly reduced in intensity before reaching a light extracting artifact (scratch, fingerprint, etc.) on the window. In another embodiment, the lightguide has an average specular light transmission (including specular reflections) for the wavelength range of at least one light source for the light emitting device less than one selected from the group of 85%, 80%, 75%, 70%, and 65%.

Lightguide Adjacent to a Window

In one embodiment, the lightguide film is substantially separated from the window by an air gap. In another embodiment, the light extraction features in the lightguide film do not redirect light into an angle within the window greater than the critical angle of the window (typically angles greater than about 42 degrees from the surface normal). In one embodiment, the lightguide film is held in place by standoffs or physically coupling the lightguide, light input coupler, housing or other element of the light emitting device to the window, frame, or other element disposed in proximity to the window. In another embodiment, the lightguide is disposed proximate the window and is supported by a stand, a hanging mechanism to a wall or ceiling, or a mount to a wall or ceiling, for example.

In one embodiment, a light emitting device includes a light source, coupling lightguides, a lightguide including a light emitting region, and a mechanism or component for physically coupling the lightguide to a window or window frame. For example, the lightguide may include an adhesive material (such as a "static cling" PVC film or silicone rubber film) disposed on one side of a core region of a lightguide such that the light emitting device may be laminated (by hand or with the assistance of a roller and/or application fluids, for example) to a window such that the light emitting device supports its own weight. In this embodiment, the region of the lightguide not emitting light may be substantially transparent and the light emitting region may be substantially transparent, translucent, or partially transparent when the light source is turned off. In one embodiment, the light input coupler is disposed at the lower end of a lightguide such that the force does not substantially pull the lightguide away from the window. In another embodiment, the adhesion layer is a cladding layer with a refractive index lower than a refractive index of the core layer. The lightguide further includes a cladding layer on the opposite side of the core layer. In another embodiment, the light emitting device is disposed on a window sill or other supporting structure with the lightguide physically coupled to or disposed near the window. In another embodiment, the light emitting device includes one or more suction cups that physically couple the device to a substantially non-porous surface. For example, in one embodiment, a light input coupler disposed on the lower edge of a lightguide includes suction cups that adhere the light input coupler to a window. The lightguide film has a low peel-strength adhesive, material, or region disposed to physically couple the lightguide film to a non-porous surface such as a window. In another embodiment, the lightguide film defines apertures through which portions of a suction cup or a hook or extension thereof may pass through such that the lightguide film is supported vertically. Other suitable mechanical components such as latches, fasteners, hook and/or loop fasteners (using adhesive to bond the hook to the glass and the loop to the light input coupler, for example) may be used to fasten or couple the light emitting device or a component thereof (such as the lightguide) to a window or a substantially non-porous surface.

In another embodiment, a kit includes a light emitting device with an adhesive film or water soluble adhesive that will physically and optically couple the lightguide to a glass window. In a further embodiment, the kit includes a roller suitable for moving an application liquid between the lightguide and a window, thus removing air bubbles and spreading the adhesive.

Signs and Window Displays

In another embodiment, a light emitting device is used as an overlay with indicia that can be illuminated. In one embodiment, the lightguide region has a low degree of visibility in the off-state, and an in the on-state can be clearly seen as illuminated indicia. For example, the lightguide region may be printed with light scattering dots to illuminate and display indicia such as "Warning," "Exit," "Sale," "Enemy Aircraft Detected," "Open," "Closed," "Merry Christmas," etc. The lightguide region may be disposed on the viewing side of a display (such as a liquid crystal display, plasma display, projection display, etc.) or it may be placed on a store or home window, on a table surface, a road sign, on a vehicle or air/water/land craft exterior or window, over or inside a transparent, translucent, or opaque object, on a door, stairs, in a hallway, or within a doormat, etc. The indicia may also be icons, logos, images, or other representations such as a cartoon-like drawing of Santa Claus, a brand logo such as the Nike "Swoosh", a photo of a beach scene, a dithered photo of the face of a person, etc. The indicia may be full-color, monochrome or comprise mixtures of colored or monochrome regions and may be layered or employ phosphors, dyes, inks or pigments to achieve colors. In another embodiment, the light emitting device is a ubiquitous display that displays information in the environment of the viewer. For example, in one embodiment, the light emitting device is disposed in a frame adjacent a photograph with a matte board where the light emitting device is a frontlight with a first light emitting region on a first lightguide comprises a light emitting region adjacent the photograph emitting white light to illuminate the photograph and the device further comprises a second light emitting region on a second lightguide adjacent the white matte board around the photograph that illuminates the matte board with green light based on positive health information (or red information based on negative health information) of the individual in the photograph received by the light emitting device across a wireless network connected to a wireless personal health monitor on the individual.

By using a lightguide film which is substantially not visible in the off-state, the display, sign, or light emitting device can be employed in more places without substantially interfering with appearance of the object on which it is disposed. In another embodiment, the light emitting device provides illumination of a space wherein the region which emits light in the on-state is not readily discernable in the off-state. This, for example, can provide thin light fixtures or illumination devices that are substantially only visible in the on-state. For example, vehicle tail lights, seasonal window film displays, ceiling mounted light fixtures, lamps, closed signs, road hazard signs, danger/warning signs, etc. may be substantially invisible in the off-state. In some situations, this enables the signs to be posted and only turned on when needed and can reduce delays incurred due to the installation time required. In another embodiment, the light emitting device is a light fixture which appears to be the color of the background surface upon which it is place upon in the off-state. In another embodiment, the light emitting area of the light fixture is substantially black or light absorbing in the off-state. Such displays are useful in submarines or other aircraft under NVIS illumination conditions.

In a further embodiment, the lightguide film comprises a cladding region disposed between the core layer and a light absorbing layer. For example, the light redirected by the light extraction features into angles less than the critical angle between the core layer and the cladding layer may be at an angle that remains within a lightguide condition of a window-air interface when the lightguide is optically coupled to a window. In this example, the light will remain trapped within the window and lightguide film until it is absorbed or re-directed out of the lightguide. Scratches, fingerprints, and other blemishes on the window may be illuminated by this light and the light redirected out of the window causing visible artifacts. In one embodiment, a light absorbing coating, layer or region is disposed between a cladding layer and the window and substantially absorbs the light through the multiple TIR reflections and reduces the visibility of this artifact. In another embodiment, the light absorbing region, coating, or layer has an average specular light transmission (including specular reflections) for the wavelength range of at least one light source for the light emitting device less than one selected from the group of 85%, 80%, 75%, 70%, and 65%. In one embodiment, placing the light absorbing region on the opposite side of the cladding region than the core region (and by not placing the light absorbing material inside the cladding region), only the light passing through the cladding layer will reach the light absorbing region. In the previous embodiment, when the lightguide is optically coupled to a window, the light that will exit the window only passes through the light absorbing layer once while the light trapped within the glass will pass through many times and will have a greater chance of being significantly reduced in intensity before reaching a light extracting artifact (scratch, fingerprint, etc.) on the window. In another embodiment, the lightguide has an average specular light transmission (including specular reflections) for the wavelength range of at least one light source for the light emitting device less than one selected from the group of 85%, 80%, 75%, 70%, and 65%.

Optically Coupling Light into the Window

In one embodiment, a lightguide or light output coupling element is optically coupled to a glass or plastic window such that light is coupled into the window and travels within the window in a total internal reflection condition. By coupling light into a window, one can illuminate frosted or etched glass, films disposed on the window, or embossed plastic patterns such as logos or decoration on the window. In one embodiment, the light coupled into the window is extracted by rain, water, or condensation on the window effectively forming lenses to provide rain or weather indication or an aesthetic luminous effect. In another embodiment, light from a light source is coupled into a window from a light output coupler or lightguide optically coupled to the window and a light extraction region or film is optically coupled to the window such that light escapes the window in the region of the light extraction region. In the previous embodiment, the window is functioning as the core region of a lightguide. In one embodiment, the window has wavelength dependent absorption properties (such as absorbing red light more than blue light) and the output of the light from the lightguide or light output coupler compensates for the absorption in order to achieve a desired color such as white. For example, in one embodiment, the light from the lightguide comprises more red light output than blue light output to compensate for the green absorption in a soda-lime glass window.

Lightguide Adjacent to a Window

In one embodiment, the lightguide film is substantially separated from the window by an air gap. In another embodiment, the light extraction features in the lightguide film do not redirect light into an angle within the window greater than the critical angle of the window (typically angles greater than about 42 degrees from the surface normal). In one embodiment, the lightguide film is held in place by standoffs or physically coupling the lightguide, light input coupler, housing or other element of the light emitting device to the window, frame, or other element disposed in proximity to the window. In another embodiment, the lightguide is disposed proximate the window and is supported by one or more selected from the group of a stand, a hanging mechanism to a wall or ceiling, and a mount to a wall or ceiling.

In one embodiment, a light emitting device comprises a light source, coupling lightguides, a lightguide comprising a light emitting region, and a method for physically coupling the lightguide to a window or window frame. For example, the lightguide may comprise an adhesive material (such as a "static cling" PVC film or silicone rubber film) disposed on one side of a core region of a lightguide such that the light emitting device may be laminated (by hand or with the assistance of a roller and/or application fluids, for example) to a window such that the light emitting device supports its own weight. In this embodiment, the region of the lightguide not emitting light may be substantially transparent and the light emitting region may be substantially transparent, translucent, or partially transparent when the light source is turned off. In one embodiment, the light input coupler is disposed at the lower end of a lightguide such that the force does not substantially pull the lightguide away from the window. In another embodiment, the adhesion layer is a cladding layer with a refractive index lower than the core layer and the lightguide further comprises a cladding layer on the opposite side of the core layer. In another embodiment, the light emitting device may be disposed on a window sill or other supporting structure with the lightguide physically coupled to or disposed near the window. In another embodiment, one or more cladding layers of the lightguide comprises a protective coating such as a hardcoating wherein the pencil hardness of the protective coating is greater than one selected from the group of 8H, 7H, 6H, 5H, 4H, 3H, and 2H. In a further embodiment, the lightguide comprises an ammonia resistant coating such that the coating does not show evidence of crazing or whitening after 5 hours of exposure to 1% ammonium hydroxide or 3% isopropyl alcohol. In a further embodiment, the lightguide comprises a tab region or other extended region that physically decouples the lightguide from a window when pulled.

In one embodiment, the lightguide is physically and optically coupled to a window (glass or plastic) and the transmittance through a substantially non-light emitting region of the lightguide is greater than one selected from the group of 70%, 80%, 86%, 88%, 90% and 92%. Optically coupling the lightguide to the window can reduce or substantially eliminate the surface reflection from the inner lightguide-air and air window interfaces. This reduces the overall visibility of the lightguide film and its light extraction features (the close proximity required for optical coupling also reduces extraneous multiple reflections).

In another embodiment, the light emitting device comprises one or more suction cups that physically couple the device to a substantially non-porous surface. For example, in one embodiment, a light input coupler disposed on the lower edge of a lightguide comprises suction cups that adhere the light input coupler to a window and the lightguide film has a low peel-strength adhesive, material, or region disposed to physically couple the lightguide film to a non-porous surface such as a window. In another embodiment, the lightguide film comprises holes through which portions of a suction cup or a hook or extension thereof may pass through such that the lightguide film is supported vertically. Other mechanical means such as latches, fasteners, hook and loop fasteners (using adhesive to bond the hook to the glass and the loop to the light input coupler, for example) may be used to fasten or couple the light emitting device or a component thereof (such as the lightguide) to a window or a substantially non-porous surface.

In another embodiment, a kit comprises a light emitting device with an adhesive film or water soluble adhesive that will physically and optically coupled the lightguide to a glass window. In a further embodiment, the kit comprises a roller suitable for moving an application liquid between the lightguide and a window, thus removing air bubbles and spreading the adhesive.

Light Emitting Packaging

In one embodiment, a light emitting device including a film-based lightguide is disposed within or physically coupled to a packaging material. In one embodiment, a packaging material or product includes a light emitting device including a light input coupler with a light source, and a light emitting region on a flexible film-based lightguide. In one embodiment, the film-based lightguide film is optically coupled to the packaging. In a further embodiment, the packaging includes a transparent region disposed to transmit light exiting the film-based lightguide out of the package. In another embodiment, a light emitting device includes a film-based lightguide that substantially encloses one or more objects such that the film-based lightguide is a packaging material for the one or more objects. In this embodiment, the light input coupler may be disposed substantially within a volume of the packaging, substantially outside the volume of the packaging, or partially within and outside the volume of the packaging. In another embodiment, the light emitting regions of the packaging includes designs, outlines, logos, graphics, images, pictures, and indicia or combinations thereof. In further embodiments, one or more of multiple film-based lightguide layers, different colored light sources, different extraction regions, sensors, motion detectors, batteries, and other devices enable additional functionality, properties, appearance, and/or light output profiles for the light emitting device incorporated into or within the packaging. In another embodiment, the packaging material, film-based lightguide, or both are shrink-wrap packaging materials. In another embodiment, the packaging material, film-based lightguide, or both are heat-sealable packaging materials. In a further embodiment, a flexible photovoltaic panel is electrically coupled to the light input coupler to provide electrical power for the light emitting device. In another embodiment, the packaging includes a light emitting device with a battery power source. In another embodiment, the light emitted from a light emitting region flashes or "blinks" to attract attention and conserve battery life. In one embodiment, the packaging including the light emitting device includes a motion detector that turns on the light source in the light input coupler when the package is moved, motion is detected near the package, or when the package is moved and when motion is detected near the package.

Other Applications of the Light Emitting Device

Since embodiments enable inexpensive coupling into thin-films, there are many general illumination and backlighting applications. The first example is general home and office lighting using roll-out films on walls or ceiling. Beyond that, the film can bend to shape to non-planar shapes for general illumination. Additionally, it can be used as the backlight or frontlight in the many thin displays that have been or are being developed. For example, LCD and E-ink thin-film displays may be improved using a thin backlighting film or thin front-lighting film; Handheld devices with flexible and scrollable displays are being developed and they need an efficient, low-cost method for getting light into the backlighting film. In one embodiment, the light emitting device comprises a light input coupler, lightguide, and light source which provide illumination for translucent objects or film such as stained glass windows or signs or displays such as point-of-purchase displays. In one embodiment, the thin film enables the light extraction features to be printed such that they overall negligibly scatter light that propagates normal to the face of the film. In this embodiment, when the film is not illuminated, objects can be seen clearly through the film without significant haze. When placed behind a transparent or partially transparent stained glass window, the overall assembly allows low-scattering transmission of light through the assembly if desired. Furthermore, the flexibility of the film allows for much greater positional tolerances and design freedom than traditional plate lightguide backlights because the film can be bent and adapted to the various stained glass window shapes, sizes and topologies. In this embodiment, when not illuminated, the stained glass appears as a regular non-illuminated stained glass window. When illuminated, the stained glass window glows.

Additional embodiments include light emitting devices wherein the stained glass window is strictly aesthetic and does not require viewing of objects through it (e.g. cabinet stained glass windows or art displays), and the overall see-through clarity of the backlight does not need to be achieved. In this embodiment, a diffuse or specular reflector can be placed behind the film to capture light that illuminates out of the film in the direction away from the stained glass window. Diffusing films, light redirecting films, reverse prism films, diffuser films (volumetric, surface relief or a combination thereof) may be disposed between the lightguide and the object to be illuminated. Other films may be used such as other optical films known to be suitable to be used within an LCD backlight.

The light emitting device of one embodiment can be used for backlighting or frontlighting purposes in passive displays, e.g., as a backlight or frontlight for an illuminated advertising poster, as well as for active (changing) displays such as LCD displays. Suitable displays include, but are not limited to, mobile phone displays, mobile devices, aircraft display, watercraft displays, televisions, monitors, laptops, watches (including one where the band comprises a flexible lightguide which is capable of illumination or "lighting up" in a predetermined pattern by an LED within the watch or watch band), signs, advertising displays, window signs, transparent displays, automobile displays, electronic device displays, and other devices where LCD displays are known to be used.

Some applications generally require compact, low-cost white-light illumination of consistent brightness and color across the illuminated area. It is cost-effective and energy-efficient to mix the light from red, blue, and green LEDs for this purpose, but color mixing is often problematic. In one embodiment, light from red, blue, and green light sources can all be directed into each stack of legs/input areas, and by the time the light reaches the sheet, it will be sufficiently mixed that it appears as white light. The light sources can be geometrically situated, and adjusted in intensity, to better provide uniform intensities and colors across the body. A similar arrangement can be attained by providing stacked sheets (more specifically stacked sheet bodies or lightguides) wherein the colors in the sheets combine to provide white light. Since some displays are provided on flexible substrates—for example, electronic ink thin-film displays on printed pages—the sheets provide a means for allowing backlighting while maintaining the flexibility of the display's media.

In some embodiments, the light emitting device is a novel LCD backlighting solution, which includes mixing multiple colors of LEDs into a single lightguide. In one embodiment, the length and geometry of the strips uniformly mixes light into the lightguide region of the film lightguide without a significant are of light mixing region located around the edge. The enhanced uniformity of the colors can be used for a static display or a color-sequential LCD and BLU system. One method for a color-sequential system is based on pulsing between red, green, and blue backlight color while synced to the LCD screen pulsing. Moreover, a layered version of red-, green- and blue-lighted films that combine to make white light is presented. A pixel-based display region can have multiple pixels that are designated to be red, green or blue. Behind it are three separate film lightguides that each have a separate color of light coupled to them. Each of the lightguides has light extraction features that match up with the corresponding color of the pixel-based display. For example red light is coupled into coupling lightguide and then into the lightguide or lightguide region and is extracted from the feature into the red pixel. The film lightguides are considerably thinner than the width of the pixels so that geometrically a high percentage of the light from a given color goes into its corresponding set of pixels. Ideally, no color filter needs to be used within the pixels, but in case there is cross-talk between pixels, they should be used.

It is also notable that embodiments have utility when operated "in reverse"—that is, the light-emitting face(s) of a sheet could be used as a light collector, with the sheet collecting light and transmitting it through the legs to a photosensitive element. As an example, sheets in accordance with embodiments could collect incoming light and internally reflect it to direct it to a photovoltaic device for solar energy collection purposes. Such an arrangement can also be useful for environmental monitoring sensing purposes, in that the sheet can detect and collect light across a broad area, and the detector(s) at the legs will then provide a measurement representative of the entire area. A sheet could perform light collection of this nature in addition to light emission. For example, in lighting applications, a sheet might monitor ambient light, and then might be activated to emit light once twilight or darkness is detected. Usefully, since it is known that LEDs can also be "run in reverse"—that is, they can provide output current/voltage when exposed to light—if LEDs are used as an illumination source when a sheet is used for light emission, they can also be used as detectors when a sheet is used for light collection. In one embodiment, the lightguide captures a portion of incident light and directs it to a detector wherein the detector is designed to detect a specific wavelength (such as by including a bandpass filter, narrowband filter or a diode with a specific bandgap used in reverse). These light detection devices have the advantages of collecting a percentage of light over a large area and detecting light of a specific wavelength is directed toward the film while the film/sheet/lightguide/device remains substantially transparent. These can be useful in military operations where one is interested in detecting lasers or light sources (such as used in sighting devices, aiming devices, laser-based weapons, LIDAR or laser based ranging devices, target designation, target ranging, laser countermeasure detection, directed energy weapon detection, eye-targeted or dazzler laser detection) or infra-red illuminators (that might be used with night vision goggles).

In another embodiment, a light emitting device comprises a light source, light input coupler, and film-based lightguide wherein the light emitting device is one selected from the group of building mounted sign, freestanding sign, interior sign, wall sign, fascia sign, awning sign, projecting sign, sign band, roof sign, parapet sign, window sign, canopy sign, pylon sign, joint tenant sign, monument sign, pole sign, high-rise pole sign, directional sign, electronic message center sign, video sign, electronic sign, billboard, electronic billboard, interior directional sign, interior directory sign, interior regulatory sign, interior mall sign, and interior point-of-purchase sign.

In some embodiments, the film-based lightguides or light emitting films are highly useful for use in illuminated signs, graphics, and other displays. For example, the film may be placed on walls or windows without significantly changing the wall or window appearance. However, when the sign is illuminated, the image etched into the film lightguide would become visible. Embodiments could also be useful for coupling light into the films that sit in front of some grocery store freezers as insulation. Lighting applications where there is limited space, such as in the ice at hockey rinks may also require plastic film lighting. Since a sheet can be installed on a wall or window without significantly changing its appearance, with the light-emitting area(s) becoming visible when the light source(s) are activated, the embodiment allows displays to be located at areas where typical displays would be aesthetically unacceptable (e.g., on windows). The sheets may also be used in situations where space considerations are paramount, e.g., when lighting is desired within the ice of skating rinks (as discussed in U.S. Pat. No. 7,237,396, which also describes other features and applications that could be utilized with embodiments). The flexibility of the sheets allows them to be used in lieu of the curtains sometimes used for 15 climate containment, e.g., in the film curtains that are sometimes used at the fronts of grocery store freezers to better maintain their internal temperatures. The flexibility of the sheets also allows their use in displays that move, e.g., in light emitting flags that may move in the breeze.

Communication with the Light Emitting Device

In one embodiment, the light emitting device includes a communication device coupled in signal communication to receive and/or transmit communication signals from or to external devices or the environment. In one embodiment, the light emitting device communicates with one or more of the following devices: a local computer, a remote computer or server, a cellular phone, PDA, an electronic reader (eBook or eReader, for example), a short wave wireless communication device, such as a Bluetooth® device, a microphone, a laptop, a portable computer, a portable communication device, an electronic watch, an electronic wallet, a thermometer, a radio, a television, a digital video recorder, a telephone, a stereo, an entertainment system, a home network controller, a router, a modem, a satellite transmitter/receiver, a wireless transmitter/receiver, a security system, an air conditioning system, an energy monitoring device, an occupancy sensor, a motion sensor, a printer, a tablet computer, a vehicle, such as an automobile, a watercraft, an aircraft, or a land craft, an electronic transportation device, a train, a bus, a subway, a light fixture, a health monitoring device, an internet connected device, a GPS device, a light sensing device, a lighting controller, an HVAC controller, a home or office automation controller, a garage door controller, a remote control device, a camera, a keyboard, a mouse, a pointing device, a projector, a monitor, a display (LCD, OLED, LED, or Plasma display, for example), a video game system, and a video game controller.

In one embodiment, the light emitting device receives information from or transmits information to the environment through one or more of the following: an electrical connection, a wireless connection, a radio frequency connection, an infrared-connection, visual light detectors or imagers, thermal detectors or imagers, a microphone, a transducer, a sensor, an actuator, an accelerometer, an air flow sensor, a photodiode, an electronic display, a temperature sensor, a humidity sensor, a magnetic field sensor, a metal detector, a chemical sensor, a molecular sensor, a biological material sensor, and a biosensor. In another embodiment, in response to information received directly or through analysis of information received by the light emitting device, one or more of the following properties of the light emitting device including, without limitation, light flux output, color of the light output, infrared light flux output, ultraviolet light flux output, wavelength of the light output, angular light output profile, spatial light output profile, luminance, luminance uniformity, color uniformity, rate of light output (frequency), polarization, image displayed, logo displayed, indicia displayed, angle of peak luminous intensity, angular full-width at half maximum intensity in one or more light output planes, size of the light emitting region, location of the light emitting region, orientation of the light emitting region, shape of the light emitting region, dimension of the light emitting region in a direction, dimension of the light emitting device, perceived transmittance or "see-through", sound output, output communication to another device, and rate of change or duration of one or more of the aforementioned properties in one or more regions or lightguides changes.

Radio Frequency Communication

In one embodiment, the light-emitting device has a radio frequency transmitter and a receiver that receives and transmits information. In a further embodiment, the light emitting device changes a property due to radio frequency communication with a device. In one embodiment, the radio frequency transmitter transmits and receives the frequency-hopping spread spectrum radio technology. In another embodiment, the light-emitting device includes a radio transmitter and receiver that receives and transmits radiation by Gaussian frequency-shift keying (GFSK). In another embodiment, the light-emitting device has a short wavelength radio transmission protocol, such as Bluetooth® protocol, radio frequency transmitter and receiver that receives and transmits information. In another embodiment, the light-emitting device includes an IEEE 802.11 compliant radio transmitter and receiver. In another embodiment, the light-emitting device includes an IEEE 802.15.4-2003, ZigBee® RF4CE, or ZigBee® compliant radio transmitter and receiver. For example, in one embodiment, the light emitting device receives information from a wireless router using an IEEE 802.11 protocol that directs the light emitting device to change the relative light output from two different colored LEDs and the light emitted from the light emitting device changes color.

In another embodiment, the light-emitting device includes a radio transceiver compliant to at least one communication standard for creating a wide area network (WAN) selected from the group of: iBurst™, Fast Low-latency Access with Seamless Handoff-Orthogonal Frequency Division Multiplexing (Flash-OFDM™), Wi-Fi: 802.11 standard, WiMAX: 802.16 standard, UMTS over W-CDMA, UMTS-TDD, EV-DO x1 Rev 0, Rev A, Rev B and x3 standards, HSPA D and U standards, RTT, GPRS, and EDGE. In another embodiment, the light-emitting device includes a radio transceiver compliant to at least one communication standard for creating a local area network (WLAN) selected from the group of: IEEE 802.11-2007, IEEE 802.11a, IEEE 802.11b, IEEE 802.11g, IEEE 802.11n, and amended IEEE 802.11-2007 standards or protocols. In a further embodiment, the light-emitting device includes a radio transceiver compliant to at least one communication standard for creating a personal area network (WPAN) selected from the group of: short wavelength wireless transmission protocol, such as Bluetooth® protocol (including standard protocol and low energy protocol), high level communication protocol such as ZigBee® Wireless USB, UWB, IPv6 over Low power Wireless Personal Area Networks, ONE-NET™, Z-Wave®, and EnOcean® standards. In another embodiment, the light emitting device includes a transceiver disposed to receive and transmit radio frequency information over a cellular phone connection protocol selected from the group of: CDMA, GSM, EDGE, 3G, UMTS, and SMS. In another embodiment, the light-emitting device includes 2 or more radio frequency transceivers configured to receive similar or different protocols, such as Bluetooth® protocol and 802.11 protocol, for example.

Infrared Communication

In one embodiment, the light-emitting device includes an infrared photodetector, a phototransistor or an infrared (IR) receiver disposed to receive IR light. For example, in one embodiment, in one light emitting device a light source in a first light input coupler for a first film-based lightguide is turned off and a second light source in a second light input coupler for a second film-based lightguide is turned on in response to information received from or through an infrared receiver from an infrared remote control to change a logo displayed on the light emitting device from "OPEN'" to "CLOSED," for example.

Communication Architecture and Protocol

In one embodiment, the light emitting device communicates with a second device used in a wired connection. In another embodiment, the connection between the light emitting device and the second device includes one or more of the following connections: serial, asynchronous serial, parallel, and USB. In one embodiment, the light emitting device communicates with a second device using one or more communication architectures, network protocols, data link layers, network layers, network layer management protocols, transport layers, session layers, and/or application layers.

Light Detector

In one embodiment, the light emitting device includes a photodetector or a light detector disposed to receive and process light into information. For example, in one embodiment, the light emitting device includes a camera disposed to capture an image, recognize an object, individual, or property of the individual or object, such as gender, height, age, and/or race, for example, and change a property of the light emitting device. In another embodiment, the light emitting device includes a photodetector to detect the ambient light intensity and adjust the luminous intensity of the light output from the light emitting device to save energy or make the display or light emitting region more visible. In another embodiment, the light emitting device includes a motion sensor, occupancy sensor, or smoke detector using a photodetector.

Light Emitting Device Comprises a Microphone

In one embodiment, the light emitting device includes one or more microphones and local or remote components for analyzing and recognizing speech and changing the output of the display. For example, in one embodiment, a system of light emitting devices disposed on an inner surfaces of a bank of refrigeration coolers includes microphones disposed to recognize speech from a customer or to determine a specific product stated and subsequently increase a illuminance or light output in a flashing manner in a corresponding region of the cooler including the product such that the product can be easily found by the customer. In this embodiment, for example, a location of the product and the corresponding lightguide regions may be programmed by the installer or someone refilling the coolers by talking to the device and engaging a setup or configuration mode by a button or a speech command and cycling or directly changing a region for a particular product. In another embodiment, the installer or person refilling the cooler may change the location of the products (and thus the appropriate regions to be illuminated) by an application on a cellular phone or communication device. In another embodiment, the light emitting device recognizes speech through the microphone and changes one or more properties accordingly. For example, in one embodiment, an individual speaks the series of commands "Light Fixture Command," "Brightness Two," "Spot," "Warm White." In this embodiment, after processing the commands, the light emitting light fixture will dim to a brightness level of two out of ten, change the color to a warm white, and adjust the shape of the light emitting region to create a narrow angular light output, for example.

User Identification and Preferences

In another embodiment, the light emitting device receives information from a device that indicates or provides information for determining one or more preferences or properties associated with the user of the device. For example, in one embodiment, a user with a cellular phone with a Bluetooth® compatible radio transceiver is identified through communication with the light emitting device through Bluetooth® protocol communication and the user's preferences are analyzed by the light emitting device (or a remote server) such that the light emitting device provides illumination for the lightguide in the lightguide stack for a logo of the user's favorite soft drink. In another embodiment, the light emitting device receives biometric information such as face recognition, fingerprint recognition, and/or retinal scan, for example, and processes the information or sends the information to a remote server that processes the information such that a property of the light emitting device changes. In another embodiment, the light emitting device displays targeted information to the individual that the light emitting device or a controller operatively coupled to the light emitting device has identified based on information related to the individual or the device. For example, if the light emitting device has identified a person and the associated property that the person has a very high credit limit or typically charges for large purchases (such as by an "electronic wallet" application on the person's smartphone) the light emitting device illuminates the higher priced items with a higher illuminance or displays a particular logo designed for a target market of wealthy individuals.

Angular Profile of Light Emitting from the Light Emitting Device

In one embodiment, the light emitting from at least one surface of the light emitting device has an angular full-width at half-maximum intensity (FWHM) less than one selected from the group of: 120 degrees, 100 degrees, 80 degrees, 60 degrees, 40 degrees, 20 degrees and 10 degrees. In another embodiment, the light emitting from at least one surface of the light emitting device has at least one angular peak of intensity within at least one angular range selected from the group of: 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface. In another embodiment, the light emitting from at least one surface of the light emitting device has two peaks within one or more of the aforementioned angular ranges and the light output resembles a "bat-wing" type profile known in the lighting industry to provide uniform illuminance over a predetermined angular range. In a further embodiment, the shape of the lightguide is substantially cylindrical wherein the light substantially propagates through the lightguide in a direction parallel to the longer (length) dimension of the cylindrically shaped lightguide and the light exits the surface of the lightguide wherein at least 70% of the light output flux is contained within an angular range between and including 35 degrees to 145 degrees from the light emitting surface. In a further embodiment, the light emitting device emits light from a first surface and a second surface opposite the first surface wherein the light flux exiting the first and second surfaces, respectively, is chosen from the group of: 5-15% and 85-95%; 15-25% and 75-85%; 25-35% and 65-75%; 35-45% and 65-75%; and 45-55% and 45-55%. In another embodiment, the first light emitting surface emits light in a substantially downward direction and the second light emitting surface emits light substantially in an upward direction. In another embodiment, the first light emitting surface emits light in a substantially upward direction and the second light emitting surface emits light substantially in a downward direction.

In one embodiment, a shape of the light emitting region or lightguide and/or a location of the light emitting region on the lightguide contribute to an angular profile of the light output from the light emitting device. For example, in one embodiment, the lightguide is configured in a wave-like shape and the light emitting regions are disposed on the sloped regions of the lightguide. In this embodiment, when light extraction features are used that direct 90%, for example, of the light out of the lightguide within an angular range of between and including 60 to 90 degrees from a surface normal (a high angular output profile), the light output from the light emitting device will be substantially within 30 degrees of the surface angle of the sloped region. For example, if the light is travelling in a lightguide with a directional component in the +x direction and an average angle of the slope region (relative to the horizontal, nadir, or other external or internal surface) is 40 degrees from the horizontal, then the light output from the light emitting device is substantially between and including 10 degrees and 70 degrees from the horizontal or between and including 40 degrees and 70 degrees from the horizontal if a specular reflector is disposed adjacent the bottom side of the lightguide.

In another embodiment, the lightguide is non-planar and includes a light emitting region disposed in a valley region or a planar region of the lightguide. In this embodiment, for example, the light emitting regions are substantially horizontal, vertical, or not sloped relative to an internal or external reference plane and the light output relative to the reference is due primarily to the light extraction features as opposed to the curved or non-planar regions. In another embodiment, the lightguide includes one or more light emitting regions on a substantially planar region, and one or more of the following: a valley region, a sloped region, a curved region, a bent region, and a folded region. In this embodiment, a relative location of the light output and the angular profile can be adjusted by placement or orientation of the light emitting region (or light extraction features along one or more surfaces of the lightguide or core region).

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed between a linear fold region and a lightguide region.

Packaging

In one embodiment, a kit suitable for providing illumination includes a light source, a light input coupler, and a lightguide.

In one embodiment, the flexible light emitting device can be rolled up into a tube of a diameter less than one selected from the group of: 6 inches, 3 inches, 2 inches and 1 inch. In another embodiment, the flexible light emitting device includes a spring or elastic-based take-up mechanism which can draw a portion of the lightguide, the light emitting region, or the lightguide region inside the housing. For example, the light emitting region of the film can be retracted into a cylindrical tube when a button on the device is pressed to provide secure, protected storage.

Film Production

In one embodiment, the film or lightguide is an extruded film, a co-extruded film, a cast film, a solvent cast film, a UV cast film, a pressed film, an injection molded film, a knife coated film, a spin coated film, or a coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In another embodiment, one or more of a lightguide layer, a light transmitting film, a cladding region, an adhesive region, an adhesion promotion region, and a scratch resistant layer is coated onto one or more surfaces of the film or lightguide.

Separate Coupling Lightguides

In another embodiment, the coupling lightguides are discontinuous with the lightguide and are subsequently optically coupled to the lightguide. In one embodiment, the coupling lightguides are extruded onto the lightguide, optically coupled to the lightguide using an adhesive, optically coupled to the lightguide by injection molding a light transmitting material that bonds or remains in contact with the coupling lightguides and lightguide, thermally bonded to the lightguide, solvent bonded to the lightguide, laser welded to the lightguide, sonic welded to the lightguide, chemically bonded to the lightguide, or otherwise bonded, adhered or disposed in optical contact with the lightguide.

Figure 56:
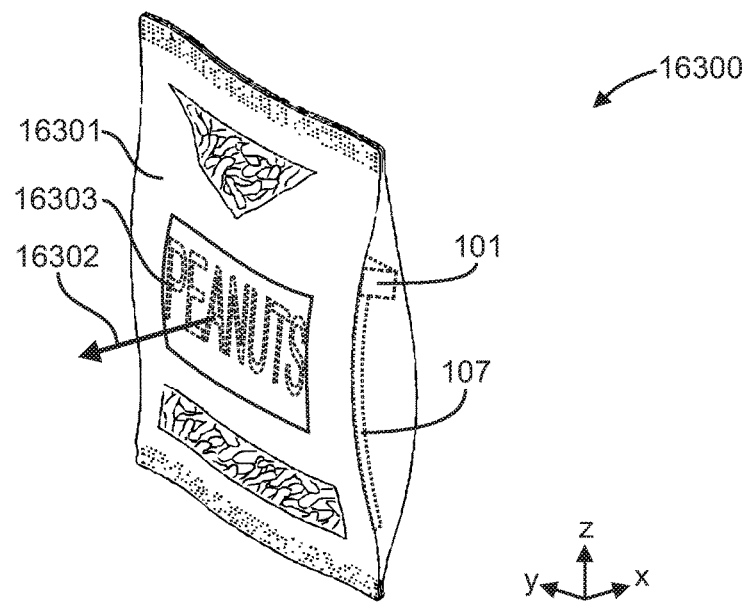
FIG. 56 is a perspective view of a light emitting device incorporated into flexible packaging including a light input coupler and a film-based lightguide.

The following are more detailed descriptions of various embodiments illustrated in FIGS. 1-56.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including one or more input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 including a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as light propagates through the lightguide 107. In one embodiment, light is emitted from the lightguide 107 in the light emitting region 108 due to light extraction features (not shown).

Figure 2:
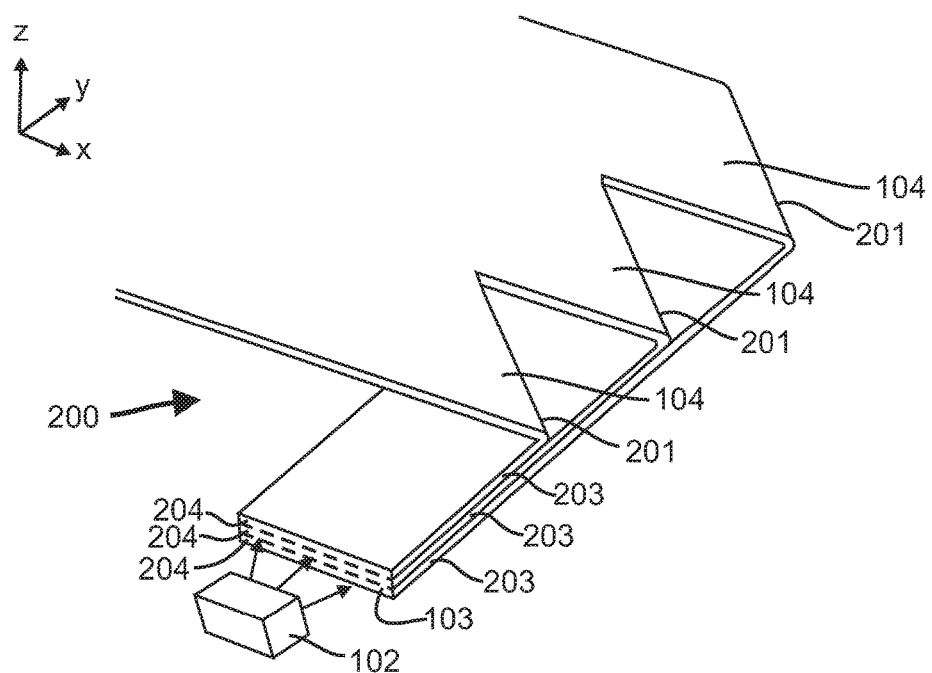
FIG. 2 is a perspective view of one embodiment of a light input coupler with coupling lightguides folded in the −y direction.

FIG. 2 is a perspective view of one embodiment of a light input coupler 200 with coupling lightguides 104 folded in the −y direction. Light from the light source 102 is directed into the light input surface 103 including input edges 204 of the coupling lightguides 104. A portion of the light from the light source 102 propagating within the coupling lightguides 104 with a directional component in the +y direction will reflect in the +x and −x directions from lateral edges 203 of the coupling lightguides 104 and will reflect in the +z and −z directions from the top and bottom surfaces of the coupling lightguides 104. The light propagating within the coupling lightguides is redirected by folds 201 in the coupling lightguides 104 toward the −x direction.

Figure 3:
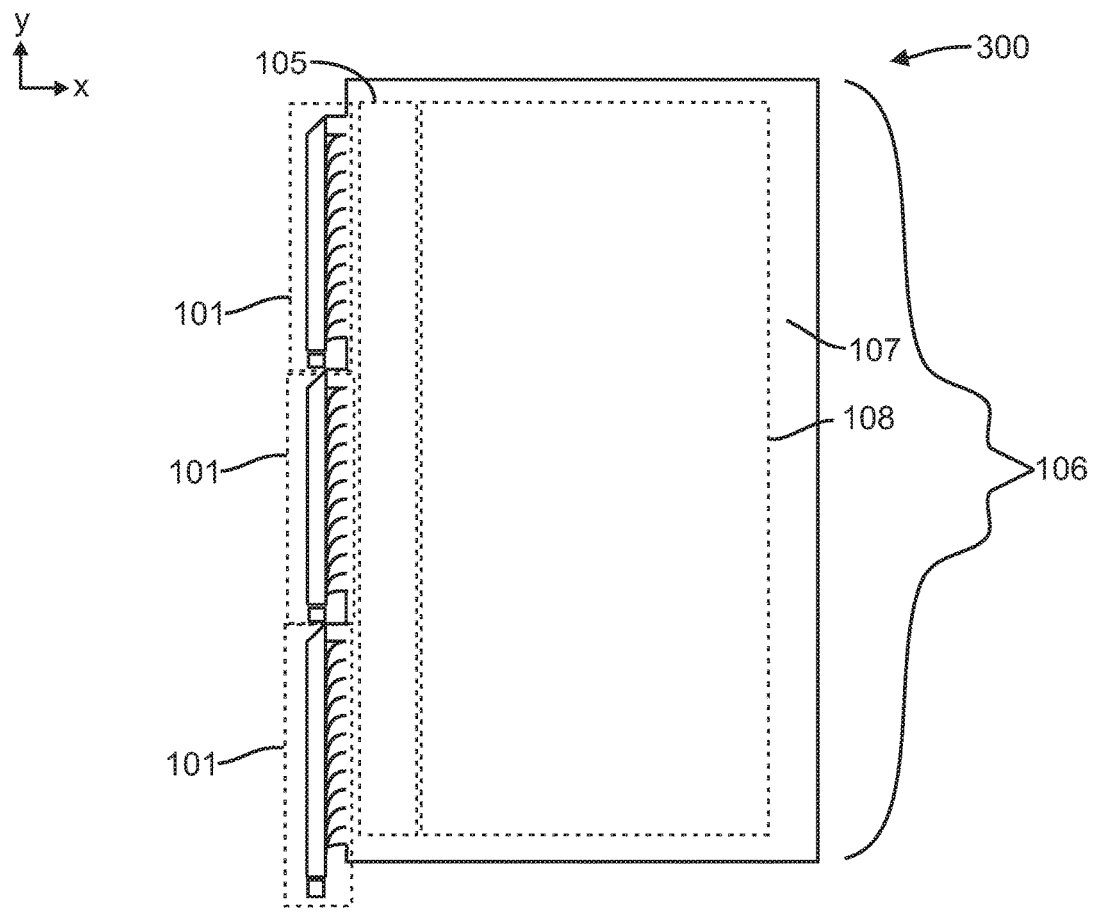
FIG. 3 is a top view of one embodiment of a light emitting device with three light input couplers on one side of a lightguide.

FIG. 3 is a top view of one embodiment of a light emitting device 300 with three light input couplers 101 on one side of the lightguide region 106 including the light mixing region 105, the lightguide 107, and the light emitting region 108.

Figure 4:
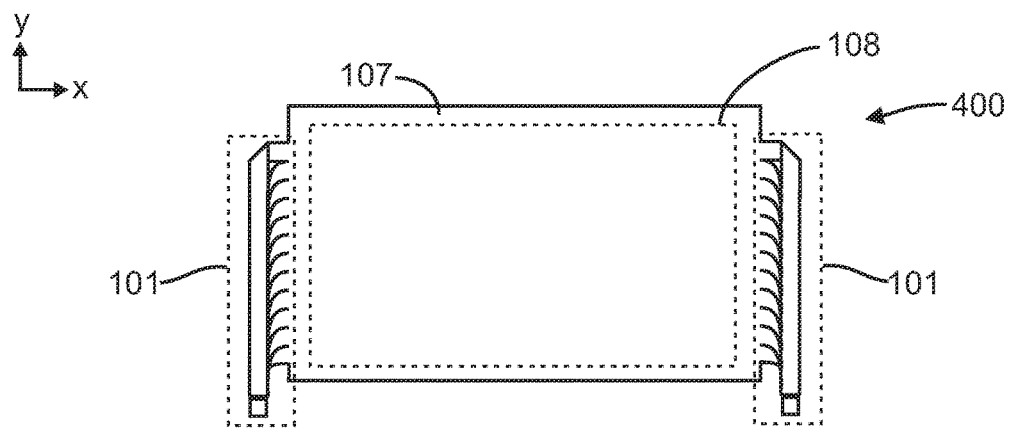
FIG. 4 is a top view of one embodiment of a light emitting device with two light input couplers disposed on opposite sides of a lightguide.

FIG. 4 is a top view of one embodiment of a light emitting device 400 with two light input couplers 101 disposed on opposite sides of the lightguide 107. In certain embodiments, one or more input couplers 101 may be positioned along one or more corresponding sides of the lightguide 107.

Figure 5:
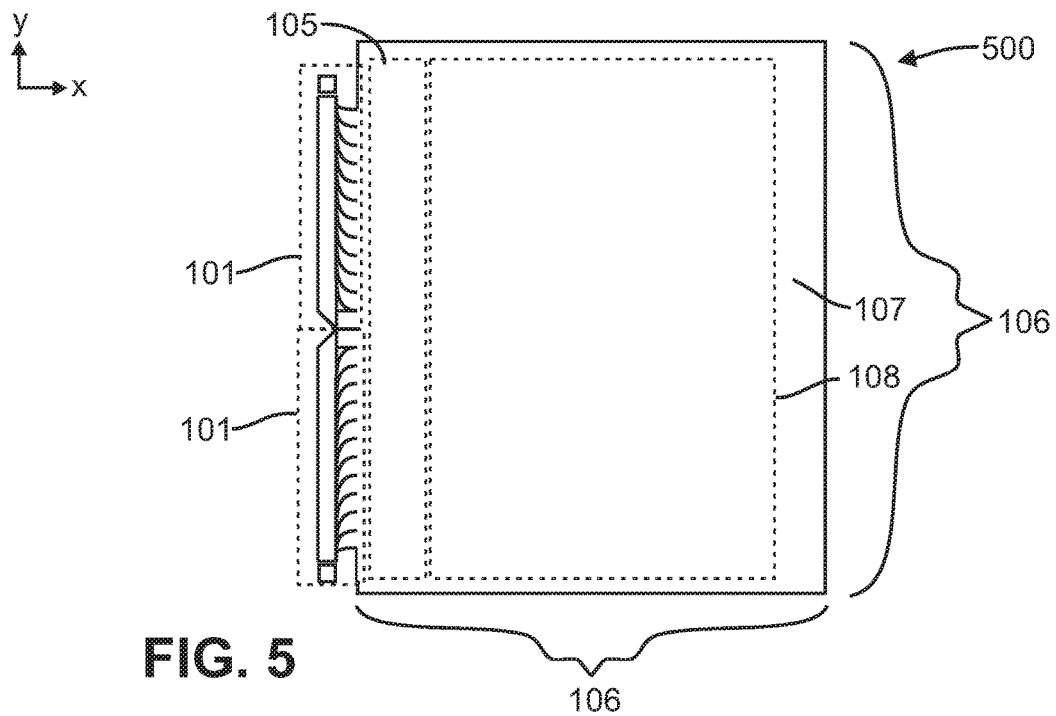
FIG. 5 is a top view of one embodiment of a light emitting device with two light input couplers disposed on the same side of a lightguide wherein the optical axes of the light sources are oriented substantially toward each other.

FIG. 5 is a top view of one embodiment of a light emitting device 500 with two light input couplers 101 disposed on the same side of the lightguide region 106. The light sources 102 are oriented substantially with the light directed toward each other in the +y and −y directions.

Figure 6:
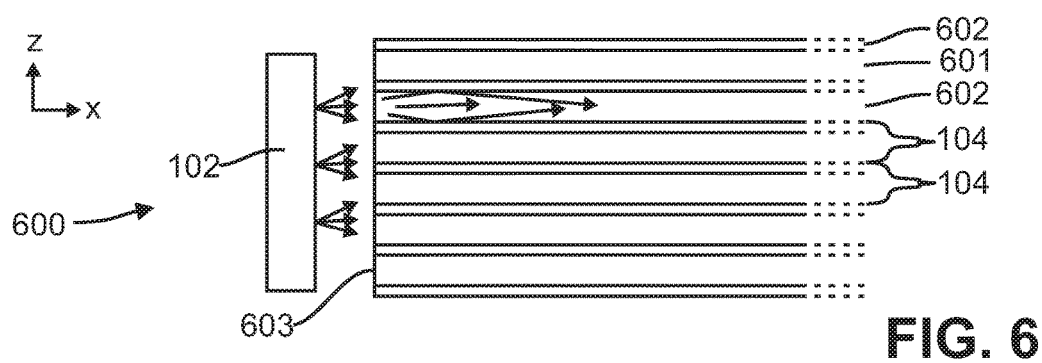
FIG. 6 is a cross-sectional side view of one embodiment of a light emitting device with a substantially flat light input surface comprised of flat edges of a coupling lightguide disposed to receive light from a light source.

FIG. 6 is a cross-sectional side view of one embodiment of a light emitting device 600 defining a region 604 near a substantially planar light input surface 603 including planar edges of coupling lightguides 104 disposed to receive light from a light source 102. The coupling lightguides include core regions 601 and cladding regions 602. A portion of the light from the light source 102 input into the core region 601 of the coupling lightguides 104 will totally internally reflect from the interface between the core region 601 and the cladding region 602 of the coupling lightguides 104. In the embodiment shown in FIG. 6, a single cladding region 602 is positioned between adjacent core regions 601. In another embodiment, two or more cladding regions 602 are positioned between adjacent core regions 601.

Figure 7:
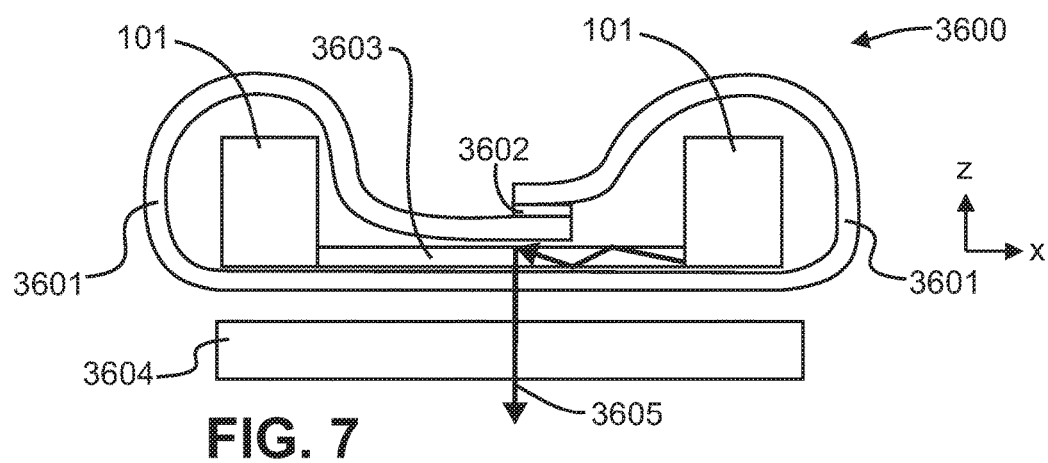
FIG. 7 is a cross-sectional view of one embodiment of a light emitting device including a film-based lightguide, two light input couplers, and a low-contact area cover extending substantially around the two light input couplers and the film-based lightguide in at least one plane.

FIG. 7 is a cross-sectional side view of one embodiment of a light emitting device 3600 including a plurality of input couplers, such as two light input couplers 101 disposed to couple light into opposite sides of a film-based lightguide 3603 without a core region, and a low contact area cover 3601 extending substantially around the light input couplers 101 and the film-based lightguide 3603. The low contact area cover 3601 is adhered to itself using an adhesive 3602. In this embodiment, the low contact area cover 3601 substantially protects the un-cladded film-based lightguide 3603 and the coupling lightguides within the light input coupler 101. Light 3605 from the light source (not shown) in the light input coupler 101 travels through the film-based lightguide 3603, is extracted by a light extraction feature and is directed through the low contact area cover 3601 and through a transmissive spatial light modulator 3604 (or a passive display such as a printed film or graphic, for example) to form a light emitting device 3600. In this embodiment, the low contact area cover 3601 substantially encapsulates or covers the film-based lightguide 3603 in the x-z plane.

Figure 8:
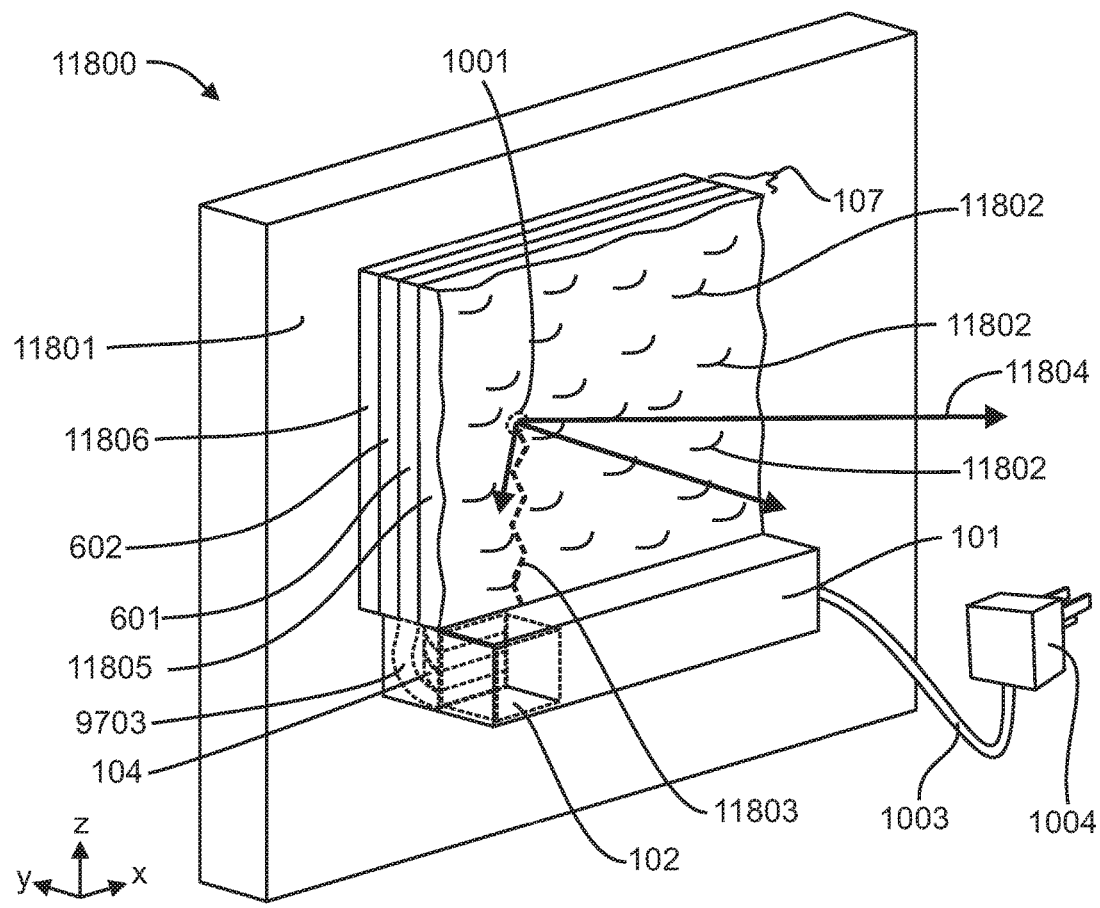
FIG. 8 is a perspective view of one embodiment of a light emitting device disposed adjacent a wall.

FIG. 8 is a perspective view of one embodiment of a light emitting device 11800 disposed adjacent a wall 11801 or other suitable structure or surface. The light emitting device 11800 includes a light input coupler 101 disposed to receive electrical power through a power cable 1003 attached to a power plug 1004. In this embodiment, a lightguide 107 includes a core region 601 disposed between two cladding regions 602 and 11805. In this embodiment, the cladding region 602 is adhered to the wall 11801 using a light transmitting adhesive 11806. Light 11803 from the light source 102 in the light input coupler travels through the core region 601, reflectively scatters from a light emitting indicia 1001 light extraction feature, passes through the core region 601, passes through the cladding region 11805 and this light 11804 exits the light emitting device 11800. In this embodiment, the cladding region 11805 has a non-planar surface relief profile 11802 such that its gloss is low and specular reflection of ambient light is low (as in the case of displays including anti-glare coatings or matte paint). Furthermore, in this embodiment, the lightguide 107 substantially transmits ambient light through the lightguide 107 to the wall 11801 where reflected light is transmitted back through the lightguide 107 and the color of the wall perceived through the lightguide is substantially the same as the wall 11801 without the lightguide 107 coupled to the surface. In this embodiment, the lightguide 107 of the light emitting device 11801 substantially resembles the wall 11801 in color and luminance when the lightguide 107 is not emitting light from the light source 102 and the glare is reduced as with most wall matte paints and textures.

Figure 9:
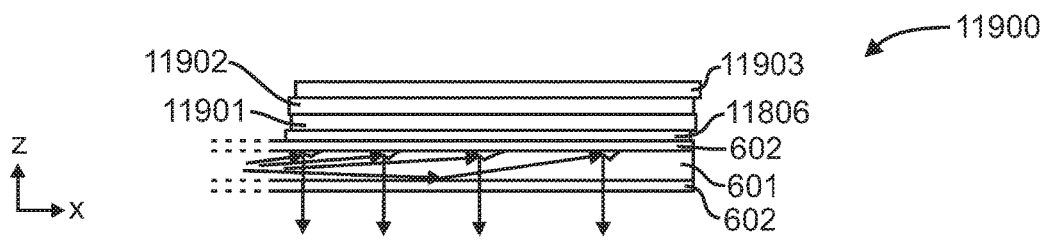
FIG. 9 is a cross-sectional side view of a light emitting device including a lightguide with a core region, two cladding regions, and a plastically deformable material.

FIG. 9 is a cross-sectional side view of a portion of one embodiment of a light emitting device 11900 including a lightguide with the core region 601 disposed between two cladding regions 602. On one side of the lightguide, a light reflecting film 11901 is optically coupled to the cladding region 602 by a light transmitting adhesive 11806. A plastically deformable material 11903 is physically adhered to the light reflecting film 11901 by an adhesive 11902. In this embodiment, the light emitting device 11900 may be bent to form a new shape due to the plastically deformable material 11903.

Figure 10:
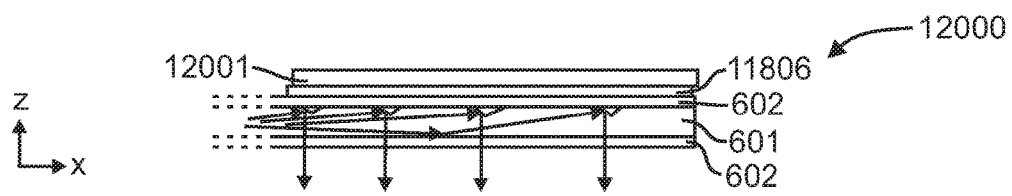
FIG. 10 is a cross-sectional side view of a portion of a light emitting device including a lightguide with a core region, two cladding regions, and a plastically deformable light reflecting film.

FIG. 10 is a cross-sectional side view of a portion of a light emitting device 12000 including a lightguide with the core region 601 disposed between two cladding regions 602. On one side of the lightguide, a plastically deformable light reflecting film 12001 is optically coupled to the cladding region 602 by the light transmitting adhesive 11806. In this embodiment, the plastically deformable light reflecting film 12001 reflects light and provides mechanical support for bending the light emitting device 12000 to a desired shape.

Figure 11:
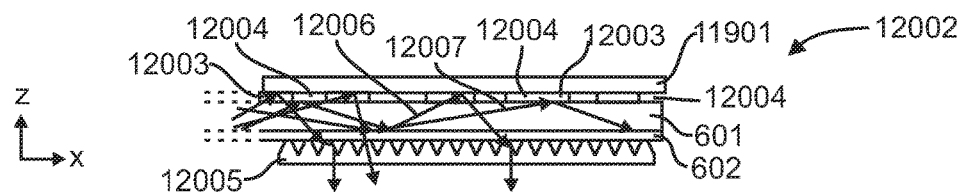
FIG. 11 is a cross-sectional side view of a portion of a light emitting device including a lightguide with a core region disposed between a low refractive index cladding region and an air-gap cladding region including light transmitting adhesive.

FIG. 11 is a cross-sectional side view of a portion of a light emitting device 12002 including a lightguide with the core region 601 disposed between the low refractive index cladding region 602 and an air-gap cladding region 12004 including light transmitting adhesive regions 12003 in a pattern that couple light out of the lightguide into the light reflecting film 12001. Light 12006 from the light source and a light input coupler (not shown) is coupled to the light reflecting film 12001 by the light transmitting adhesive regions 12003 where the light reflects back through the light transmitting adhesive regions 12003, through the core region 601, through the cladding region 602, and refracts and totally internally reflects in a light redirecting element 12005. Light 12007 from the light source is totally internally reflected at the lightguide core region 601 and the air-gap cladding region 12004.

Figure 12:
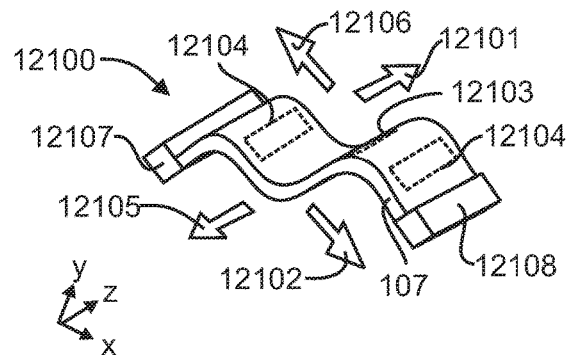
FIG. 12 is a perspective view of a light emitting device including a film-based lightguide formed into a wave-like shape.

FIG. 12 is a perspective view of a light emitting device 12100 including the film-based lightguide 107 formed into a wave-like shape, a first light input coupler 12107, and a second light input coupler 12108. The film-based lightguide 107 includes first light extraction regions 12103 and second light extraction regions 12104 disposed on positive and negative sloped regions in the x-y plane, respectively, of the film-based lightguide 107. At least one of the first light extraction regions 12103 and the second light extraction regions 12104 includes one or more light extraction features. In one embodiment, light from the first light input coupler 12107 is extracted from the first light extraction regions 12103 out of the film-based lightguide 107 in a first peak luminous intensity direction 12101 with a component in the +y and +x direction. Light from the first light input coupler 12107 is extracted from the second light extraction regions 12104 out of the film-based lightguide 107 in a second peak luminous intensity direction 12102 with a component in the −y and +x direction. Light from the second light input coupler 12108 is extracted from the first light extraction regions 12103 out of the film-based lightguide 107 in a third peak luminous intensity direction 12105 with a component in the −y and −x direction. Light from the second light input coupler 12108 is extracted from the second light extraction regions 12104 out of the film-based lightguide 107 in a fourth peak luminous intensity direction 12106 with a component in the +y and −x direction. In one embodiment, the light extraction regions 12104 and 12103 in the angled sections of the wave-like shape of the film-based lightguide 107 direct the light output that would typically be about 70 degrees from the nadir (−y direction) on a flat, horizontal lightguide to about 40 degrees from the nadir such that there is a lower luminance of the light in the angular glare region from about 45 degrees to about 90 degrees from the nadir (−y direction).

Figure 13:
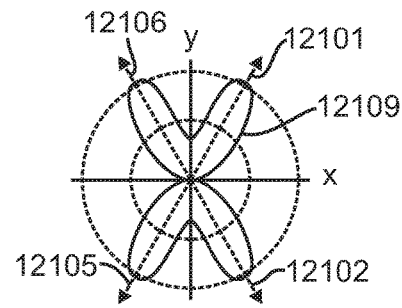
FIG. 13 is a photometric plot of an angular luminous intensity output of the light emitting device of FIG. 12.

FIG. 13 is a photometric plot of an angular luminous intensity output 12109 of the light emitting device 12100 of FIG. 12.

Figure 14:
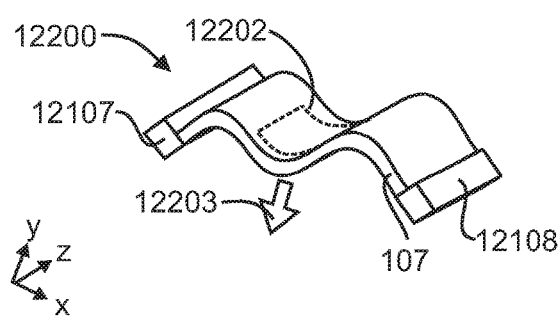
FIG. 14 is a perspective view of a light emitting device including a film-based lightguide formed into a wave-like shape, a first light input coupler, and a second light input coupler.

FIG. 14 is a perspective view of a light emitting device 12200 including the film-based lightguide 107 that is formed in a wave-like shape, the first light input coupler 12107, and the second light input coupler 12108. The film-based lightguide 107 includes a light extraction region 12202 disposed in the valley inflection region of the curve of the film-based lightguide 107. In this embodiment, light from the first light input coupler 12107 and light from the second light input coupler is extracted from the light extraction region 12202 out of the film-based lightguide 107 with an angular output profile with a peak luminous intensity axis 12203 in the −y direction and the light input couplers 101 block a view of high angle (about 45 degrees to 80 degrees from the nadir) light from the light extraction region 12202 to reduce glare.

Figure 15:
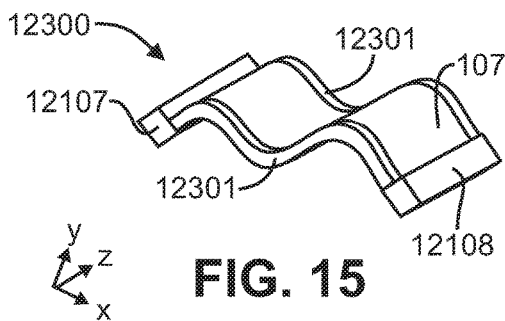
FIG. 15 is a perspective view of a light emitting device including a film-based lightguide formed into a wave-like shape, bendable side support rails, a first light input coupler, and a second light input coupler.

FIG. 15 is a perspective view of a light emitting device 12300 including the film-based lightguide 107 formed into a wave-like shape, bendable side support rails 12301, the first light input coupler 12107, and the second light input coupler 12108. In this embodiment, the bendable side support rails 12301 substantially support the film-based lightguide 107 and have a yield strength of 50 psi such that the side support rails 12301 can be bent or configured to provide curved or angular light emitting shapes in the lightguide disposed between them.

Figure 16:
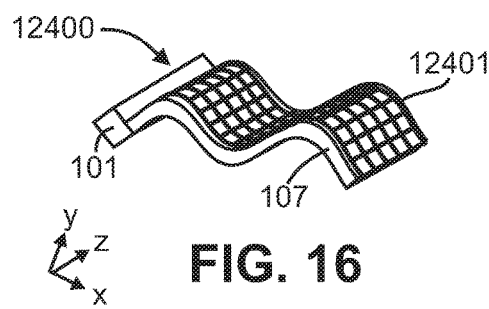
FIG. 16 is a perspective view of a light emitting device including a film-based lightguide formed into a wave-like shape, a plastically deformable mesh support physically coupled to the film-based lightguide, and a light input coupler.

FIG. 16 is a perspective view of a light emitting device 12400 including the film-based lightguide 107 formed into a wave-like shape, a plastically deformable mesh support 12401 physically coupled to the film-based lightguide 107, and the light input coupler 101. In this embodiment, the plastically deformable mesh support allows the film to be shaped and bent into a desired form (such as a wave-like shape, arcuate shape, angled shape, or "L"-shape, for example).

Figure 17:
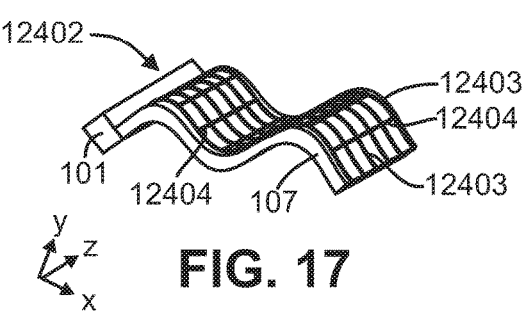
FIG. 17 is a perspective view of a light emitting device including a film-based lightguide formed into a wave-like shape, a first set of plastically deformable wire supports, and a second set of plastically deformable wire supports oriented orthogonal to the first set of plastically deformable wire supports with a pitch of the two sets differing.

FIG. 17 is a perspective view of a light emitting device 12402 including the film-based lightguide 107 formed into a wave-like shape, a first set of plastically deformable wire supports 12403 physically coupled to the film-based lightguide 107, a second set of plastically deformable wire supports 12404 oriented orthogonal to the first set of plastically deformable wire supports 12403 and physically coupled to the film-based lightguide 107, and the light input coupler 101. In this embodiment, an average pitch of the second set of plastically deformable wire supports 12404 in the x direction is larger than an average pitch of the first set of plastically deformable wire supports 12403 in the z direction. In this embodiment, the plastically deformable wire support configuration facilitates a flexural modulus and/or a yield strength to be less in a plane including the first set of plastically deformable wire supports 12403 (y-z plane) than a flexural modulus and/or a yield strength in a plane including the second set of plastically deformable wire supports 12404 (x-y plane) and the yield strength is anisotropic. As shown in FIG. 17, it is easier to bend the film-based lightguide 107 physically coupled to the plastically deformable wire supports 12403 and 12404 in the y-z plane than the x-y plane.

Figure 18:
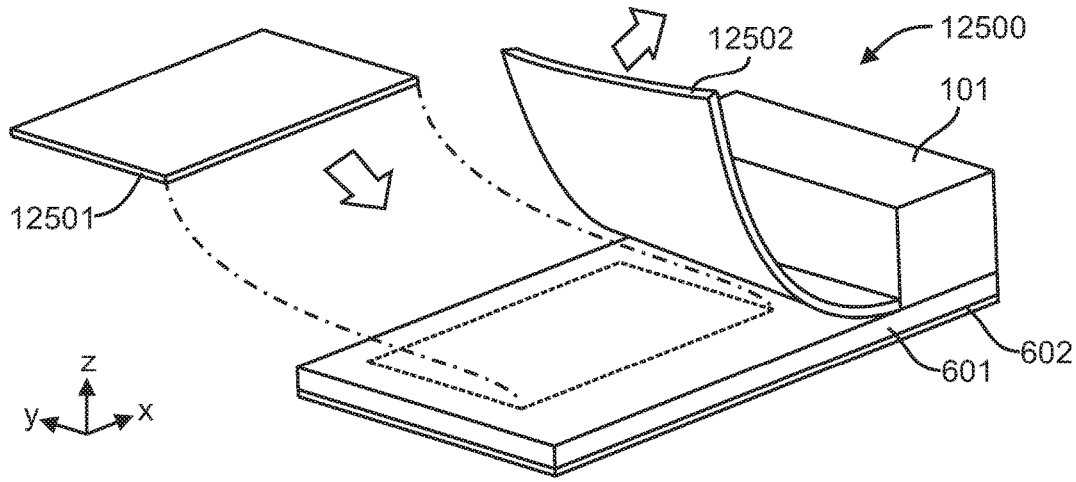
FIG. 18 is a perspective view of one embodiment of a light emitting device including a cladding layer peeled back.
Figure 19:
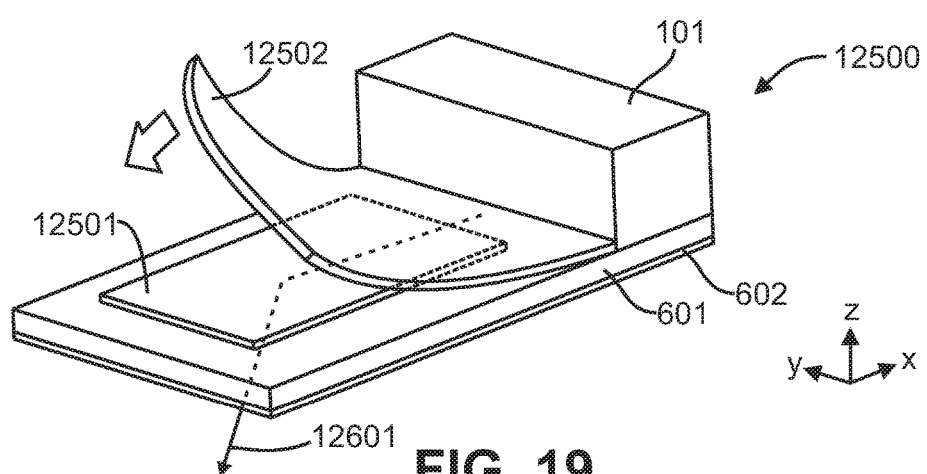
FIG. 19 is a perspective view of the embodiment shown in FIG. 18 as the cladding layer is re-applied.

FIGS. 18 and 19 are perspective views of one embodiment of a light emitting device including a cladding layer 12502 that can be peeled back and a light extraction region 12501 that can be placed on the core region 602 of the lightguide. The lightguide further includes the cladding region 602 optically coupled to an opposite surface of the core region 601. As shown in FIG. 18, the cladding layer is peeled back in the +z and +x direction from the core region 601 and the light extraction region 12501 is placed onto the core region 601. FIG. 19 illustrates the cladding layer 12502 being laid on top of the light extraction region 12501 and the core region 601. Light 12601 from the light input coupler 101 travels through the core region 601, is reflected from the light extraction region 12501 and is directed out of the light emitting device 12500 with a component in the −z direction.

Figure 20:
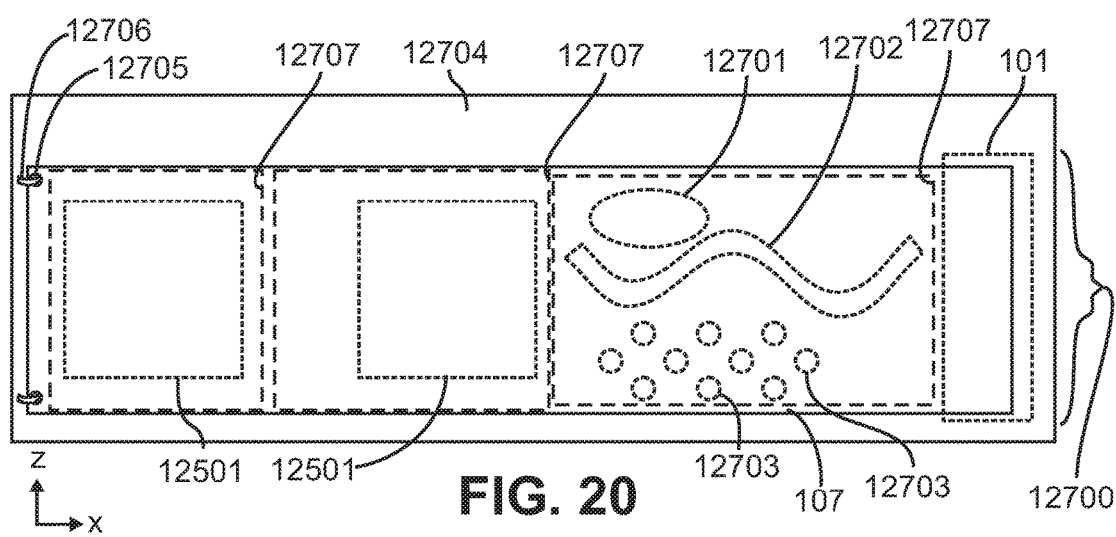
FIG. 20 is a bottom view of one embodiment of a light emitting device disposed in a support surface or structure, such as a ceiling, wherein the light input coupler is within the ceiling and the lightguide extends across the ceiling.

FIG. 20 is a bottom view of one embodiment of a light emitting device 12700 disposed substantially horizontally (x direction). The light input coupler 101 is positioned within a support surface or structure, such as within a ceiling 12704, and the lightguide 107 extends below the ceiling 12704 in the −x direction. The lightguide 107 includes one or more of the following: one or more rectangular removable and replaceable light extraction regions 12501, one or more elliptical removable and replaceable light extraction regions 12701, one or more substantially linear removable and replaceable light extraction regions 12702, and a collection of a plurality of removable and replaceable light extraction regions 12703, such as an array of removable and replaceable light extraction regions 12703, disposed between the core region and a removable cladding regions 12707 in one or more sections of the lightguide 107. In this embodiment, the film-based lightguide 107 is draped across the ceiling and includes apertures 12705 through which hooks 12706 or other suitable fasteners connect the lightguide 107 to the ceiling. In this embodiment, when one wishes to change the light output pattern of light emitted from the light emitting device 12700, the lightguide 107 can be disconnected from the hooks 12706 and the removable cladding regions 12707 can be removed (or peeled back) in regions where the light extraction region is to be removed, replaced, or changed to a light extraction region with a different shape, extraction pattern, optical output, color, and/or light extraction feature with a different angular output, for example.

Figure 21:
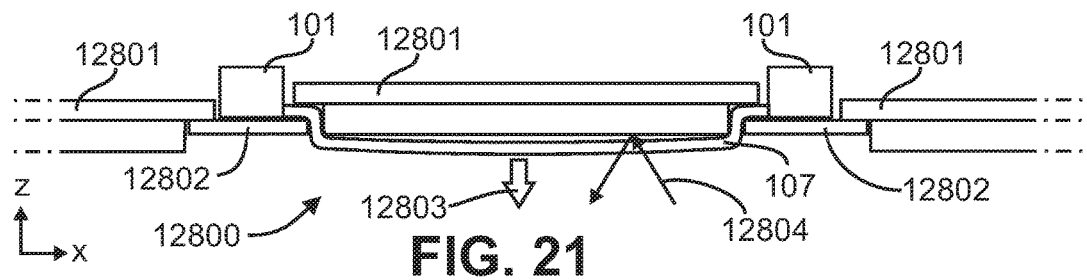
FIG. 21 is a cross-sectional side view of one embodiment of a light emitting device disposed underneath a ceiling tile.

FIG. 21 is a cross-sectional side view of one embodiment of a light emitting device 12800 disposed underneath a ceiling tile 12801. Light from the light input coupler 101 physically coupled to a ceiling tile rail support 12802 travels through the film-based lightguide 107 and exits in a downward direction 12803 away from the ceiling tile 12801. In another embodiment, the light exits the lightguide with an angular component in the downward (−z) direction and upward (+z) direction toward the ceiling tile 12801 and reflects back downward through the lightguide 107 and continues with a downward (−z) directional component. In the embodiment shown, two light input couplers 101 couple light into the lightguide 107 from opposite sides. A significant portion of ambient light 12804 incident on the lightguide 107 passes through the lightguide 107, reflects back from the ceiling tile 12801, and passes back through the lightguide 107. In one embodiment, an average color and luminance of the ceiling tile 12801 disposed above non-emitting regions of the lightguide 107 (when the light sources in the light input couplers 101 are turned off) measuring through the lightguide 107 normal to the surface is substantially the same as an average color and luminance of the neighboring ceiling tiles 12801 when illuminated from a D65 standard white light source of substantially the same illuminance and color. In another embodiment, an average color and luminance of the ceiling tile 12801 disposed above the lightguide 107 (when the light sources in the light input couplers 101 are turned off) measuring through the lightguide 107 normal to the surface is substantially the same as an average color and luminance of the neighboring ceiling tiles 12801 when illuminated from ambient light of substantially the same illuminance and color. In one embodiment, an ASTM D1003 luminous transmittance of the lightguide in the regions surrounding the light extraction features is greater than 70% and the spectral transmission between 400 nm and 700 nm is within +/−10%.

Figure 22:
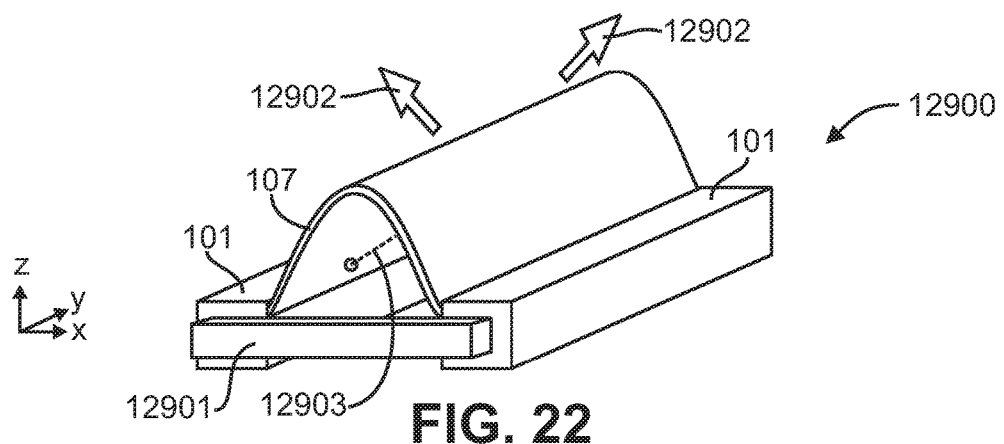
FIG. 22 is a perspective view of one embodiment of a light emitting device including a film-based lightguide curved in an arcuate shape in the +z direction between two light input couplers that are separated by an adjustable extension guide.

FIG. 22 is a perspective view of one embodiment of a light emitting device 12900 including the film-based lightguide 107 curved in an arcuate shape in the +z direction between two light input couplers 101 that are separated by an adjustable extension guide 12901. The light emitting device 12900 includes adjustable extension guides 12901 oriented in the x direction on both sides of the lightguide 107 in the y direction. In this embodiment, a separation between the two light input couplers 101 is low and an arc of the lightguide 107 has a first average radius of curvature 12903 and a light output of the light emitting device 12900 has a first angular light output 12902. In one embodiment, the adjustable extension guide 12901 includes two extruded aluminum profiles with substantially parallel guide surfaces that align such that the two guides can move closer (such as by sliding, for example) together or further apart and guide the light input couplers apart without torsion or rotation relative to each other.

Figure 23:
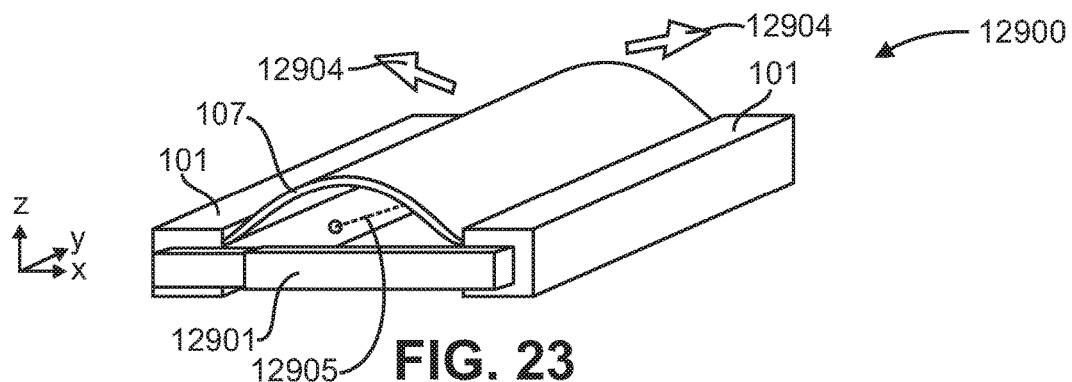
FIG. 23 is a perspective view the light emitting device of FIG. 22 wherein the adjustable extension guide has been extended such that the light input couplers are separated by a larger distance.

FIG. 23 is a perspective view the light emitting device 12900 of FIG. 22 with the adjustable extension guide 12901 extended in the x direction such that the light input couplers 101 are separated by a larger distance and an arc of the lightguide 107 has a second radius of curvature 12905 larger than a first average radius of curvature 12903 shown in FIG.

22 and a second angular light output 12904. The second angular output 12904 of the light emitting device 12900 is changed relative to the first angular output 12902 of the light emitting device 12900 of FIG. 22 due to a change in shape of the lightguide 107.

Figure 24:
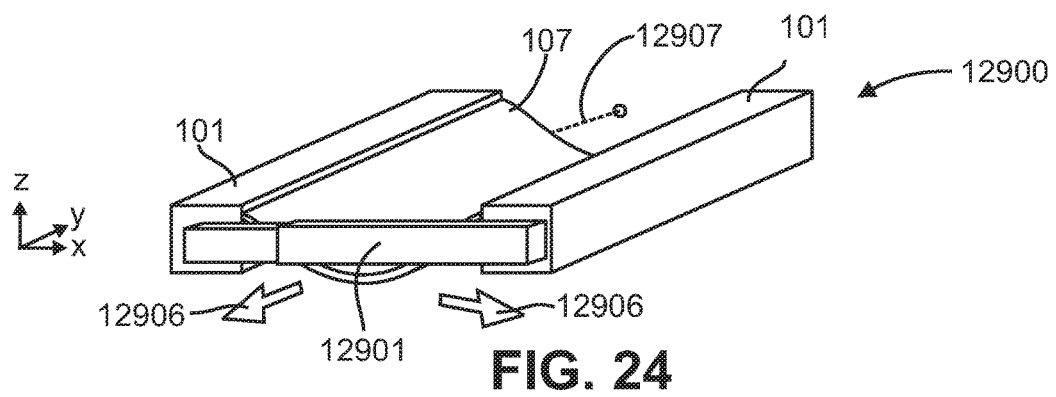
FIG. 24 is a perspective view the light emitting device of FIG. 22 wherein the adjustable extension guide has been extended and a film curvature has been flipped such that the arc extends in the −z direction.

FIG. 24 is a perspective view the light emitting device 12900 of FIG. 22 with the adjustable extension guide 12901 extended in the x direction and the film having an arc that extends in the −z direction. The light input couplers 101 are separated by a larger distance and the arc of the lightguide 107 has a third average radius of curvature 12907 larger than the first average radius of curvature 12903 shown in FIG. 22 and with a direction component in the −z direction. The arc of the lightguide 107 in this embodiment results in a third angular light output 12906 different than the first angular output 12902 of FIG. 22 and the second angular output 12904 of FIG. 23.

FIG. 25 is a perspective view of one embodiment of a light emitting device 13200 including the film-based lightguide 107 formed into a wave-like shape between two light input couplers 101 that are separated by guide rails 13202 on both sides of the lightguide 107 in the y direction. Lightguide positioning rods 13201 are disposed between guide rails 13202 to position the film. In one embodiment, one or more of the lightguide positioning rods 13201 may be moved and positioned in a different location along the guide rails 13202. In this embodiment, the lightguide positioning rods 13201 are positioned such that the lightguide positioning rods 13201 clamp a region of the lightguide 107 between the neighboring lightguide positioning rods and substantially maintain the position of the region and hold a shape of the lightguide 107. The shape of the lightguide 107 can be changed by sliding (and locking down by a bolt or suitable fastener, for example) the pairs of lightguide positioning rods 13201 along the guide rails 13202 and/or by loosening a hold on the lightguide by separating the pairs of lightguide positioning rods 13201 and feeding the lightguide 107 between the pair of rods.

FIG. 26 is a perspective view of one embodiment of a light emitting device 13300 including the film-based lightguide 107. The film-based lightguide 107 is held in a wave-like shape by the lightguide positioning rods 13201 with ends physically coupled to guide rails 13202 on opposite sides of the film-based lightguide 107. The guide rails 13202 are physically coupled to the light input coupler 101 and a rail coupler 13305. The film-based lightguide 107 includes light emitting regions 108 oriented in an average first direction 13301 at a first angle 13307 from a reference direction 13303 parallel to the x axis. Light from the light input coupler 101 travels within the lightguide 107 and exits the lightguide 107 in the light emitting region 108 in a second direction 13302 with a first angle of peak luminous intensity 13304 from a reference direction 13303 parallel to the x axis for the light emitting region 108. In this embodiment, the light emitting regions repeat and are substantially similar in size, shape and orientation, the first angle of peak luminous intensity 13304 of the light emitting region 108 is the same as the angle of peak luminous intensity of the light emitting device 13300. The angle of the peak luminous intensity for the light emitting surface region 108 may vary across the light emitting region 108 and a first angle of the peak luminous intensity 13304 for the light emitting region 108 is an angle of the peak luminous intensity for total light emitted from the particular light emitting region 108. In one embodiment, the lightguide positioning rods 13201 can be repositioned by sliding the lightguide positioning rods 13201 along the guide rails 13202 such that the first angle of peak luminous intensity 13304 can be increased or decreased for one or more light emitting regions. In a further embodiment, the x axis is in the vertical direction and the light emitting device is a light fixture mounted vertically such that the light output can be adjusted by changing the relative positions, orientations, and/or number of lightguide positioning rods and/or the shape of the film-based lightguide passing between the rods. For example, in one embodiment, an angle of peak luminous intensity for the light emitting device is adjusted by pulling a cord that brings the lightguide positioning rods closer together. In another embodiment, the light emitting device has a second light input coupler on the opposite edge of the lightguide with a second angle of peak luminous intensity for the light from the second light input coupler. In another embodiment, the guide rails are extendable.

FIG. 27 is a perspective view of one embodiment of the light emitting device 13300 of FIG. 26 wherein the spacing between the pairs of the lightguide positioning rods 13201 has been increased such that the film-based lightguide 107 is formed in a wave-like shape with a larger pitch and with light emitting regions 108 oriented in an average third direction 13404 at a third angle 13402 from the reference direction 13303 parallel to the x axis. The film-based lightguide 107 is held in a wave-like shape by the lightguide positioning rods 13201 clamping the lightguide 107 between the lightguide positioning rods at regularly spaced locations. Light from the light input coupler 101 travels within the lightguide 107 and exits the lightguide 107 in the light emitting region 108 in a fourth direction 13401 with a second angle of peak luminous intensity 13403 from the reference direction 13303 parallel to the x axis. The second angle of peak luminous intensity 13403 shown in FIG. 27 is smaller than the first angle of peak luminous intensity 13304 shown in FIG. 26 and more light is directed toward the +x direction (toward the ceiling, for example, if the light emitting device is oriented vertically).

Figure 28:
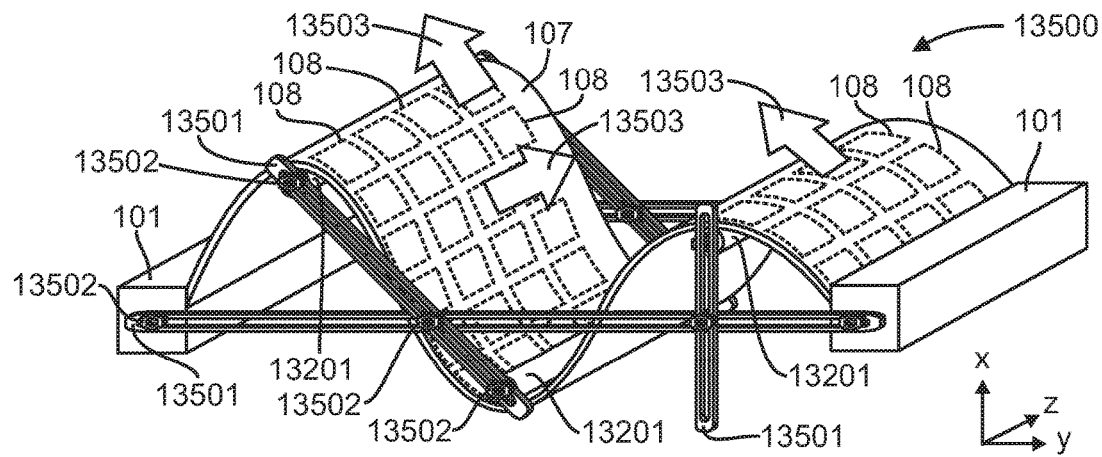
FIG. 28 is a perspective view of one embodiment of a light emitting device including light input couplers and a film-based lightguide with adjustable tension rails.

FIG. 28 is a perspective view of one embodiment of a light emitting device 13500 including light input couplers 101 and the film-based lightguide 107 with adjustable tension rails 13501 physically coupled to lightguide positioning rods 13201 with light output from substantially one side of the film based lightguide 107. In this embodiment, the light 13503 is substantially emitted with a component in the +x direction (up direction, for example). The angle of peak luminous intensity can be adjusted by moving an intersection location and an angle of intersection of the adjustable tension rails 13501 and a location of the lightguide positioning rods 13201 on the adjustable tension rails 13501 using the adjustment bolts 13502. Thus, an angular light output and spatial locations of the light emitting regions 108 of the film-based lightguide 107 can be adjusted to a variety of shapes. In a further embodiment, a location of one or more light emitting regions 108 is reconfigurable by using removable and replaceable light extraction regions or films including light extraction regions.

Figure 29:
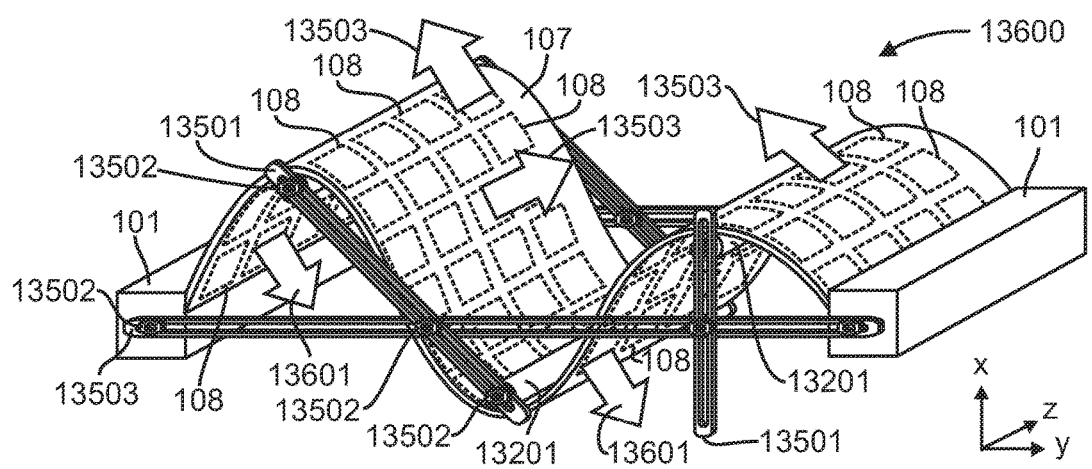
FIG. 29 is a perspective view of one embodiment of a light emitting device including light input couplers and a film-based lightguide with adjustable tension rails physically coupled to lightguide positioning rods with light output from both sides of the film based lightguide.

FIG. 29 is a perspective view of one embodiment of a light emitting device 13600 including light input couplers 101 and the film-based lightguide 107 with the adjustable tension rails 13501 physically coupled to lightguide positioning rods 13201 with light output from both sides of the film based lightguide 107. In this embodiment, light 13503 is substantially emitted with a component in the +x direction (up direction, for example) and light 13601 is emitted with a component in the −x direction. The angle of peak luminous intensity can be adjusted by moving the intersection location and the angle of intersection of the adjustable tension rails

13501 and the location of the lightguide positioning rods 13201 on the adjustable tension rails 13501 using the adjustment bolts 13502. Thus, the angular light output and spatial locations and orientations of the light emitting regions 108 of the film-based lightguide 107 can be adjusted for a desired angular light output profile or location of light emitting regions.

Figure 30:
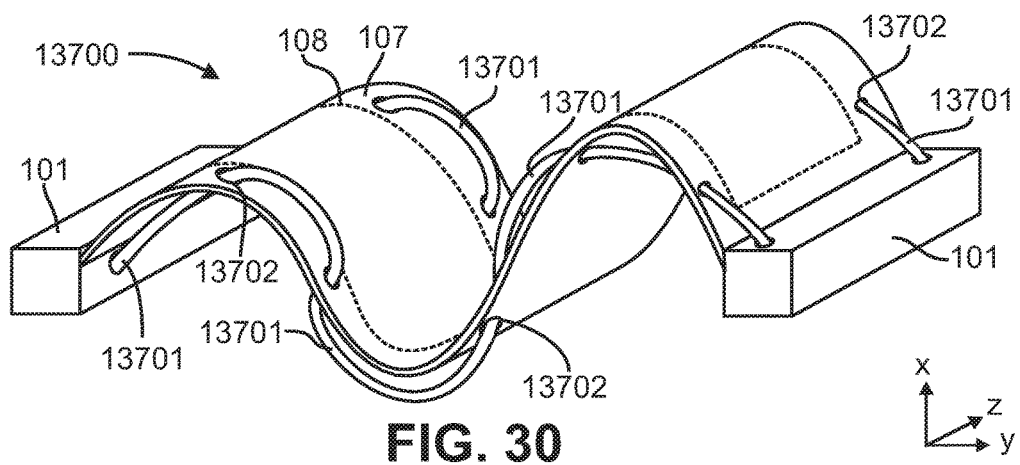
FIG. 30 is a perspective view of one embodiment of a light emitting device including light input couplers and the film-based lightguide with flexible adjustment rods extending through holes in the film based lightguide.

FIG. 30 is a perspective view of one embodiment of a light emitting device 13700 including light input couplers 101 and the film-based lightguide 107 with flexible adjustment tubes 13701 extending through apertures 13702 in the film based lightguide 107. In this embodiment, the shape of the film-based lightguide 107 (and the angular light output profile) can be varied by bending the flexible adjustment tubes 13701 physically coupled to the light input couplers 101. In one embodiment, the flexible adjustment tubes have shapes different from each other such that the film-based lightguide is oriented at an angle (such as oriented at an angle in the x-z plane to the orientation of the film-based lightguide exiting the light input coupler). In one embodiment, the flexible adjustment tubes are plastically deformable by hand and enable shaping of the lightguide or light emitting film without the use of tools. In another embodiment, the light emitting device includes flexible adjustment tubes that physically support the second light input coupler such that the second light input coupler is suspended and carries the electrical wires within the tube.

Figure 31:
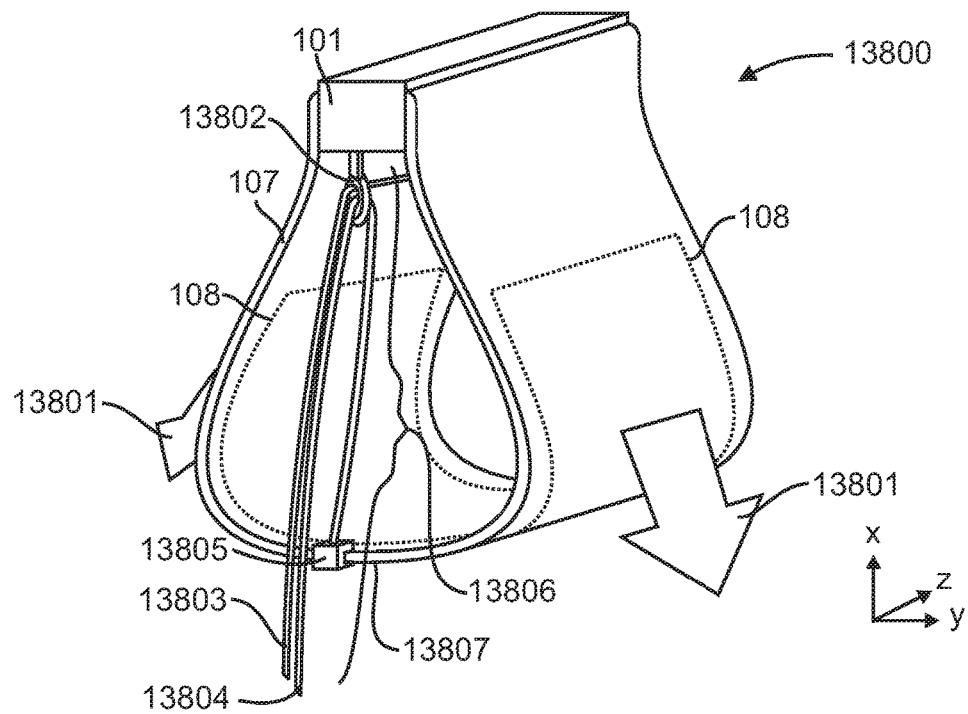
FIG. 31 is a perspective view of one embodiment of an elongated light emitting device including a light input coupler and a film-based lightguide with a lightguide film adjustment mechanism.

FIG. 31 is a perspective view of one embodiment of an elongated light emitting device 13800 including the light input coupler 101 and the film-based lightguide 107 with a lightguide film adjustment mechanism 13806. The lightguide film adjustment mechanism includes two drawstrings 13803 and 13804 threaded through a ring 13802. The drawstring 13804 is connected to a middle region 13807 of the film-based lightguide using a film attachment device 13805. In one embodiment, the film attachment device 13805 includes a clip, clamp, or aperture region in the film-based lightguide, or other attachment device to connect the drawstring to the film. The drawstring 13803 is similarly attached to the film-based lightguide 107 in the middle region 13807 on the opposite side of the film using a second film attachment device (not shown). The light from the light input coupler 101 travels through the film-based lightguide 107 and light 13801 exits in the light emitting regions 108. This light 13801 exits the sides of the film-based lightguide 107 with a first full-angular widths from the nadir (−x direction) at half maximum luminous intensity in the x-y plane due to the low extraction angles from the light emitting regions 108 and the orientation of the film-based lightguide 107. For example, in one embodiment, the first full-angular width from the nadir at half maximum intensity is within a range between and including 10 and 60 degrees from the nadir. When the drawstrings 13804 and 13803 are pulled, the middle region 13807 of the film-based lightguide 107 are pulled upward, changing the shape of the lightguide as shown in FIG. 32.

Figure 32:
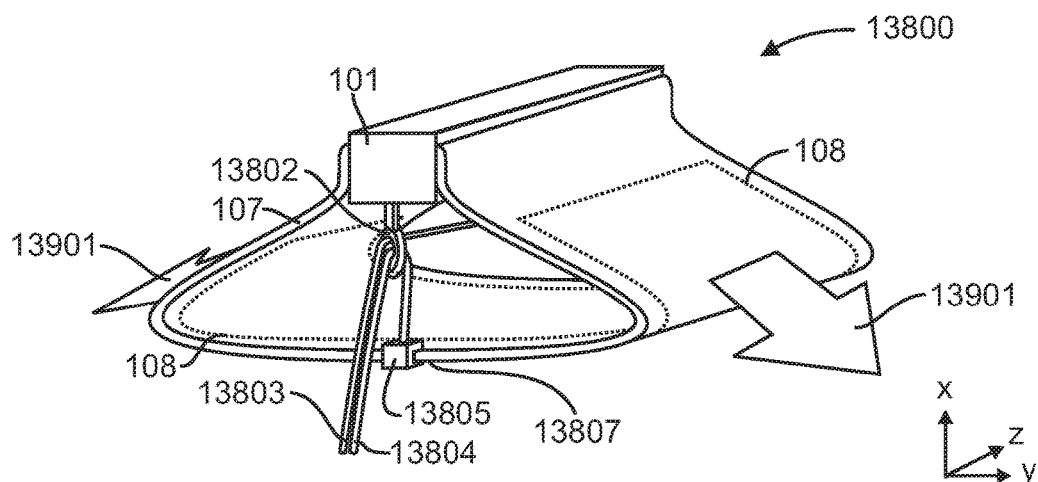
FIG. 32 is a perspective view of the light emitting device of FIG. 31 with drawstrings pulled such that a middle region of the film-based lightguide is pulled closer to the light input coupler.

FIG. 32 is a perspective view of the light emitting device 13800 of FIG. 31 with the drawstrings 13803 and 13804 pulled such that the middle region 13807 of the film-based lightguide is pulled closer to the light input coupler 101 and portions of the sides of the film-based lightguide 107 and the light emitting regions 108 are oriented at larger angles from the nadir. The light 13901 emitting from the light emitting device 13800 with the drawstrings pulled has second full-angular widths from the nadir (−x direction) at half maximum luminous intensity larger than the first full angular widths. Thus, by pulling on the drawstrings, the angular profile (width) of the light emitting device is widened in a first output plane (x-y plane). For example, in one embodiment, the second full angular widths are within a range between and including 30 and 70 degrees from the nadir. The light emitting surface area is determined by the light extracting surface features and the light extracting surface feature type, size, location, and pattern will affect the angular output from the light emitting device and can be designed to allow for optimal control (such as large angular adjustment with minimal glare from the side walls, for example).

Figure 33:
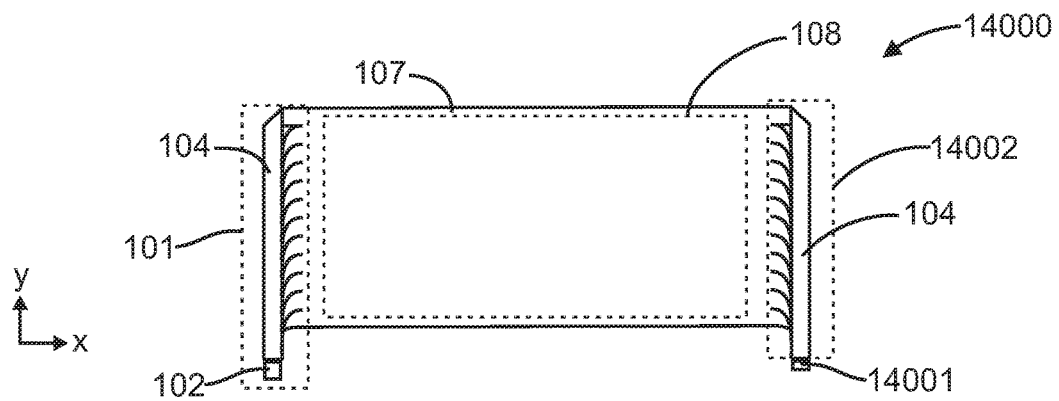
FIG. 33 is a top view of one embodiment of a light emitting including a light input coupler, a film-based lightguide, and a light output coupler including coupling lightguides.

FIG. 33 is a top view of one embodiment of a light emitting device 14000 including the light input coupler 101 including the coupling lightguides 104, the film-based lightguide 107, and a light output coupler 14002 including coupling lightguides 104. The light from the light source 102 in the light input coupler 101 travels through the coupling lightguides 104 of the film-based lightguide 107. A portion of the light from the light source 102 is emitted from the film-based lightguide 107 in the light emitting region 108 and a portion of the light travels through the film-based lightguide 107 and into the light output coupler 14002 including the folded array of coupling lightguides 104 arranged to direct light onto a specular reflector 14001. The specular reflector 14001 may be disposed adjacent to or optically coupled to the ends of the coupling lightguides 104. The light reaching the specular reflector 14001 is reflected back into the coupling lightguides 104 of the light output coupler 14002 and a portion of this light exits the light emitting device 14000 through the light emitting region 108. In this embodiment, the light output coupler 14002 and the specular reflector 14001 serve to recycle the light back into the lightguide where there is another opportunity to be extracted. In one embodiment, the recycled light increases one or more of the following: optical efficiency, spatial luminance uniformity in the light emitting region, spatial color uniformity in the light emitting region, angular full-width at half maximum luminous intensity of the light emitted from the light emitting region, and the number of angular peak regions of the angular light output profile. For example, in one embodiment, the light extracted in the light emitting region from light propagating in the +x direction as shown in FIG. 33 has an angular peak of about 70 degrees from the z direction (out of the page) toward the +x direction. The light extracted in the light emitting region from light propagating in the −x direction (after reflecting from the reflector) has an angular peak of about 70 degrees from the z direction (out of the page) toward the −x direction. Thus, by recycling the light in this manner, the light output has two angular peaks in the x-z plane at +70 and −70 degrees, providing a symmetric and a more optically efficient light emitting device.

Figure 34:
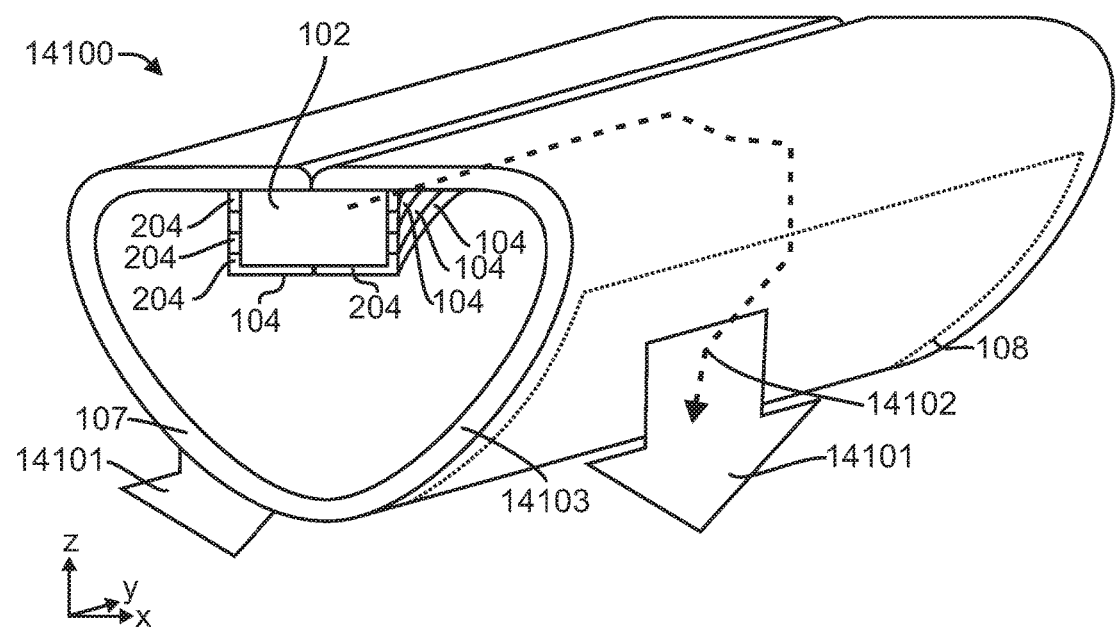
FIG. 34 is a perspective view of one embodiment of a light emitting device with a longer dimension in the y direction than the x direction including two sets of coupling lightguides on opposite sides of a film-based lightguide that are folded under and stacked adjacent each other.

FIG. 34 is a perspective view of one embodiment of a light emitting device 14100 with a longer dimension in the y direction than the x direction including two sets of coupling lightguides 104 on opposite sides of the film-based lightguide 107 that are folded under and stacked adjacent each other. The input edges 204 of the coupling lightguides 104 are disposed to receive light from the light source 102. In this embodiment, a single light source (or an array or arrangement of light sources) is disposed to couple light 14102 initially travelling in the +y direction into a first set of coupling lightguides 104 and the direction is changed due to the fold in the coupling lightguides 104 to travel in the +x direction through the film-based lightguide 107. Light 14101 exits the film-based lightguide 107 from the light emitting region 108 with a directional component in the −z direction. In this embodiment, a single light source can be employed to provide a more uniform spatial luminance profile in the light emitting region of the film-based lightguide or provide two angular luminous intensity peaks (in the x-z plane) due to the light propagating in opposite directions within the lightguide. By using coupling lightguides that are folded underneath the film-based lightguide, the coupling lightguides (and possibly the light source) can be substantially disposed within a volume encapsulated by the curved film-based lightguide. Thus, in this embodiment, the light emitting device requires less volume than one with the coupling lightguides exterior to the volume encapsulated by the film-based lightguide.

Figure 35:
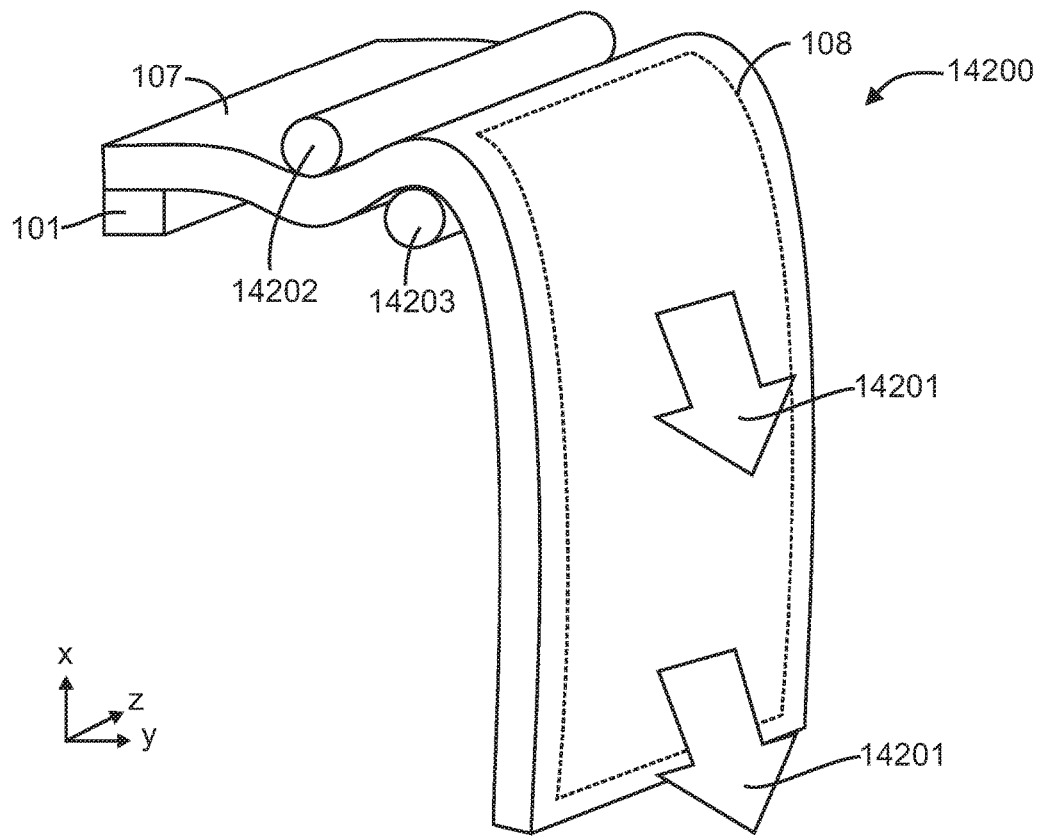
FIG. 35 is a perspective view of one embodiment of an elongated light emitting device including a light input coupler and a film-based lightguide with two lightguide positioning rods.

FIG. 35 is a perspective view of one embodiment of an elongated light emitting device 14200 including the light input coupler 101 and the film-based lightguide 107 with two lightguide positioning rods 14202 and 14203. The light from the light input coupler 101 is directed into the lightguide travelling in the +y direction and is emitted from the lightguide in the light emitting region 108 substantially in the vertical direction downward (−x direction). The light 14201 exiting the light emitting region has a directional component in the −x direction (downward toward the nadir). For example, in one embodiment, more than 80% of the light emitted from the light emitting device is within one angular range selected from the group of: 50 degrees, 40 degrees, 30 degrees, and 20 degrees from the nadir (−x direction).

Figure 36:
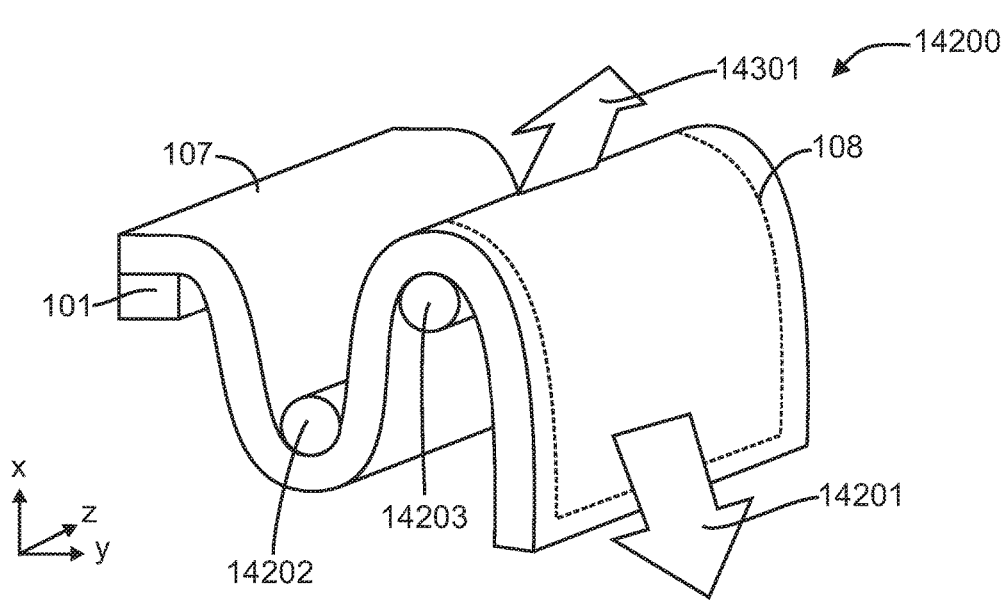
FIG. 36 is a perspective view of the light emitting device of FIG. 35 wherein relative positions of the lightguide positioning rods have been changed.

FIG. 36 is a perspective view of the light emitting device 14200 of FIG. 35 wherein the relative positions of the lightguide positioning rods 14202 and 14203 have been changed (lightguide positioning rod 14202 is translated in the −x direction) and a shape and a position of the film-based lightguide 107 and a position of the light emitting region 108 is changed relative to the embodiment illustrated in FIG. 35. As the lightguide positioning rod 14202 is translated in the −x direction, the end region of the film-based lightguide 107 and the light emitting region 108 translate upwards (+x direction) and around the lightguide positioning rod 14203. As a result, a significant portion of the light emitted from the light emitted device exits the light emitting region 108 with a directional component upwards (in the +x direction). By translating the position of lightguide positioning rod 14202 the directional light output profile of the light emitting device is changed from substantially directing light downwards (FIG. 35) to directing more light 14301 upwards (FIG. 36). In one embodiment, the lightguide positioning rods are attached to a rail, suspended from the ceiling, or otherwise physically coupled to a supporting device that allows the relative location of one or more lightguide position rods (and/or the light input coupler) to be changed. Additionally, the light extraction feature pattern, size, type, and/or location can be adjusted to control the relative light output. For example, as shown in FIG. 36, a portion of the light emitting region 108 directly above the lightguide positioning rod 14203 may emit light with a substantially horizontal (+y direction) component that could cause glare. Thus, by adjusting the location of the light extraction features in the light emitting region 108 to create two separate light emitting regions on either side of the lightguide positioning rod 14203 with a non-light emitting region between, when the lightguide positioning rod 14203 is in the location shown in FIG. 36, an absence of the light emitting region directly above the light emitting rod could reduce or eliminate glare light with a directional component in the horizontal direction (+y direction) at angles such as 55 to 85 degrees from the nadir (−x direction), for example.

Figure 37:
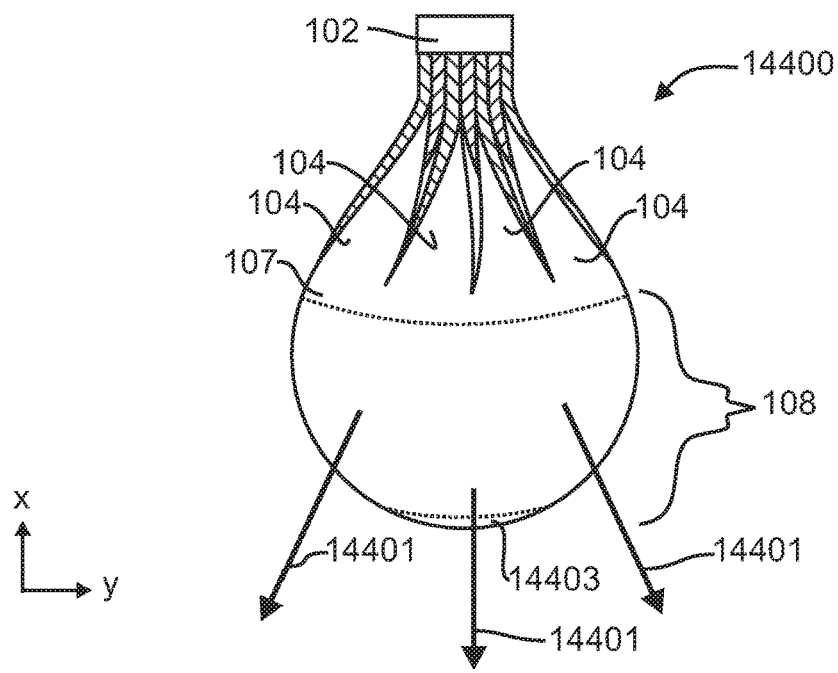
FIG. 37 is a side view of one embodiment of a light emitting device including a film-based lightguide formed into a bulbous shape with coupling lightguides twisted and stacked together.

FIG. 37 is a side view of one embodiment of a light emitting device 14400 including the film-based lightguide formed into a bulbous shape with coupling lightguides 104 twisted and stacked together and disposed to receive light from the light source 102. Light 14401 from the light source 102 exits the film-based lightguide 107 in the light emitting region 108. In one embodiment, the light extraction features extract at least 80% of the extracted light within an angular range greater than 60 degrees from the normal to the film-based lightguide at the light extraction feature. In this example, light propagating downward in a light emitting device as shown in FIG. 37 will emit the light 14401 with directionality substantially downward (−x direction). This enables the light emitting device to be optically efficient at directing light with a directional component in one direction, such as directing the light through the light emitting region 108 in the −x direction as shown in FIG. 37. This directionality is advantageous when the light emitting device is a replacement bulb for a downlight or is a downlight light fixture. Other shapes may also be used such as conical, polygonal, arcuate, or other geometric or non-geometric shapes. For example, when the light emitting region is substantially oriented along the surface of a shape that is substantially vertical or within a small angle from the vertical (such as in the case of a conical shape that is long relative to its diameter), most of the light output (80% for example) may be contained within a small angular range (such as 40 degrees) from the vertical or nadir (−x direction as shown in FIG. 37). In one embodiment, a lower central region 14403 of the film-based lightguide does not include light extraction features. In another embodiment, the light from the light emitting device 14400 is emitted into a large angular range (such as radially in all directions in the y-z plane and at angles greater than 2 degrees from the +x axis).

Figure 38:
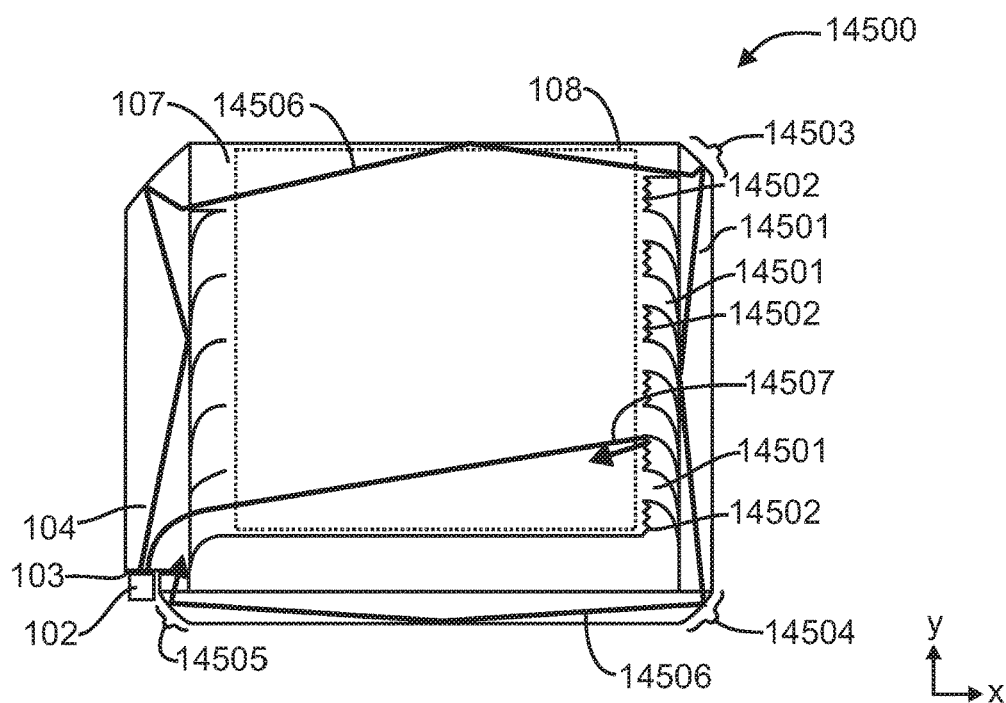
FIG. 38 is a top view of one embodiment of a light emitting device including a light input coupler and output coupling lightguides disposed to recycle light back to input coupling lightguides.

FIG. 38 is a top view of one embodiment of a light emitting device 14500 including coupling lightguides 104 and output coupling lightguides 14501 disposed to recycle light back to the input coupling lightguides. The light source 102 is disposed to direct light through a first region of the input surface 103 of the input coupling lightguides 104 and the output coupling lightguides 14501 are disposed on an opposite surface of the film-based lightguide 107 to receive a first portion of light from within a film-based lightguide 107 and direct this light through output coupling lightguides 14501 to a second region of the input surface 103 on the input coupling lightguides 104. Light 14506 from the light source 102 is directed into the first set of input coupling lightguides 104 and travels through the film-based lightguide 107 and is not redirected out of the film-based lightguide 107 by light extraction features in the light emitting region 108 in the first pass. The light 14506 is then coupled into the output coupling lightguides 14501 where the light travels in a waveguide condition and is folded (14503, 14504, and 14505) three times before entering into a second region of the input surface of the input coupling lightguides 104. Light 14507 from the light source 102 travels through the input coupling lightguides 104 and film-based lightguide 107. On the opposite side of the film-based lightguide 107 the light is reflected back from light reflecting features 14502 into the light emitting region 108 where the light is recycled. The light may encounter a light extraction feature within the light emitting region 108 that redirects the light out of the film-based lightguide 107 and the light emitting device 14500. In one embodiment, the light reflecting features include triangular cuts with about 90 degree apex angles disposed to totally internally reflect light within a first acceptance angle from within the film-based lightguide.

Figure 39:
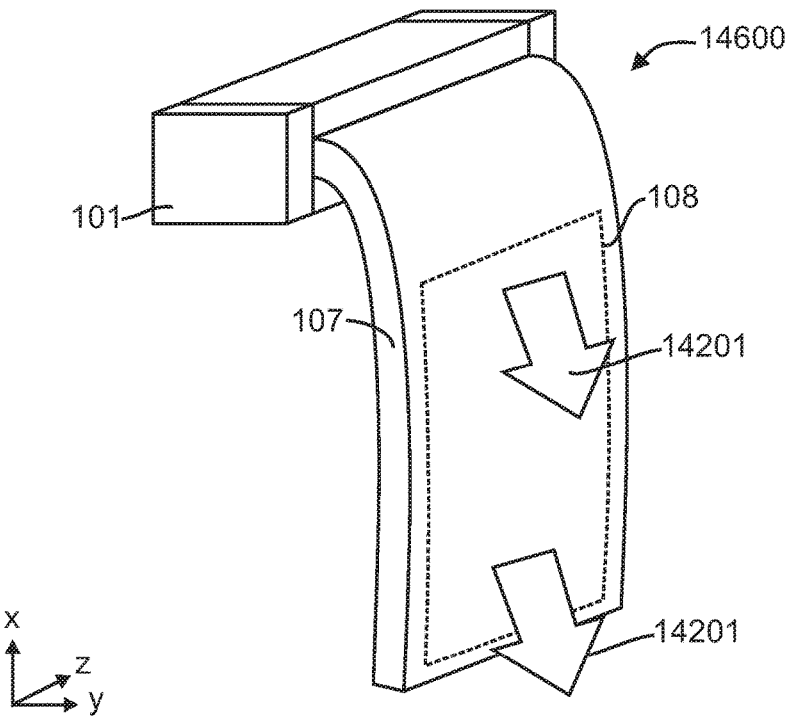
FIG. 39 is a perspective view of one embodiment of a light emitting device including a light input coupler and a film-based lightguide hanging downward such that a substantially vertical region of the film-based lightguide includes a light emitting region that emits light.

FIG. 39 is a perspective view of one embodiment of a light emitting device 14600 including the light input coupler 101 and the film-based lightguide 107 hanging downward such that a substantially vertical region of the film-based lightguide includes a light emitting region 108 that emits light 14201. The light 14201 exiting the light emitting region 108 has a directional component in the –x direction (downward toward the nadir). In one embodiment, the light exiting the lightguide has a luminous intensity less than 300 candelas at 55 degrees from the nadir (–x direction) in the x-y plane. The light may be emitted from either or both surfaces of the substantially vertical region of the film-based lightguide in the light emitting region. For example, in one embodiment, more than 80% of the light emitted from the light emitting device is within one angular range selected from the group of: 50 degrees, 40 degrees, 30 degrees, and 20 degrees from the nadir (–x direction).

Figure 40:
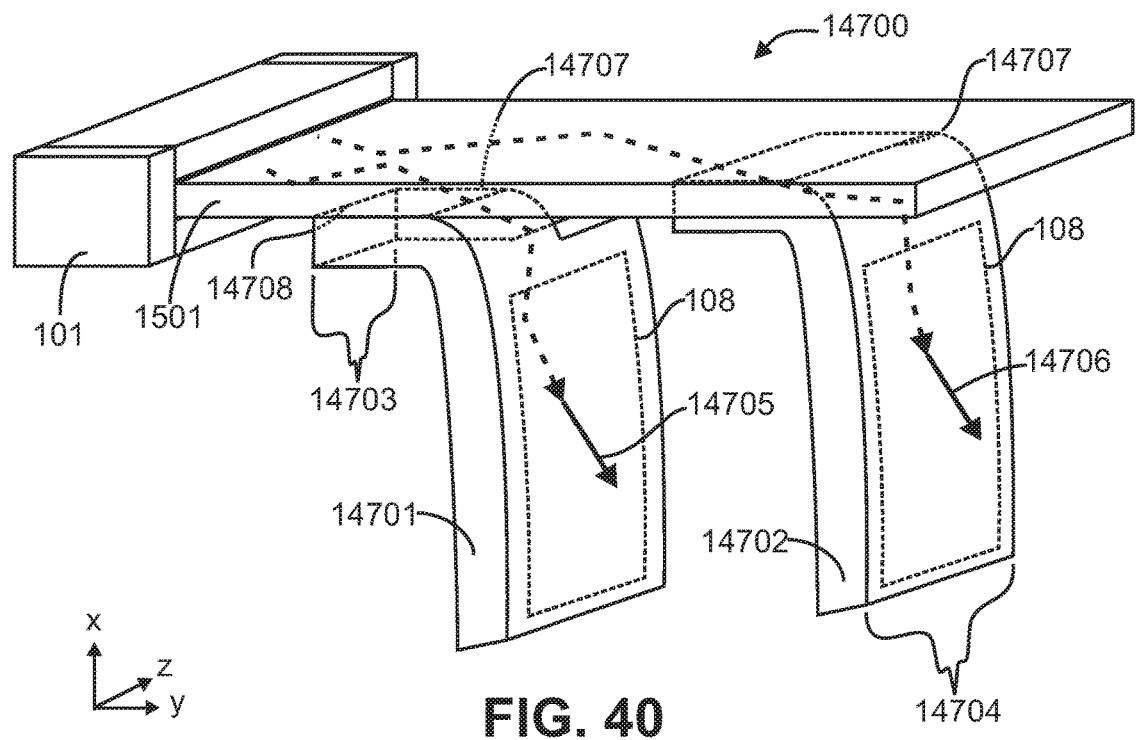
FIG. 40 is a perspective view of one embodiment of a light emitting device including a light input coupler that couples light into a film-based distribution lightguide.

FIG. 40 is a perspective view of one embodiment of a light emitting device 14700 including the light input coupler 101 which couples light into a film-based distribution lightguide 1501. The light 14705 from the light source within the light input coupler 101 travels through the distribution lightguide 1501 with an optical axis substantially parallel to the +y axis and is coupled into a first output coupling lightguide 14701 where the light travels in a waveguide condition with a directional component in the –x direction and is redirected by light extraction features such that the light exits the first output coupling lightguide 14701 in the light emitting region 108. Light transmitting regions 14707 are the regions of the distribution lightguide 1501 that are optically coupled to the light receiving regions 14708 of the output coupling lightguides 14701 and 14702. The light 14706 from the light source within the light input coupler 101 travels through the distribution lightguide 1501 with an optical axis substantially parallel to the +y axis and is coupled into the second output coupling lightguide 14702 where the light travels in a waveguide condition with a directional component in the –x direction and is redirected by light extraction features such that the light exits the second output coupling lightguide 14702 through the light emitting region 108. A width 14703 of the light receiving region 14708 of the first output coupling lightguide 14701, in the direction (z direction) substantially perpendicular to the optical axis (+y direction) of the light in the distribution lightguide 1501, that is optically coupled to the distribution lightguide 1501 is less than a width of the distribution lightguide 1501 in the z direction. By using the light receiving region 14708 with the smaller width 14703 than the output coupling lightguide 14701 in the light emitting region 108, less light is coupled into the first output coupling lightguide 14701 than if the width 14703 of the light receiving region 14708 was the full width of the first output coupling lightguide 14701 in the light emitting region 108. This, for example, can enable one to compensate for the higher flux of light closer to the light source such that the light flux exiting the light emitting regions is more uniform. Alternatively, the width 14703 of the output coupling lightguide 14701 can be used to control the light output for other reasons such as highlighting a region of a room. The width of the light receiving region 14708 of the second output coupling lightguide 14702 is the full width 14704 of the second output coupling lightguide and an output coupling efficiency of the second output coupling lightguide 14702 is greater than an output coupling efficiency of the first output coupling lightguide 14701. As shown, a thickness (x direction in the region of optical coupling) of the output coupling lightguides 14701 and 14702 is greater than a thickness of the distribution lightguide 1501 such to enable more light to be coupled into the output coupling lightguides 14701 and 14702. The location of the light transmitting region 14707 is further along the distribution lightguide 1501 (in the direction of the optical axis) enabling the extraction of light further from the light input coupler 101. In one embodiment, a location and an orientation of the light output couplers may be changed by peeling back the light output couplers and reapplying the light output couplers to the distribution lightguide in different locations.

Figure 41:
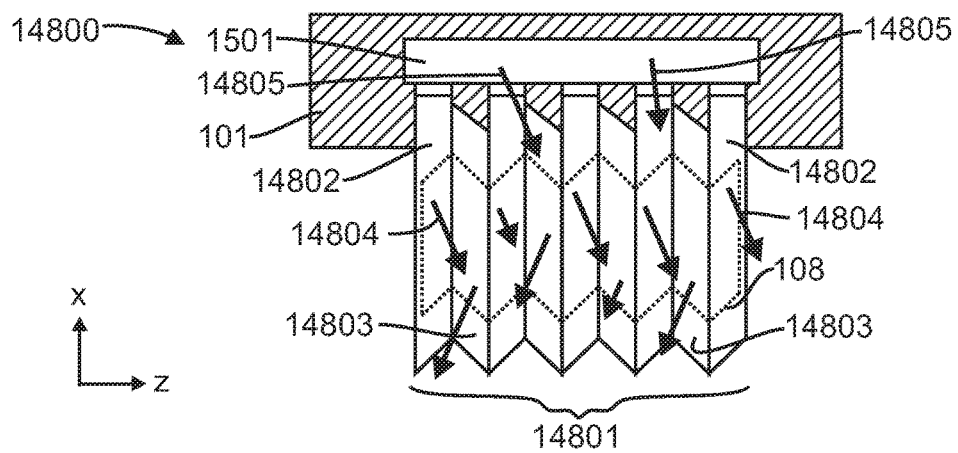
FIG. 41 is a side view of one embodiment of a light emitting device including a light input coupler which couples light into a film-based distribution lightguide.

FIG. 41 is a side view of one embodiment of a light emitting device 14800 including the light input coupler 101 which couples light into the film-based distribution lightguide 1501. An output coupling lightguide 14801 is optically coupled to the distribution lightguide 1501 using strip coupling lightguides 14802 separated by fold regions 14803. The light input coupler 101 and distribution lightguide 1501 are similar to those shown in FIG. 40 from a different viewpoint. Light 14805 from the light input coupler 101 travels with a directional component in the +y direction (out of the page) through the distribution lightguide 1501 and is optically coupled into the strip coupling lightguide 14802 formed at the edge of the output coupling lightguide 14801. This light 14805 travels with a directional component in the –x direction within the output coupling lightguide 14801 and exits 14804 the output coupling lightguide 14801 through the light emitting region 108 with a directional component in the –x direction. As shown in FIG. 41, the total width of the strip coupling lightguides 14802 that are optically coupled to the distribution lightguide 1501 is less than the width of the distribution lightguide 1501 and less than the width of the output coupling lightguide 14801 in the z direction. The width and number of the strip coupling lightguides 14802 can control an amount of light coupled into the output coupling lightguide 14801. Also, by distributing the coupling regions (where the strip coupling lightguides 14802 are optically coupled to the distribution lightguide 1501), a spatial luminance uniformity of the light 14804 emitted from the output coupling lightguide 14801 is typically increased relative to the uniformity of an output coupling lightguide that receives light from one side with the width of the output coupling lightguide significantly greater than a width of the coupling region. The folds allow for an increased light emitting surface relative to a non-folded output coupling lightguide and can offer increased rigidity or increased flexural modulus in the x-y plane for the output coupling lightguide.

Figure 42:
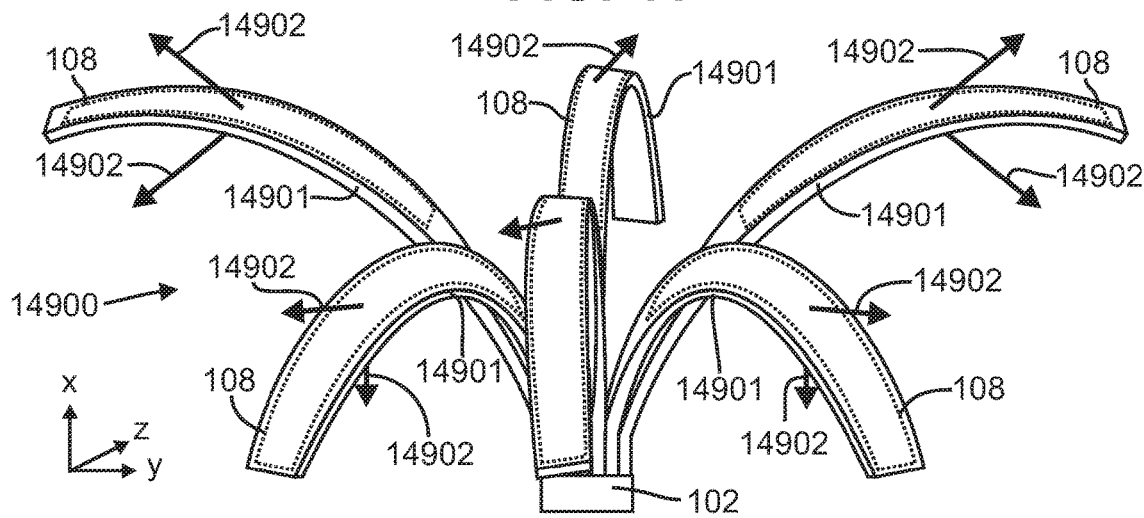
FIG. 42 is a perspective view of one embodiment of a light emitting device including a light source disposed to couple light into an array of lightguide strips including light emitting regions.

FIG. 42 is a perspective view of one embodiment of a light emitting device 14900 including the light source 102 disposed to couple light into an array of lightguide strips 14901 including light emitting regions 108. Light 14902 from the light source 102 travels in a waveguide condition within the lightguide strips and exits in the light emitting regions 108. As shown in FIG. 42, the light 14902 exits from a top surface and an opposing bottom surface of the lightguide strips 14901 due to light extraction features (not shown) within the light emitting regions 108. In one embodiment, the orientation and/or the shape of the lightguide strips can be controlled to produce a desired light output profile. For example, as shown, the light emitting device 14900 emits light in a range of angles substantially within a hemispherical output with an axis parallel to the +x axis. By orienting the strips substantially parallel to the x axis in the +x direction, 80% of the light output can be contained within an angular range 40 degrees from the +x axis, for example. Different shapes and orientations of the strips can produce a range of angles in different direction.

Figure 43:
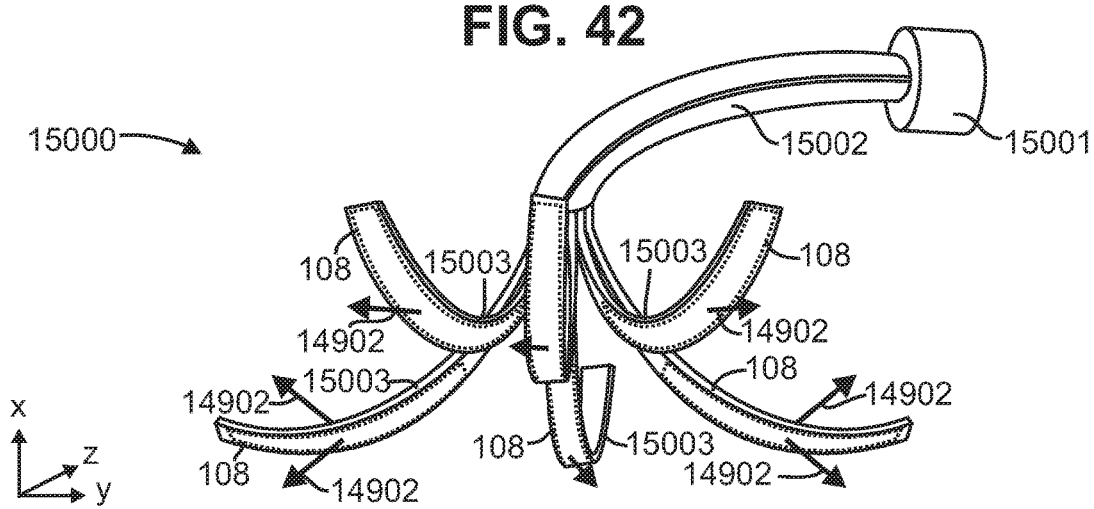
FIG. 43 is a perspective view of one embodiment of a light emitting device including a light input coupler and a lightguide with a tubular-shaped region.

FIG. 43 is a perspective view of one embodiment of a light emitting device 15000 including a tubular light input coupler 15001 (including folded coupling lightguides bent in a circular shape and a light source) extending from a tubular film-based lightguide 15002 with output coupling lightguides 15003 on an opposite end. Light from the tube shaped light input coupler 15001 is coupled into the tubular film-based lightguide 15002 and is output into the output coupling lightguides 15003 where the light 14902 exits from the light emitting region 108. In the embodiment shown in FIG. 43, the tubular film-based lightguide 15002 can function as a distribution lightguide to transfer, in certain embodiments over distances of many meters, the light from the light input coupler 15001 to the output coupling lightguides 15003. In this embodiment, for example, the light source may be disposed further from the output coupling lightguides as in the case where the light source is disposed near the ceiling, and the film-based lightguide is suspended from the ceiling and has light emitting output coupling lightguides on an opposite end forming a type of chandelier that could be circular, linear, or arranged as an arcuate or wave-like shape, or other suitable shape that can be formed from a film or arrangement of light emitting sections from a film.

Figure 44:
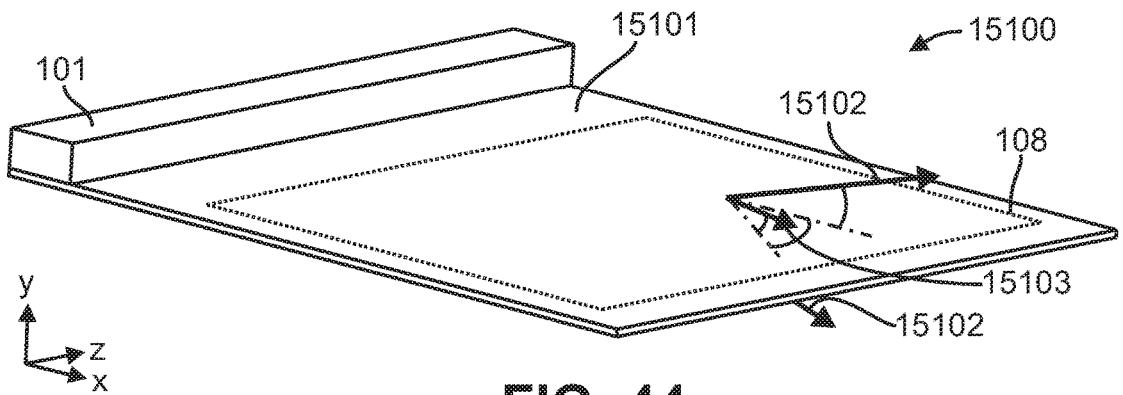
FIG. 44 is a perspective view of one embodiment of a light emitting device including a light input coupler and a flexible, reconfigurable film-based lightguide.

FIG. 44 is a perspective view of one embodiment of a light emitting device 15100 including the light input coupler 101 and a plastically deformable film-based lightguide 15101. Light 15102 from the plastically deformable film-based lightguide 15101 is emitted from a substantially planar surface (parallel to the x-z plane) and the light 15102 from the light input coupler 101 is emitted from the light emitting region 108 within a first angular range from the +x axis. For example, in one embodiment, at least 80% of the light emitted from the light emitting device is emitted within 40 degrees from the +x axis. Light 15103 from the light input coupler 101 is emitted from the light emitting region 108 at a second angle from the x-z plane and a third angle from the x-y plane.

Figure 45:
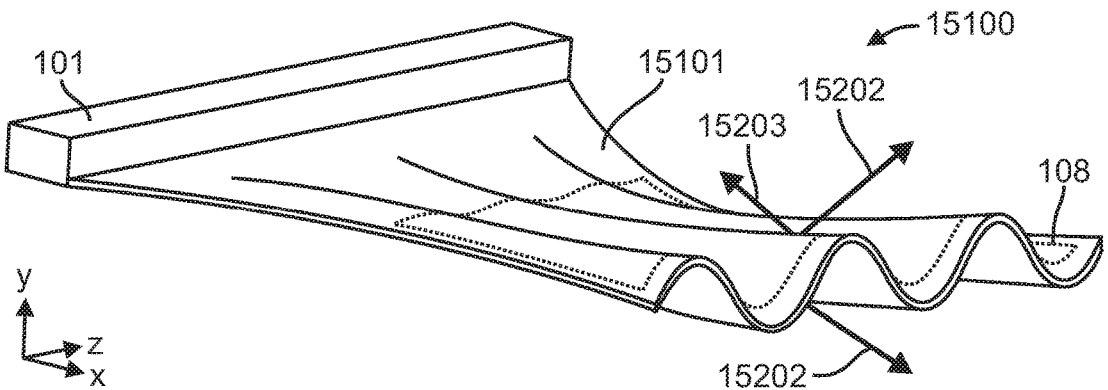
FIG. 45 is a perspective view of the light emitting device of FIG. 44 wherein the reconfigurable film-based lightguide is folded into a shape with a wave-like cross-sectional profile in the y-z plane.

FIG. 45 is a perspective view of the light emitting device 15100 of FIG. 44 wherein the plastically deformable film-based lightguide 15101 is folded into a shape with a wave-like cross-sectional profile in the y-z plane. Light 15202 exits the plastically deformable film-based lightguide 15101 in the light emitting region 108 from either side of the plastically deformable film-based lightguide 15101 with directional components in the +y and -y directions. In this embodiment, the plastically deformable film-based lightguide 15101 can be folded or a lateral dimension in the z direction can be reduced such that an angular light output profile can be changed. The light 15203 has an angular component in the y-z plane that is increased due to a surface profile created due to bends in the light emitting region 108. An angular width full-width at half maximum luminous intensity of the light exiting the emitting device 15100 of FIG. 45 is increased in the y-z plane relative to the flat, plastically deformable, film-based lightguide of FIG. 44 due to bends. In another embodiment, the lateral dimension in the x direction of a plastically deformable, film-based lightguide is reduced by folding or bringing two or more regions of the lightguide closer together.

Figure 46:
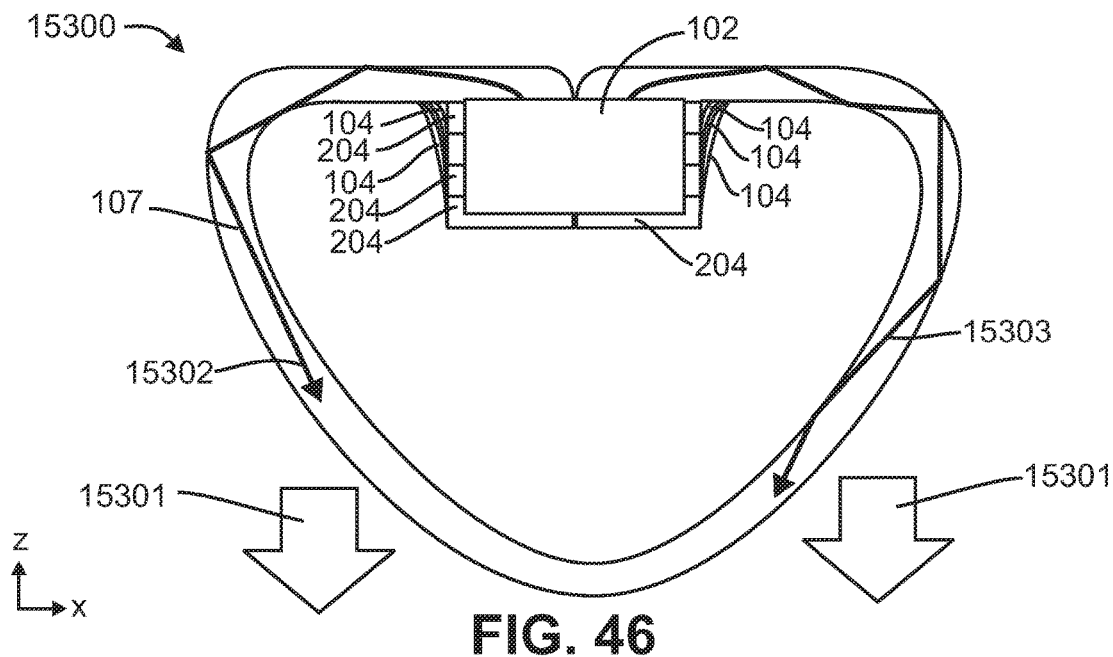
FIG. 46 is a cross-sectional side view of one embodiment of a light emitting device including two sets of coupling lightguides on opposite sides of a film-based lightguide that are folded underneath the film-based lightguide and stacked adjacent each other.

FIG. 46 is a cross-sectional side view of one embodiment of a light emitting device 15300 including two sets of coupling lightguides 104 on opposite sides of the film-based lightguide 107 that are folded underneath the film based lightguide 107 and stacked adjacent each other. The film-based lightguide is formed into a hemisphere-like shape. The input edges 204 of the coupling lightguides 104 are disposed to receive light from the light source 102. In this embodiment, a single light source (or an array or arrangement of light sources) is disposed to couple light 15302 initially travelling with a directional component in the +y direction (into the page) into the first set of coupling lightguides 104 and a direction is changed due to a fold in the coupling lightguides 104 such that the light travels with a directional component in the -x direction through the film-based lightguide 107. The light 15303 from the light source 102 initially travels with a directional component in the +y direction (into the page) into a second set of coupling lightguides 104 and a direction is changed due to a fold in the coupling lightguides 104 such that the light travels with a directional component in the +x direction through the film-based lightguide 107. Light 15301 exits the film-based lightguide 107 with a directional component in the -z direction. In this embodiment, the light propagating in opposite directions within the lightguide provides a more uniform spatial luminance profile in the light emitting region of the film-based lightguide and/or provides two angular luminous intensity peaks (in the x-z plane). In one embodiment, the coupling lightguides and light source are not disposed within the volume substantially bounded by the film-based lightguide.

Figure 47:
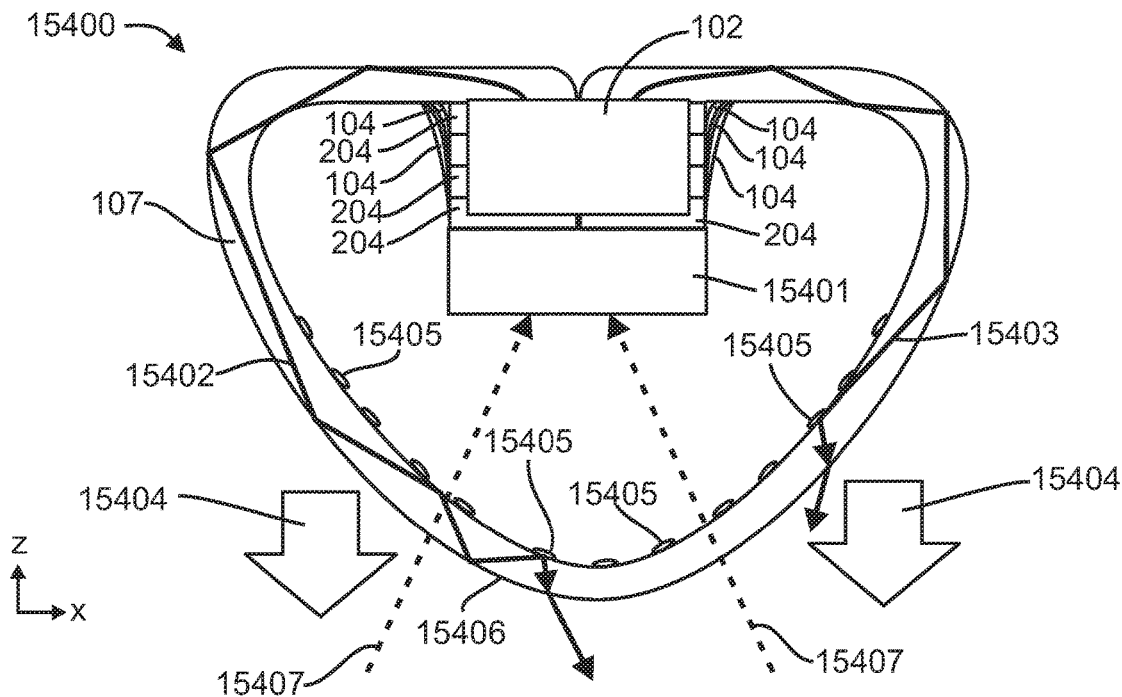
FIG. 47 is a cross-sectional side view of one embodiment of a light emitting device including a film-based lightguide in the shape of a dome with a camera disposed within the dome.

FIG. 47 is a cross-sectional side view of one embodiment of a light emitting device 15400 including the film-based lightguide 107 in the shape of a dome with a camera 15401 disposed within the dome. The light emitting device 15400 includes two sets of coupling lightguides 104 on opposite sides of the film-based lightguide 107 that are folded underneath the film-based lightguide 107 and stacked adjacent each other. The film-based lightguide is formed into a hemisphere-like shape. The input edges 204 of the coupling lightguides 104 are disposed to receive light from the light source 102. In this embodiment, the single light source (or an array or arrangement of light sources) is disposed to couple light 15402 initially travelling with a directional component in the +y direction (into the page) into the first set of coupling lightguides 104 and a direction is changed due to a fold in the coupling lightguides 104 to travel with a component in the -x direction through the film-based lightguide 107. The light 15402 exits the film-based lightguide 107 after being redirected from a light extraction feature 15405 disposed on the inner surface of the film-based lightguide 107. The light 15403 from the light source 102 initially travels with a directional component in the +y direction (into the page) into the second set of coupling lightguides 104 and a direction is changed due to the fold in the coupling lightguides 104 to travel with a directional component in the +x direction through the film-based lightguide 107. The light 15403 exits the film-based lightguide 107 after being redirected from the light extraction feature 15405 disposed on an inner surface of the film-based lightguide 107. In general, light 15404 exits the film-based lightguide 107 with a directional component in the -z direction. The camera 15401 is disposed on an opposite side of the film-based lightguide 107 as the light emitting surface 15406 and is disposed to receive light external to the light emitting device 15400 that passes through the film-based lightguide 107 and reaches the camera 15401. The size, shape, number, location, and type of light extraction features 15405 affect the perceived uniformity of a light emitting surface 15406 of the light emitting device 15400 and the transmission of light 15407 to the camera. For example, in one embodiment, the thin film-based lightguide 107 permits the use of very small light extraction features 15405 separated by a distance such that when viewed, for example, at a distance of 3 feet away, appear continuous despite there being a gap between them. The gap allows clear, undiffused light to pass through the film-based lightguide 107 to the camera 15401 while the lightguide 107 appears to be uniformly emitting light 15404. This is advantageous to conceal the camera 15401 within the film-based lightguide 107 shape where the light emitting device 15400 is functioning as a "one-way" light fixture analogous to a one way mirror. In another embodiment, the light extraction features 15405 are printed white ink dots that are over printed with light absorbing ink such that light scattered by and through the light extraction features 15405 is absorbed and less scattered light directly enters the entrance aperture of the camera 15401 and creates noise and reduces the image contrast. The camera 15401 may be rotatable, fixed, infrared or visible camera and more than one camera may be disposed on the side of the film-based lightguide 107 opposite the light emitting surface 15406. In one embodiment, the light emitting device 15400 is a one-way light fixture emitting infrared light and visible light and the camera 15401 is substantially indiscernible to a person with an acuity of 1 arcminute positioned 3 feet from the light emitting device.

Figure 48:
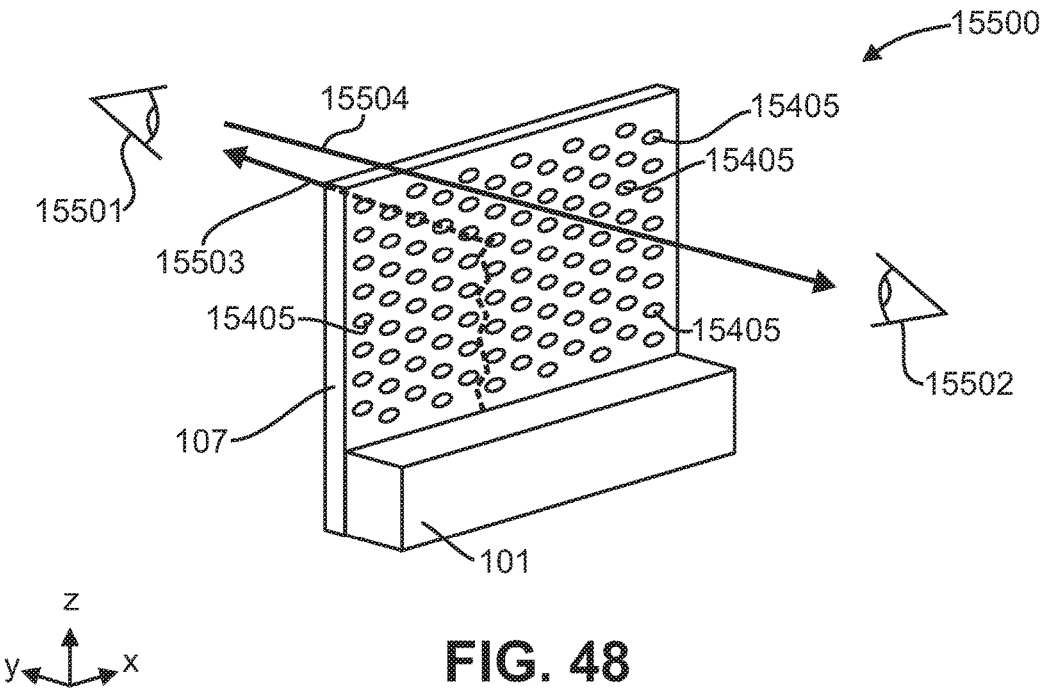
FIG. 48 is a perspective view of one embodiment of a light emitting device including a film-based lightguide wherein substantially all of the light is emitted with a directional component in the +y direction.

FIG. 48 is a perspective view of one embodiment of a light emitting device 15500 including the film-based lightguide 107 wherein substantially all of the light is emitted with a directional component in the +y direction. Light 15503 from the light input coupler 101 travels through the film-based lightguide 107 and is redirected by the light extraction feature 15405 such that the light exits the lightguide toward a first viewer 15501. The accumulation of light 15503 exiting the film-based lightguide 107 due to the light extraction features 15405 provides an appearance of a substantially continuous light emitting area to a first viewer 15501. Light 15504 from the side of the first viewer 15501 travels substantially undiffused through the film-based lightguide and can be seen by a second viewer 15502. In this embodiment, the first viewer 15501 sees a substantially continuous light emitting surface and the second viewer can see through the film-based lightguide 107 and see the first viewer 15501 without the first viewer 15501 being able to see the second viewer 15502. In one embodiment, the one-way directionality of the light emitted from the film-based lightguide and the light transmitting regions provides a "privacy light fixture."

Figure 49:
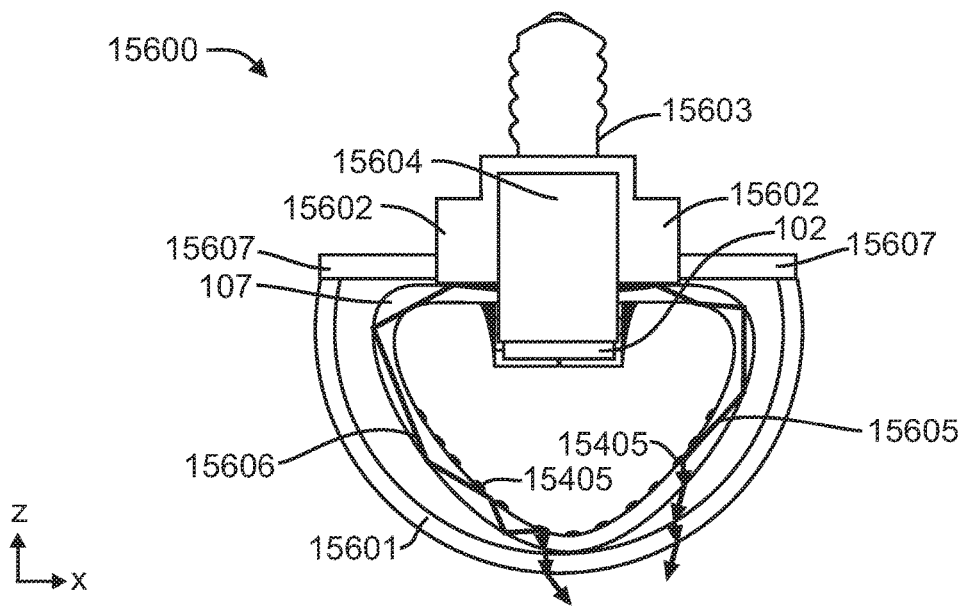
FIG. 49 is a cross-sectional side view of one embodiment of an incandescent light bulb replacement light emitting device including a film-based lightguide in the shape of a dome with a protective bulb surrounding the film-based lightguide.

FIG. 49 is a cross-sectional side view of one embodiment of a light bulb light emitting device 15600 including the film-based lightguide 107 in a shape of a dome with a protective bulb 15601 covering a region of the film-based lightguide 107. The light emitting device 15600 includes two sets of coupling lightguides on opposite sides of a film-based lightguide 107 that are folded underneath the film based lightguide 107 and stacked adjacent each other. The film-based lightguide is formed into a dome-like shape. Light 15606 from the light source 102 initially travels with a directional component in the +y direction (into the page) into a first set of coupling lightguides and a direction is changed due to a fold in the coupling lightguides to travel with a directional component in the −x direction through the film-based lightguide 107. The light 15606 exits the film-based lightguide 107 after being redirected from a light extraction feature 15405 disposed on the inner surface of the film-based lightguide 107 and passes through the protective bulb 15601. Light 15605 from the light source 102 initially travels with a directional component in the +y direction (into the page) into a second set of coupling lightguides and a direction is changed due to the fold in the coupling lightguides to travel with a directional component in the +x direction through the film-based lightguide 107. The light 15605 exits the film-based lightguide 107 after being redirected from the light extraction feature 15405 disposed on an inner surface of the film-based lightguide 107 and passes through the protective bulb 15601. The protective bulb is attached to a housing component 15607 physically coupled to the light emitting device 15600. The light source 102 is electrically and thermally coupled to a circuit board 15604 which is thermally coupled to the thermal transfer element 15602. The circuit board may include other elements such as an LED driver, control components, feedback components, communication components, and/or other suitable elements or components known to be usable with light emitting devices. The light emitting device 15600 receives electrical power through an Edison type screw base 15603. For example, the screw type base may be an Edison E27 for use in the United States.

Figure 50:
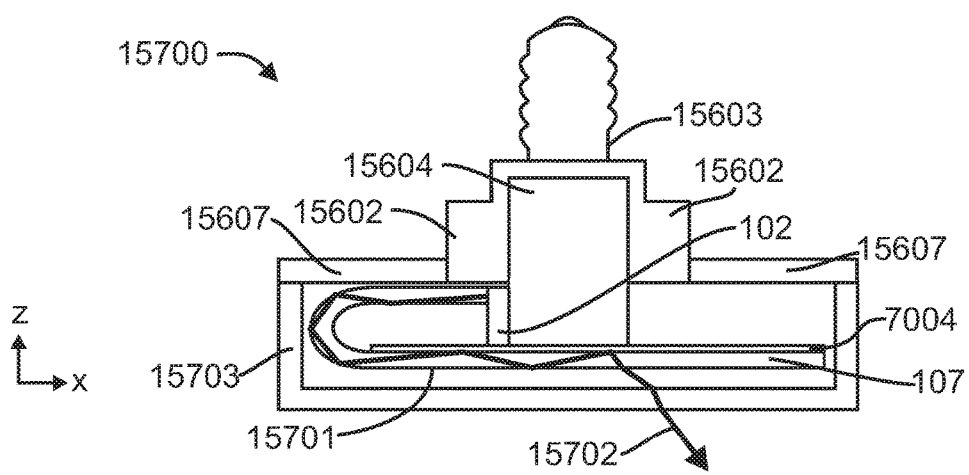
FIG. 50 is a cross-sectional side view of one embodiment of a light emitting device including a film-based lightguide with a substantially flat light emitting surface with a protective cover surrounding the film-based lightguide.

FIG. 50 is a cross-sectional side view of one embodiment of a light emitting device 15700 including the film-based lightguide 107 with a substantially flat light emitting surface 15701 with a protective cover 15703 surrounding the film-based lightguide 107. The light emitting device 15700 includes a film-based lightguide 107 that is folded underneath the light emitting surface 15701. Light 15702 from the light source 102 initially travels with a directional component in the +y direction (into the page) into a first set of coupling lightguides and a direction is changed due to a fold in the coupling lightguides to travel with a directional component in the −x direction through the film-based lightguide 107. The light 15702 exits the film-based lightguide 107 after being redirected from a light extraction feature (not shown) disposed on the side of the film-based lightguide 107 opposite the light emitting surface and passes through the protective cover 15701. A light reflecting film 7004 is disposed adjacent to the surface of the film-based lightguide 107 opposite the light emitting surface 15701 to reflect light received from the film-based lightguide 107 back through the film-based lightguide 107 and out of the light emitting device 15700. The protective cover is attached to the housing component 15607 physically coupled to the light emitting device 15700. The light source 102 is electrically and thermally coupled to the circuit board 15604 which is thermally coupled to the thermal transfer element 15602. The circuit board may include other suitable elements or components such as an LED driver, control components, feedback components, communication components, and other elements known to be usable with light emitting devices. The light emitting device 15700 receives electrical power through the Edison type screw base 15603.

Figure 51:
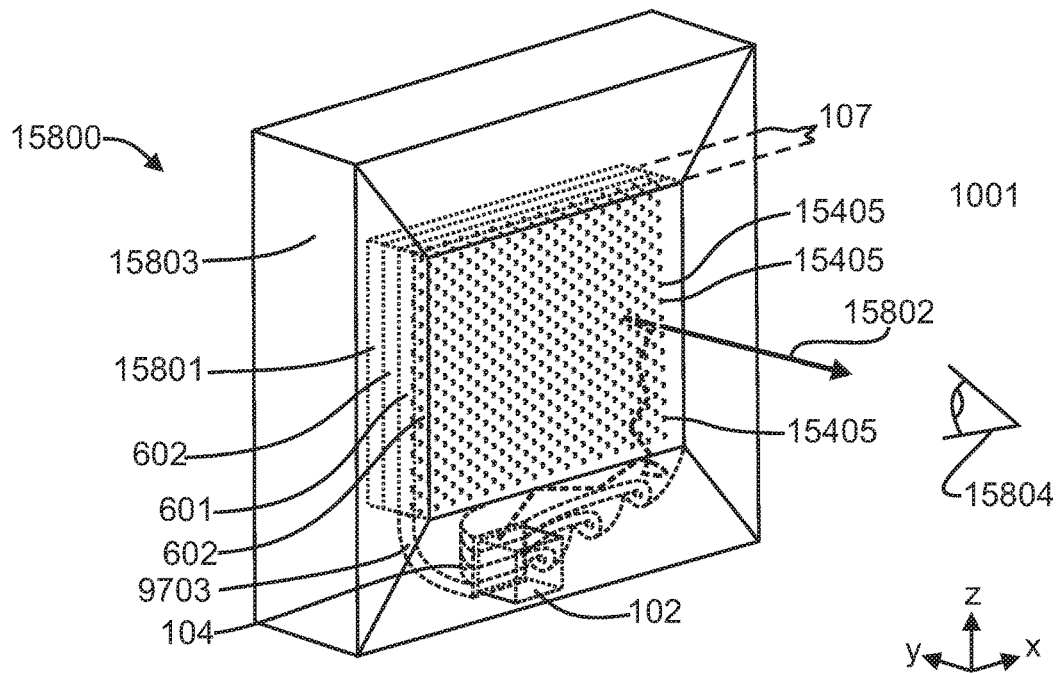
FIG. 51 is a perspective view of one embodiment of a self-illuminated picture frame light emitting device including a light source and coupling lightguides within a frame.

FIG. 51 is a perspective view of one embodiment of a self-illuminated picture frame light emitting device 15800 including the light source 102 and coupling lightguides 104 within a frame 15803. Light from the light source 102 travels through the folded coupling lightguides 104 and a non-folded coupling lightguide 9703 to reach the film-based lightguide 107 including the core region 601 disposed between two cladding regions 602. Light 15802 from the light source 102 travels with a directional component in the +y direction and is rotated by the fold in the coupling lightguide 104 to travel with a directional component in the +z direction through the core region 601 of the film-based lightguide 107. When the light 15802 reaches the light extraction feature 15405 disposed adjacent (or upon) the core region 601 surface nearest the viewer 15804, the light is redirected with a component in the −y direction toward a photograph 15801. This light 15802 illuminates the photograph 15801 and the reflected light travels back through the film-based lightguide 107 and out of the light emitting device 15800 toward the viewer 15804. In one embodiment, the light extraction features 15405 are sufficiently small such that the light extraction features 15405 are at most barely visible to the unaided viewer. For example, in one embodiment, the largest feature length of the light extraction features is less than one selected from the group of: 1 millimeter, 0.5 millimeter, 0.2 millimeter, 0.1 millimeter, and 0.05 millimeter. In another embodiment, the film-based lightguide in a frontlight light emitting device incorporated into a frame is disposed proximate or optically coupled to an inner surface of a glass sheet or window in the frame.

Figure 52:
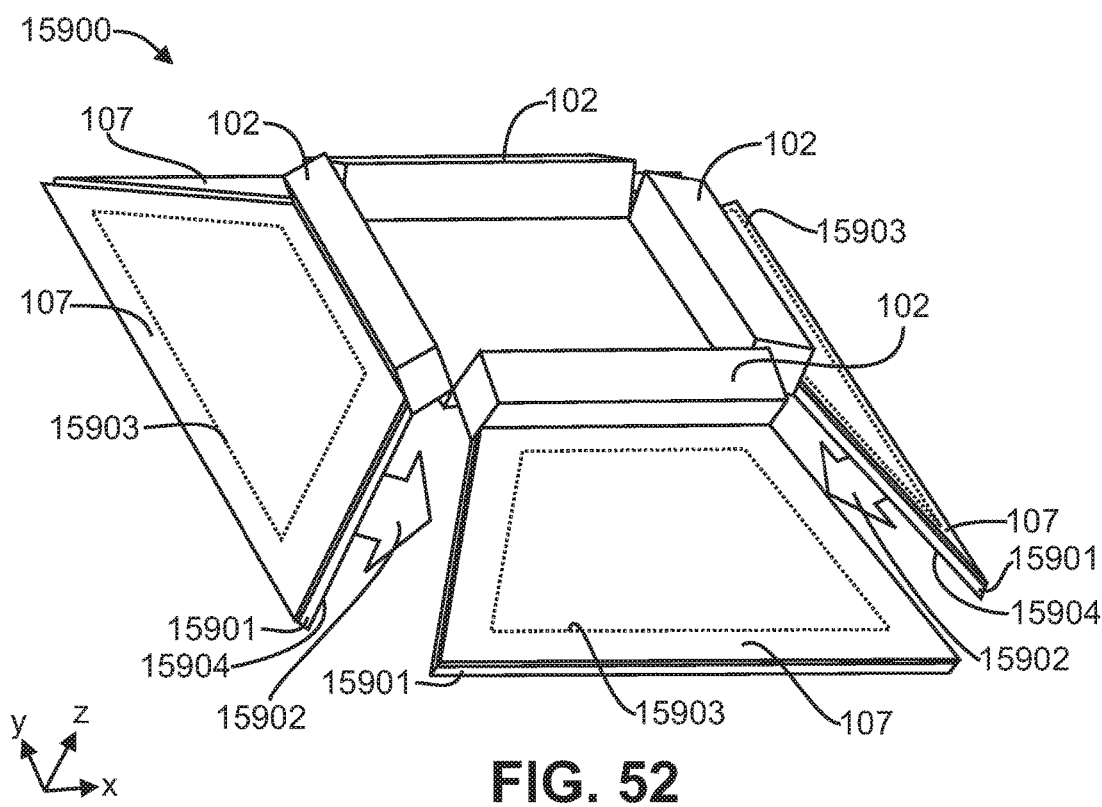
FIG. 52 is a perspective view of one embodiment of a light emitting device including light input couplers and rotatable film-based lightguides physically coupled to rigid, bendable substrates.

FIG. 52 is a perspective view of one embodiment of a light emitting device 15900 including light input couplers 101 and rotatable film-based lightguides 107 physically coupled to bendable metal substrates 15901 with light transmitting apertures 15903. Light 15902 from the light input couplers 101 is directed by coupling lightguides within the light input coupler 102 into the film-based lightguides 107 and directed out of the film-based lightguides 107, through the light transmitting apertures 15903 in the metal substrates 15901, and out of the light emitting device 15900 from a light emitting surface 15904 with a directional component in the −z direction. An angle of an output of the light 15902 may be adjusted by rotating the substrate 15901 and film-based lightguide 107 combinations by bending. In this embodiment, a shape of the film-based lightguides 107 and bendable substrates 15901 are substantially trapezoidal. Other suitable shapes may be used including circular shapes, semicircular, rectangular, square, arcuate, wave-like, polygonal, and/or other shapes. In another embodiment, the light input couplers 101 are rotatable along with the film-based lightguides 107 and substrates 15901. In another embodiment, the substrate 15901 is disposed on the side of the film-based lightguide 107 opposite the light emitting surface 15904 and the substrate is substantially opaque, such as a thin sheet of aluminum. In a further embodiment, the light emits from the film-based lightguide 107 and light emitting device 15900 with directional components in the +z and −z direction such the light emitting device 15900 has uplight and downlight light emitting profiles.

Figure 53:
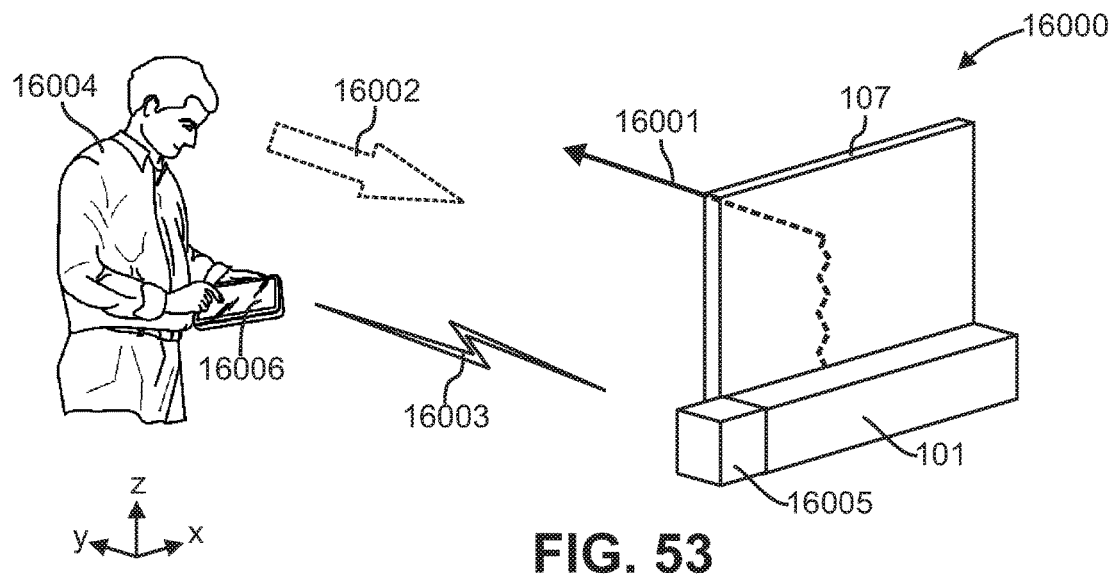
FIG. 53 is a perspective view of a light emitting device including a light input coupler, a film-based lightguide, and a sensor disposed to receive communication or visual information from an electronic device or a person.

FIG. 53 is a perspective view of a light emitting device 16000 including the light input coupler 101, the film-based lightguide 107, and a receiver which may include a sensor 16005 configured in signal communication to receive signals, such as radio frequency communication signals 16003 or visual information 16002 from an electronic device 16006 or a person 16004. In one embodiment, the receiver 16005 includes a radio frequency transceiver disposed to receive and transmit the radio frequency communication signals 16003 to the electronic device 16006. In another embodiment, the receiver 16005 includes a camera disposed to receive the visual information 16002 (such as images and recognizable features) from the person 16004. In a further embodiment, the light emitting device 16000 changes a property of the light output (such as average luminance, color, and/or which film-based lightguide layer is illuminated, for example) based on information derived from the radio frequency communication signals 16003 or the visual information 16002 derived from the electronic device 16006 or the person 16004.

Figure 54:
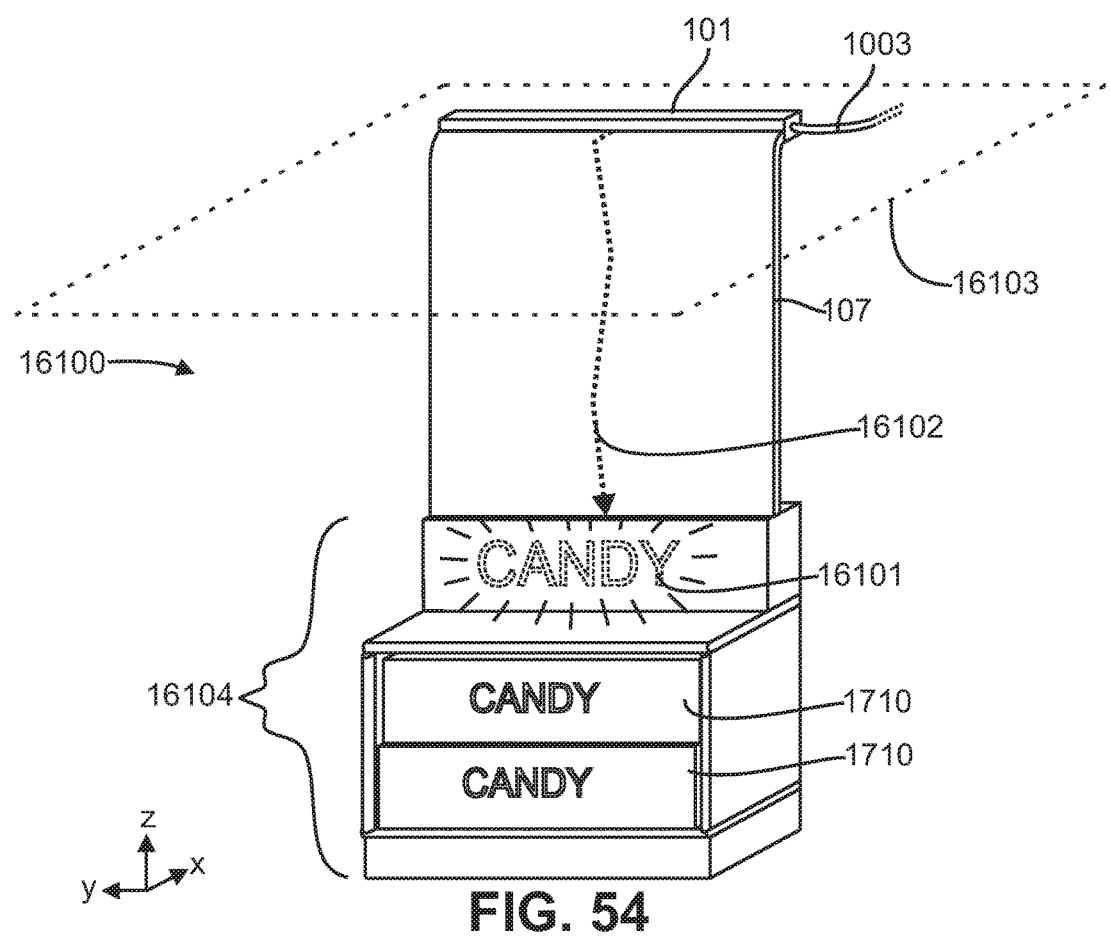
FIG. 54 is a perspective view of a light emitting point of purchase display including a light input coupler, and a film-based lightguide extending into a base of the point of purchase display.

FIG. 54 is a perspective view of a light emitting device 16100 including the light input coupler 101, and the film-based lightguide 107 extending into a point of purchase display 16104 displaying products 1710. The light input coupler 101 is disposed above a support structure or surface, such as above a plane of a ceiling 16103 and in certain embodiments is not visible. The film-based lightguide 107 receives light 16102 in the light input coupler 101 and transmits the light in a waveguide condition into the point of purchase display base 16104 where the light is emitted in a form of light emitting indicia 16101. The film-based lightguide 107 is substantially transparent in a region between the point of purchase display base 16104 and a plane of the ceiling 16103 such that the film-based lightguide 107 does not obscure a view of other areas of the room. By placing the light input coupler 101 above the plane of the ceiling 16103, an electrical power cable 1003 is hidden from view and the point of purchase display base 16104 does not need to have a power cable extending from it. This can increase the flexibility of locating the point of purchase display at various locations where running power cables would be undesirable.

Figure 55:
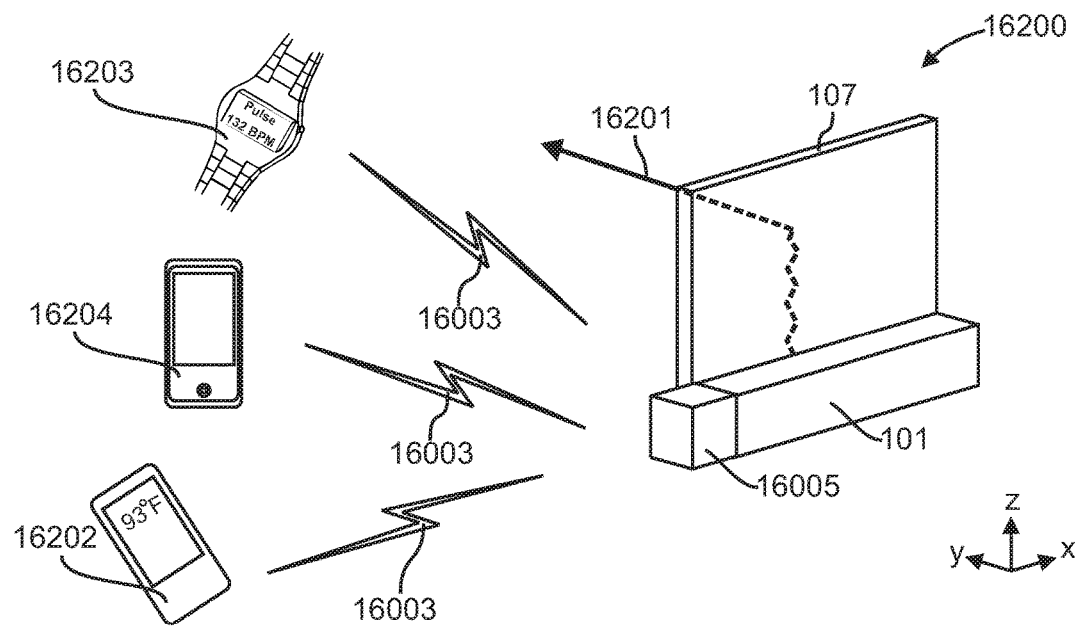
FIG. 55 is a perspective view of a light emitting device functioning as a ubiquitous display including a light input coupler, a film-based lightguide, and a sensor disposed to receive communication, such radio frequency communication from an electronic device, a wireless thermometer, or a personal health monitor.

FIG. 55 is a perspective view of a light emitting device 16200 functioning as a display including the light input coupler 101, the film-based lightguide 107, and the receiver 16005 disposed to receive the radio frequency communication signals 16003 from an electronic device 16204, a wireless thermometer 16202, or a personal health monitor 16203 (such as a heart rate monitor). In one embodiment, the receiver 16005 includes a radio frequency transceiver disposed to receive and transmit the radio frequency communication signals 16003 to a device located nearby or directly or indirectly through a wireless network. The light emitting device 16200 may provide information by emitting light 16201 from one or more regions that represent information without readable icons or characters. For example, the light emitting device 16200 may include a frontlight device on or within a light emitting frame around a picture of an individual that emits green light 16201 toward a mat board of the frame if the individual's heart rate information transmitted by a personal health monitor 16203 is within a first predetermined zone and the mat board becomes red if the heart rate is outside of the first predetermined zone to alert the viewer. Similarly, the light emitting device 16200 may be coupled to a light emitting clock face that is green if the GPS coordinates from an individual's electronic device 16204 (such as a cellphone) are within a predetermined zone and the clock face flashes red in color if the electronic device is located outside the predetermined zone which could indicate that a child has left a safe area, for example. In another embodiment, the light emitting device 16200 is disposed on the frame of a computer monitor and emits blue light if the temperature measured by a wireless thermometer 16202 located outside is below a predetermined level and emits red light if the temperature is above the predetermined level. In one embodiment, the light emitting device 16200 changes a property of the light output (such as intensity, color, and/or which film-based lightguide layer is illuminated, for example) based on information derived by the radio frequency communication signals 16003 from the electronic device 16204 or by a wired connection to the electronic device 16204 directly or across a network.

FIG. 56 is a perspective view of a light emitting device 16300 incorporated into a flexible packaging 16301 including the light input coupler 101 and the film-based lightguide 107. Light 16302 from the light input coupler 101 travels through the film-based lightguide 107 and is emitted from the film-based lightguide 107 and the packaging 16301 in a form of indicia 16303, for example.

In one embodiment, a device includes a film-based lightguide and a film adjustment mechanism configurable to adjust an orientation of a region of the film-based lightguide such that an angular light output profile from the device changes when a light source emits light that travels in a waveguide condition through the film-based lightguide. The film adjustment mechanism is configurable to adjust a radius of curvature of the region of the film-based lightguide. The film adjustment mechanism is electronically adjustable in certain embodiments. In one embodiment, the film adjustment mechanism includes at least one drawstring configurable to change the angular light output profile. In another embodiment, the film adjustment mechanism includes a plastically deformable element deformable to adjust the orientation of the region of the film-based lightguide. The film adjustment mechanism is configurable to adjust the position of the region of the film-based lightguide. The device includes a light source configured to emit light that enters the film-based lightguide, wherein the film adjustment mechanism is configurable to adjust the orientation of the region of the film-based lightguide relative to the light source. In one embodiment, the device is a light fixture. In certain embodiments, the orientation of the region of the film-based lightguide is adjustable to change an angle of a peak luminous intensity of the angular light output profile. In certain embodiments, the orientation of the region of the film-based lightguide in a light output plane is adjustable to change an angular full-width at half maximum luminous intensity of the angular light output profile in the light output plane. In certain embodiments, the light angular light output profile has an angular full-width at half maximum luminous intensity in a light output plane less than 120 degrees. In one embodiment, the device includes an array of coupling lightguides extending from the film-based lightguide, and the array of coupling lightguides are folded and positioned to receive light emitted from the light source.

In one embodiment, a light emitting device has an adjustable angular light output profile. The light emitting device includes a light source and a film-based lightguide configured to receive light emitted from the light source. The film-based lightguide includes a light emitting region at least partially defined by a group of light extraction features. The light emitting region has a first radius of curvature, wherein the first radius of curvature of the light emitting region is adjustable to a second radius of curvature to change the angular light output profile of the light emitted from the light emitting device. The light emitting device may also include a film adjustment mechanism configurable to adjust the first radius of curvature of the light emitting region. In one embodiment, the film-based lightguide includes a substantially non-light emitting region defined in an optical path of light from the light source between the light source and the light emitting region. In certain embodiments, a curvature of the film-based lightguide in the light emitting region is different from a curvature of the film-based lightguide in the substantially non-light emitting region. In certain embodiments, the light emitting device is a point of purchase display that includes a base and the light source is positioned proximate a ceiling. The film-based lightguide may include a curved surface in a light output plane and the light emitting region may include an inflection point of the curved surface. In certain embodiments, the first radius of curvature of the light emitting region is adjustable to change an angle of a peak luminous intensity of the angular light output profile. In certain embodiments, the first radius of curvature of the light emitting region in a light output plane is adjustable to change an angular full-width at half maximum luminous intensity of the angular light output profile in a light output plane. The light emitting device may further include a low contact area cover having surface relief features.

In one embodiment, a method of changing an angular light output profile of a light emitting device includes changing an orientation of a light emitting region of a film-based lightguide configured to receive light emitted from a light source through an array of coupling lightguides to change the angular light output profile of the light emitting device. Changing an orientation of the light emitting region may include changing a radius of curvature of the light emitting region. Changing an orientation of the light emitting region may include adjusting a film adjustment mechanism physically coupled to the film-based lightguide.

Examples

Embodiments are illustrated in the following example(s). The following examples are given for the purpose of illustration, but not for limiting the scope or spirit of the invention.

In one embodiment, coupling lightguides are formed by cutting strips at one or more ends of a film which forms coupling lightguides (strips) and a lightguide region (remainder of the film). On the free end of the strips, the strips are bundled together into an arrangement much thicker than the thickness of the film itself. On the other end, the strips remain physically and optically attached and aligned to the larger film lightguide. The film cutting is achieved by stamping, laser-cutting, mechanical cutting, water-jet cutting, local melting or other film processing methods. In one embodiment, the cut results in an optically smooth surface to promote total internal reflection of the light to improve light guiding through the length of the strips. A light source is coupled to the bundled strips. The strips are arranged so that light travels through the strips via total internal reflection and is transferred into the film lightguide portion. The bundle input of the strips has a thickness much greater than the film lightguide region so the light source can more efficiently transfer light into the lightguide compared to trying to couple to the edge or top of the film. The strips can be melted or mechanically forced together at the input to improve coupling efficiency. If the bundle is square shaped, a length of one of its sides I, is given by I~$\sqrt{(w \times t)}$ where w is a total width of the lightguide input edge and t is a thickness of the film. For example, a 0.1 mm thick film with 1 meter (m) edge would give a square input bundle with dimensions of 1 cm×1 cm. Considering these dimensions, the bundle is much easier to couple light into compared to coupling along the length of the film when using typical light sources (e.g. incandescent, fluorescent; metal halide, xenon and LED sources).

An example of one embodiment that can be brought to practice is given here. The assembly starts with 0.25 mm thick polycarbonate film that is 40 cm wide and 100 cm long. A cladding layer of a lower refractive index material of approximately 0.01 mm thickness is disposed on a top surface and a bottom surface of the film. The cladding layer can be added by coating or co-extruding a material with lower refractive index onto the film core. One edge of the film is mechanically cut into 40 strips of 1 cm width using a sharp cutting tool, such as a razor blade. The edges of the slots are then exposed to heat to improve the smoothness for optical transfer. The slots are combined into a bundle of approximately 1 cm×1 cm cross-section. To the end of the bundle a number of different types of light sources can be coupled (e.g. xenon, metal halide, incandescent, LED or Laser). Light travels through the bundle into the film and out of the image area. Light may be extracted from the film lightguide by laser etching into the film, which adds a surface roughness that results in frustrated total internal reflectance. Multiple layers of film can be combined to make multi-color or dynamic signs. The shape of the film-based lightguide, the shape of the light emitting region, the orientation of the light emitting region, and/or the position of the light emitting region can be adjusted to change the angular output of the light emitting device.

An example of one embodiment that has been brought to practice is described here. The apparatus began with a 15 mil thick polycarbonate film which was 18 inches wide and 30 inches long. The 18 inch edge of the film is cut into 0.25 inch wide strips using an array of razor blades. These strips are grouped into three six inch wide sets of strips, which are further split into two equal sets that were folded towards each other and stacked separately into 0.165 inch by 0.25 inch stacks. Each of the three pairs of stacks was then combined together in the center to create a combined and singular input stack of 0.33 inch by 0.25 inch size. An LED module, MCE LED module from Cree Inc., is coupled into each of the three input stacks. Light emitted from the LED enters the film stack with an even input, and a portion of this light remains within each of the 15 mil strips via total internal reflections while propagating through the strip. The light continues to travel down each strip as they break apart in their separate configurations, before entering the larger lightguide. Furthermore, a finned aluminum heat sink was placed down the length of each of the three coupling apparatuses to dissipate heat from the LED. This assembly shows a compact design that can be aligned in a linear array, to create uniform light. The shape of the film-based lightguide, the shape of the light emitting region, the orientation of the light emitting region, or the position of the light emitting region can be adjusted to change the angular output of the light emitting device.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. This application is intended to cover any adaptations or variations of the specific embodiments discussed herein. Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius.

What is claimed is:

1. A light fixture for illuminating an environment below a ceiling tile, the light fixture comprising:
   a lightguide formed from a film with a thickness less than 0.5 millimeters;
   a light input coupler for the lightguide comprising:
      a plurality of strips of the film extended from a lightguide region of the film along one side of the film, the plurality of strips are folded and stacked such that they are parallel to each other with their ends forming a light input surface, and
      at least one light source emitting light into the light input surface; and
   light extraction features within the lightguide region of the film defining one or more light emitting regions,
   wherein light from the at least one light source passes through the light input surface and propagates through the plurality strips and the lightguide region by total internal reflection and is directed by the light extraction features to emit a first flux of light first exiting the one or more light emitting regions of the film through a first surface of the film, and
   wherein a region of the film between the one or more light emitting regions and the strips comprises a bend or fold such that when the film is positioned between the ceiling tile and a ceiling tile rail support with the one or more light emitting regions of the film positioned below the ceiling tile, the at least one light source is positioned above the ceiling tile or above the ceiling tile rail support and the light first exiting the one or more light emitting regions of the film exits the film with a directional component in a first direction orthogonal to the first surface.

2. The light fixture of claim 1 wherein the light input coupler is physically coupled to the ceiling tile rail support.

3. The light fixture of claim 1 wherein the one or more light emitting regions of the film have an average luminous transmittance greater than 70%.

4. The light fixture of claim 1 wherein the film further comprises a non-light emitting region positioned adjacent the one or more light emitting regions that does not emit light when the at least one light source is emitting light and having a luminous transmittance greater than 70%; and when the film is positioned between the ceiling tile and the ceiling tile rail support with the one or more light emitting regions of the film positioned below the ceiling tile, the non-light emitting region is positioned below the ceiling tile.

5. The light fixture of claim 1 wherein the film comprises a non-light emitting region positioned adjacent the one or more light emitting regions that does not emit light when the at least one light source is emitting light, wherein the non-light emitting region has a spectral transmission between 400 nanometers and 700 nanometers within plus or minus 10%.

6. The light fixture of claim 1 wherein the first flux is greater than 70% of a total flux of light emitted from the one or more light emitting regions and the first direction is in a downward direction such that when the film is positioned between the ceiling tile and the ceiling tile rail support with the one or more light emitting regions of the film positioned below the ceiling tile, the light from the one or more light emitting regions illuminates the environment below the ceiling tile directly.

7. The light fixture of claim 1 wherein the first flux is greater than 70% of a total flux of light emitted from the one or more light emitting regions and the first direction is in an upward direction such that when the film is positioned between the ceiling tile and the ceiling tile rail support with the one or more light emitting regions of the film positioned below the ceiling tile, the light from the one or more light emitting regions illuminates the ceiling tile directly.

8. The light fixture of claim 1 wherein the one or more light emitting regions comprises a plurality of light emitting regions, and the first surface of the film is a light emitting surface comprising the plurality of light emitting regions and a non-light emitting region positioned adjacent the plurality of light emitting regions, wherein the light emitting surface emits light from the at least one light source in a visible pattern, image, logo, or indicia.

9. The light fixture of claim 1 wherein when the film is positioned between the ceiling tile and two ceiling tile rail supports with the one or more light emitting regions of the film positioned below the ceiling tile, forces between the ceiling tile and the two ceiling tile rail supports hold the film under tension such that it is substantially planar.

10. The light fixture of claim 1 wherein when the film is positioned between the ceiling tile and two ceiling tile rail supports with the one or more light emitting regions of the film positioned below the ceiling tile, forces between the ceiling tile and the two ceiling tile rail supports hold the film such that it drapes downward in an arcuate manner.

11. The light fixture of claim 1 wherein when the film is positioned between the ceiling tile and the ceiling tile rail support with the one or more light emitting regions of the film positioned below the ceiling tile, the ceiling tile has substantially a same reflected color measured through the film as a reflected color of a neighboring ceiling tile without a lightguide formed from a film beneath the neighboring ceiling tile when the ceiling tile and the neighboring ceiling tile are illuminated with light of a same illuminance and a same color from a D65 standard white light source.

12. The light fixture of claim 1 wherein when the film is positioned between the ceiling tile and the ceiling tile rail support with the one or more light emitting regions of the film positioned below the ceiling tile, the ceiling tile has substantially a same reflected luminance measured through the film as a reflected luminance of a neighboring ceiling tile without a lightguide formed from a film beneath the neighboring ceiling tile when the ceiling tile and the neighboring ceiling tile are illuminated with light of a same illuminance and a same color from a D65 standard white light source.

13. The light fixture of claim 1 wherein the first surface of the film comprises surface relief features facing the environment in the first direction, and the first surface has an ASTM D523-89 60 degree gloss less than 50 gloss units.

14. The light fixture of claim 1 wherein the film further comprises a second surface of the film opposite the first surface of the film in a thickness direction of the film and an adhesive layer positioned on the second surface of the film, wherein when the film is positioned between the ceiling tile and the ceiling tile rail support with the one or more light emitting regions of the film positioned below the ceiling tile, the adhesive layer adheres the film to the ceiling tile in the one or more light emitting regions of the film.

15. A light fixture for illuminating an environment below a ceiling tile, the light fixture comprising:

a lightguide formed from a film with a thickness less than 0.2 millimeters;
a light input coupler for the lightguide comprising a plurality of strips of the film extended from a lightguide region of the film along one side of the film, the plurality of strips are folded and stacked such that they are parallel to each other with their ends forming a light input surface;
at least one light source emitting light into the light input surface; and
light extraction features within the lightguide region of the film defining one or more light emitting regions,
wherein light from the at least one light source passes through the light input surface and propagates through the plurality of strips and the lightguide region by total internal reflection and is directed by the light extraction features to emit a first flux of light first exiting the one or more light emitting regions of the film through a first surface of the film, and
wherein a region of the film between the one or more light emitting regions and the strips comprises a bend or fold such that when the film is positioned between the ceiling tile and a ceiling tile rail support with the one or more light emitting regions of the film positioned below the ceiling tile, the at least one light source is positioned above the ceiling tile or above the ceiling tile rail support, the force between the ceiling tile and the ceiling tile rail support holds the film, and the light first exiting the one or more light emitting regions of the film exits the film with a directional component in a first direction orthogonal to the first surface.

16. The light fixture of claim 15 wherein the one or more light emitting regions of the film has an average luminous transmittance greater than 70%.

17. The light fixture of claim 15 wherein the film comprises a non-light emitting region positioned adjacent the one or more light emitting regions that does not emit light when the at least one light source is emitting light and has a luminous transmittance greater than 70%; and when the film is positioned between the ceiling tile and a ceiling tile rail support with the one or more light emitting regions of the film positioned below the ceiling tile, the non-light emitting region is positioned below the ceiling tile.

18. The light fixture of claim 15 wherein the first surface of the film comprises surface relief features facing the environment in the first direction, and the first surface has an ASTM D523-89 60 degree gloss less than 50 gloss units.

19. A method of illuminating an environment below a ceiling tile, the method comprising:

forming a lightguide from a film with a plurality of strips extended from a lightguide region of the film along one side of the film;
folding and stacking the strips such they are parallel to each other with their ends forming a light input surface;
forming a light emitting region of the film, the light emitting region defined by a plurality of light extracting features;
positioning a light source above the ceiling tile or above a ceiling tile rail support to emit light into the light input surface;
positioning the film between the ceiling tile and the ceiling tile rail support; and
positioning the light emitting region below the ceiling tile such that the light exiting the light emitting region illuminates the environment below the ceiling tile.

20. The method of claim 19 wherein positioning the light emitting region below the ceiling tile includes positioning the film under tension such that it is substantially planar.

* * * * *